United States Patent
Willis et al.

(10) Patent No.: US 9,817,912 B2
(45) Date of Patent: *Nov. 14, 2017

(54) METHOD AND SYSTEM FOR MANAGING A VIRTUAL MEETING

(71) Applicant: Saba Software, Inc., Redwood Shores, CA (US)

(72) Inventors: Ben Willis, San Francisco, CA (US); Dan Maxwell, Natick, MA (US); Thomas Beecher, York, MA (US); Tom Hegg, Cambridge, MA (US); Sunil Natraj, Pune (IN); Sanjay Parmar, Foster City, CA (US); Shu-Hua Chang, Los Altos, CA (US)

(73) Assignee: Saba Software, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,987

(22) Filed: Mar. 2, 2015

(65) Prior Publication Data

US 2015/0244749 A1  Aug. 27, 2015

Related U.S. Application Data

(63) Continuation of application No. 12/895,709, filed on Sep. 30, 2010, now Pat. No. 8,972,869.

(Continued)

(51) Int. Cl.
*G06F 3/0481* (2013.01)
*G06F 17/30* (2006.01)
*G06F 3/0482* (2013.01)
*G06F 3/0484* (2013.01)
*G06Q 10/10* (2012.01)

(Continued)

(52) U.S. Cl.
CPC ........ *G06F 17/3089* (2013.01); *G06F 3/0482* (2013.01); *G06F 3/04842* (2013.01); *G06F 17/3005* (2013.01); *G06F 17/30893* (2013.01); *G06Q 10/107* (2013.01); *H04L 51/08* (2013.01); *H04L 65/403* (2013.01)

(58) Field of Classification Search
None
See application file for complete search history.

(56) References Cited

U.S. PATENT DOCUMENTS 5,304,648 A   4/1994 Chen
5,717,923 A   2/1998 Dedrick
(Continued)

OTHER PUBLICATIONS

U.S. Appl. No. 12/895,724, filed Sep. 30, 2010, by Ben Willis et al., "Method and System for Analyzing Contribution to a Business Entity".

*Primary Examiner* — Phenuel Salomon

(57) ABSTRACT

A computer-implemented method, computer-readable medium and system for managing a virtual meeting are disclosed. Invitees for a virtual meeting may be automatically determined based upon a selection of one or more groups made using a graphical user interface. Each invitee may be notified of the virtual meeting. Users may conveniently attend the virtual meeting. A recording of the virtual meeting may then be made accessible to members of one or more groups selected using the graphical user interface. In this manner, the setup of a virtual meeting and the distribution of a recording of the virtual meeting can be improved.

18 Claims, 40 Drawing Sheets

Related U.S. Application Data

(60) Provisional application No. 61/247,478, filed on Sep. 30, 2009.

(51) Int. Cl.
*H04L 12/58* (2006.01)
*H04L 29/06* (2006.01)

(56) References Cited

U.S. PATENT DOCUMENTS

| | | | |
|---|---|---|---|
| 5,734,823 A | 3/1998 | Saigh et al. | |
| 5,754,939 A | 5/1998 | Herz et al. | |
| 5,933,827 A | 8/1999 | Cole et al. | |
| 5,980,096 A | 11/1999 | Thalhammer-Reyero | |
| 6,064,980 A | 5/2000 | Jacobi et al. | |
| 6,629,129 B1* | 9/2003 | Bookspan | G06Q 10/10 709/204 |
| 6,654,748 B1 | 11/2003 | Rabung et al. | |
| 6,688,891 B1 | 2/2004 | Sanford | |
| 6,853,398 B2* | 2/2005 | Malzbender | A63F 13/12 348/14.08 |
| 7,043,489 B1 | 5/2006 | Kelley | |
| 7,044,741 B2 | 5/2006 | Leem | |
| 7,153,137 B2 | 12/2006 | Altenhofen et al. | |
| 7,177,904 B1 | 2/2007 | Mathur et al. | |
| 7,395,508 B2 | 7/2008 | Hintermeister et al. | |
| 7,496,605 B2 | 2/2009 | Sudhi et al. | |
| 7,765,478 B2* | 7/2010 | Reed | G06Q 10/109 715/706 |
| 7,822,631 B1 | 10/2010 | Vander Mey et al. | |
| 7,930,304 B1 | 4/2011 | Rainwater et al. | |
| 8,010,902 B2 | 8/2011 | Reiser et al. | |
| 8,223,186 B2* | 7/2012 | Derocher | H04N 7/15 348/14.01 |
| 8,260,656 B1 | 9/2012 | Harbick et al. | |
| 8,554,129 B2 | 10/2013 | Timbadia et al. | |
| 8,972,869 B1 | 3/2015 | Willis et al. | |
| 9,009,082 B1 | 4/2015 | Marshall et al. | |
| 9,256,695 B1 | 2/2016 | Willis et al. | |
| 2002/0049738 A1 | 4/2002 | Epstein | |
| 2003/0036947 A1 | 2/2003 | Smith, III et al. | |
| 2003/0083892 A1 | 5/2003 | Ramachandran et al. | |
| 2003/0084101 A1 | 5/2003 | Wong | |
| 2003/0088545 A1 | 5/2003 | Subramaniam et al. | |
| 2003/0232318 A1 | 12/2003 | Altenhofen et al. | |
| 2004/0015367 A1* | 1/2004 | Nicastro | G06Q 10/06 705/300 |
| 2004/0117446 A1* | 6/2004 | Swanson | 709/205 |
| 2004/0196306 A1 | 10/2004 | Manto et al. | |
| 2004/0249967 A1* | 12/2004 | Swanson | 709/231 |
| 2005/0053908 A1 | 3/2005 | Satheesh et al. | |
| 2005/0136388 A1 | 6/2005 | de Saint-Aignan et al. | |
| 2005/0235291 A1 | 10/2005 | Kamiya et al. | |
| 2005/0278297 A1 | 12/2005 | Nelson | |
| 2006/0200434 A1 | 9/2006 | Flinn et al. | |
| 2006/0242554 A1 | 10/2006 | Gerace et al. | |
| 2007/0067185 A1 | 3/2007 | Halsted | |
| 2007/0156627 A1 | 7/2007 | D'Alicandro | |
| 2007/0198510 A1 | 8/2007 | Ebanks | |
| 2007/0214259 A1 | 9/2007 | Ahmed et al. | |
| 2007/0220279 A1 | 9/2007 | Northcutt et al. | |
| 2007/0239610 A1 | 10/2007 | Lemelson | |
| 2007/0260685 A1* | 11/2007 | Surazski | G06Q 10/10 709/204 |
| 2008/0005101 A1 | 1/2008 | Chandra | |
| 2008/0033725 A1 | 2/2008 | Peak et al. | |
| 2008/0065406 A1 | 3/2008 | Adelman et al. | |
| 2008/0109244 A1 | 5/2008 | Gupta | |
| 2008/0109408 A1 | 5/2008 | Choi et al. | |
| 2008/0114628 A1* | 5/2008 | Johnson | G06Q 10/06 707/792 |
| 2008/0172446 A1 | 7/2008 | Donovan et al. | |
| 2008/0222108 A1* | 9/2008 | Prahlad | G06F 17/30616 |
| 2008/0270906 A1 | 10/2008 | Reddy | |
| 2008/0307311 A1 | 12/2008 | Eyal | |
| 2009/0006982 A1* | 1/2009 | Curtis | G06Q 10/10 715/753 |
| 2009/0010439 A1 | 1/2009 | Okamoto et al. | |
| 2009/0024741 A1 | 1/2009 | Roach | |
| 2009/0070426 A1 | 3/2009 | McCauley et al. | |
| 2009/0077062 A1 | 3/2009 | Spivack et al. | |
| 2009/0106307 A1 | 4/2009 | Spivack | |
| 2009/0119590 A1 | 5/2009 | Kondziela et al. | |
| 2009/0132482 A1 | 5/2009 | O'Sullivan et al. | |
| 2009/0144075 A1 | 6/2009 | Flinn et al. | |
| 2009/0144808 A1 | 6/2009 | Dhananjaya | |
| 2009/0157667 A1 | 6/2009 | Brougher et al. | |
| 2009/0165128 A1 | 6/2009 | McNally et al. | |
| 2009/0181659 A1* | 7/2009 | Stalnacke | G06Q 10/1093 455/416 |
| 2009/0192845 A1 | 7/2009 | Gudipaty et al. | |
| 2009/0216859 A1 | 8/2009 | Dolling | |
| 2009/0249226 A1* | 10/2009 | Manolescu | G06F 3/04815 715/757 |
| 2009/0254529 A1 | 10/2009 | Goldentouch | |
| 2009/0259526 A1 | 10/2009 | Bechtel et al. | |
| 2009/0265737 A1 | 10/2009 | Issa et al. | |
| 2009/0292548 A1 | 11/2009 | Van Court | |
| 2009/0292930 A1 | 11/2009 | Marano et al. | |
| 2009/0299812 A1 | 12/2009 | Ray | |
| 2009/0300712 A1 | 12/2009 | Kaufmann et al. | |
| 2009/0313224 A1 | 12/2009 | Fields et al. | |
| 2010/0023506 A1 | 1/2010 | Sahni et al. | |
| 2010/0037324 A1 | 2/2010 | Grant et al. | |
| 2010/0042618 A1 | 2/2010 | Rinearson et al. | |
| 2010/0042928 A1 | 2/2010 | Rinearson | |
| 2010/0046842 A1 | 2/2010 | Conwell | |
| 2010/0088182 A1 | 4/2010 | Ryder et al. | |
| 2010/0175004 A1* | 7/2010 | Deep | 715/758 |
| 2010/0205628 A1 | 8/2010 | Davis et al. | |
| 2010/0275128 A1 | 10/2010 | Ward et al. | |
| 2010/0302345 A1* | 12/2010 | Baldino et al. | 348/14.08 |
| 2010/0313250 A1 | 12/2010 | Chow | |
| 2011/0212430 A1 | 9/2011 | Smithmier et al. | |
| 2014/0032486 A1 | 1/2014 | Sharma et al. | |

* cited by examiner

| | | |
|---|---|---|
| Simple Security Role Details: Super User | | |
| | | * = required |
| Security Role* | Super User | |
| Description | Grants access to all functionality in | |
| Domain* | world | |

Components | Reports | People

| Component | Person, External | |
|---|---|---|

Component Privileges     View All Grants | Print | Export | Modify Table

| Grant Access | Privilege |
|---|---|
| ☑ | Person - New |
| ☑ | Person - Edit |
| ☑ | Person - Delete |
| ☑ | Person - View |
| ☑ | Person - Change Domain |
| ☑ | Tags - Can Delete Entity Tags from System |
| ☑ | Social - Can flag items |
| ☑ | Social - Can certify items |

410 { Social - Can flag items
420 { Social - Can certify items

From: Saba Social Admin [mailto:social-admin@sabasocial.com]
Sent: Friday, May 21, 2010 2:57 PM
To: Ben Willis
Subject: Natasha Badmaeva contributed Using Tags in Saba Social to Saba Social 1110 — Natasha Badmaeva just flagged the following resource to Saba Social: Using Tags in Saba Social

Use the link below to review & validate this action:
http://sabasocial.saba.com/Saba/Web_spf/common/resources/resourcedetail/simrs000000000083191
— 1120

UNSUBSCRIBE?
You are receiving this email because you are following Natasha Badmaeva.
Click here to unsubscribe from this email or edit your settings:
http://sabasocial.saba.com/Saba/Web_spf/common/personconnectdetails/persn000000000001825

*Knowledge Sharing powered by Saba Social | Copyright 2010, Saba*

| Centra Events | | |
| --- | --- | --- |
| New Event   Meet Now | | |
| Event Name | Start Date | Attend |
| New Green Project Kickoff | 09/06/2010 9:15 PM | Lead |
| Upcoming Deliverables | 06/17/2010 4:00 PM | Lead |
| Micro-groove design Meeting - What worked!! | 06/16/2010 6:45 AM | Lead |

METHOD AND SYSTEM FOR MANAGING A VIRTUAL MEETING

RELATED APPLICATIONS

The present application is a continuation application of U.S. patent application Ser. No. 12/895,709, filed on Sep. 30, 2010, entitled "METHOD AND SYSTEM FOR MANAGING A VIRTUAL MEETING," which claims the priority and benefit to U.S. Provisional Patent Application No. 61/247,478, filed Sep. 30, 2009, entitled "ENTERPRISE SOCIAL NETWORKING," naming Gaurav Mehra and Ben Willis as inventors. That foregoing patent applications are incorporated herein by reference in their entirety and for all purposes.

The present application is related to U.S. patent application Ser. No. 12/895,724, filed Sep. 30, 2010, entitled "METHOD AND SYSTEM FOR ANALYZING CONTRIBUTION TO A BUSINESS ENTITY," naming Ben Willis, Sunil Natraj, and Atin Chawra as inventors. That application is incorporated herein by reference in its entirety and for all purposes.

The present application is related to U.S. patent application Ser. No. 12/895,741, filed Sep. 30, 2010, entitled "METHOD AND SYSTEM FOR SHARING CONTENT," naming Ben Willis, Sunil Natraj, Abhijeet Shinde, Tarun Agarwal, Ratish Puduppully, Shu-Hua Chang, and Santhi Swaroop Pulagala as inventors. That application is incorporated herein by reference in its entirety and for all purposes.

BACKGROUND OF THE INVENTION

Virtual meetings are typically conducted between users at remote locations over the Internet. Conventional solutions for setting up and conducting virtual meetings require users to manually add invitees for the meeting. Emails are sent to the invitees to notify them of the meeting.

To attend an online meeting, conventional solutions typically require a user to download a software application which enables the user to attend the virtual meeting. Once the application is executed by the user's computer system, the user can enter authentication information and join the virtual meeting.

Conventional solutions enable users to record audio or video from the meeting. The recording can be sent to invitees as an attachment to an email. Alternatively, the recording can be shared on a server or the like.

Although conventional solutions offer virtual meetings to be managed, they are often inconvenient and tedious to use. For example, a user is required to manually add each invitee to be notified. As another example, a software application must be purchased and downloaded to enable a invitee to attend the virtual meeting. And as a further example, a user must manually add recipients to receive a recording of the virtual meeting.

SUMMARY OF THE INVENTION

Accordingly, a need exists to more conveniently and efficiently manage virtual meetings. A need also exists to improve the ability to setup a virtual meeting. Additionally, a need exists to improve distribution of a recording of the virtual meeting. Embodiments of the present invention provide novel solutions to these needs and others as described below.

Embodiments of the present invention are directed to a computer-implemented method, computer-readable medium and system for managing a virtual meeting. More specifically, invitees for a virtual meeting may be automatically determined based upon a selection of one or more groups (e.g., each including at least one respective member associated with a business entity) made using a graphical user interface. Each invitee may be notified of the virtual meeting (e.g., by displaying in a graphical user interface enabling a user to attend the virtual meeting, by sending a respective email (e.g., electronic mail message) to each user which includes a link enabling the user to attend the virtual meeting, etc.). Users may conveniently attend the virtual meeting (e.g., using a web browser plug-in, using an application separate from a web browser, etc.). A recording of the virtual meeting (e.g., including audio, video, etc.) may then be made accessible to members of one or more groups selected using the graphical user interface. In this manner, the setup of a virtual meeting and the distribution of a recording of the virtual meeting can be improved.

In one embodiment, a computer-implemented method of managing a virtual meeting includes determining a first plurality of users associated with a first group, wherein the first group is associated with a business entity. The first plurality of users are notified of the virtual meeting. Access to a recording of the virtual meeting is provided to a second plurality of users associated with a second group, wherein the second group is associated with the business entity.

In another embodiment, a computer-readable medium may have computer-readable program code embodied therein for causing a computer system to perform a method of managing a virtual meeting. And in yet another embodiment, a system may include a processor and a memory, wherein the memory includes instructions that when executed by the system implement a method of managing a virtual meeting.

In yet another embodiment, a graphical user interface may include a first region for inviting a first plurality of users to attend a virtual meeting, wherein the first region is operable to enable a selection of a first group associated with the first plurality of users, and wherein the first group is associated with a business entity. The graphical user interface may also include a second region for controlling access of a second plurality of users to a recording of the virtual meeting, wherein the second region is operable to enable a selection of a second group associated with the second plurality of users, and wherein the second group is associated with the business entity.

BRIEF DESCRIPTION OF THE DRAWINGS

The present invention is illustrated by way of example, and not by way of limitation, in the figures of the accompanying drawings and in which like reference numerals refer to similar elements.

FIG. 3 shows an exemplary on-screen graphical user interface for creating a user in accordance with one embodiment of the present invention.

FIG. 4 shows an exemplary on-screen graphical user interface for configuring privileges of a user in accordance with one embodiment of the present invention.

FIG. 11 shows an exemplary on-screen graphical user interface depicting an email to an administrative user about a change in state of content in accordance with one embodiment of the present invention.

FIG. 13 shows an exemplary on-screen graphical user interface for configuring one or more groups associated with content in accordance with one embodiment of the present invention.

FIG. 21 shows an exemplary on-screen graphical user interface for displaying information about one or more virtual meetings for another user in accordance with one embodiment of the present invention.

DETAILED DESCRIPTION OF THE INVENTION

Figure 1:
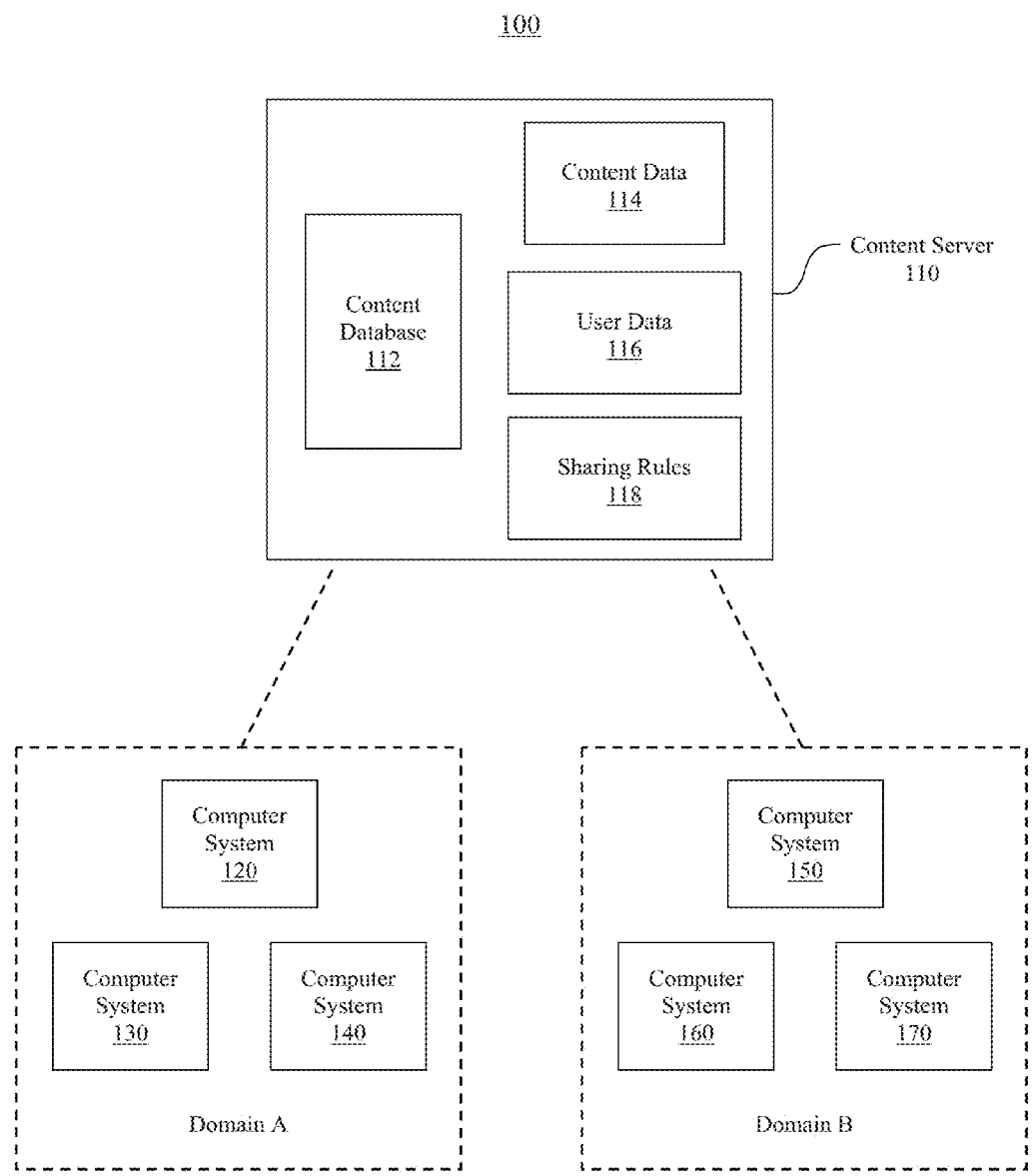
FIG. 1 shows an exemplary system for sharing information in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "analyzing," "applying," "assembling," "assigning," "calculating," "capturing," "collecting," "combining," "communicating," "comparing," "conducting," "creating," "defining," "depicting," "detecting," "determining," "displaying," "establishing," "executing," "facilitating," "filtering," "generating," "grouping," "identifying," "initiating," "interacting," "modifying," "monitoring," "moving," "notifying," "outputting," "performing," "placing," "presenting," "processing," "programming," "providing," "querying," "removing," "repeating," "sampling," "sorting," "storing," "subtracting," "tracking," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Sharing Content

FIG. 1 shows exemplary system 100 for sharing information in accordance with one embodiment of the present invention. As shown in FIG. 1, content server 110 may be used to share content (e.g., stored in content database 112) between a plurality of computer systems (e.g., 120, 130, 140, 150, 160, 170, etc.). The content may include at least one electronic document including text, at least one link, at least one blog entry, at least one image, at least one video, audio data, at least one list of bookmarked content, at least one list of bookmarked users, some combination thereof, etc. The computer systems may be organized into domains in one embodiment, where each domain may be associated with a different business entity (e.g., a corporation, partnership, non-profit organization, individual, etc.). Content uploaded to content database 112 may be advantageously associated with at least one group (e.g., using graphical user interface (GUI) 700 of FIG. 7), where each group may be associated with a different department within the business, a different task, a different concept, etc. A search for content within content database 112 may be advantageously limited to one or more of the groups (e.g., by a selection made using GUI 900 of FIG. 9). As such, embodiments of the present invention may enable users to access more relevant content by increasing the relevance of the results returned to a user (e.g., displayed using GUI 1000A of FIG. 10A).

In one embodiment, one or more of the GUIs discussed herein (e.g., GUI 300 of FIG. 3, GUI 400 of FIG. 4, GUI 500 of FIG. 5, GUI 600 of FIG. 6, GUI 700 of FIG. 7, GUI 800 of FIG. 8, GUI 900 of FIG. 9, GUI 1000A of FIG. 10A, GUI 1100 of FIG. 11, GUI 1200 of FIG. 12, GUI 1300 of FIG. 13, etc.) may be displayed using a web browser executed by a computer system. The GUIs may be advantageously displayed using code downloaded and executed by the computer system (e.g., similar to a web browser plug-in) with reduced user interaction and/or user awareness. Alternatively, one or more of the GUIs discussed herein (e.g., GUI 300 of FIG. 3, GUI 400 of FIG. 4, GUI 500 of FIG. 5, GUI 600 of FIG. 6, GUI 700 of FIG. 7, GUI 800 of FIG. 8, GUI 900 of FIG. 9, GUI 1000A of FIG. 10A, GUI 1100 of FIG. 11, GUI 1200 of FIG. 12, GUI 1300 of FIG. 13, etc.) may be displayed using an application executed by the computer system which is separate from a web browser.

Sharing rules 118 may include rules governing how content is shared using content server 110. For example, sharing rules 118 may allow sharing of content between users of different domains. As another example, sharing rules 118 may restrict sharing of content between users of different domains. As yet another example, sharing rules 118 may allow sharing of content between users of the same domain so long as they are members of same group or groups.

Access to content stored in content database 112 may be controlled by content server 110 using content data 114 and/or user data 116. For example, content data 114 may be used to track a domain associated with each portion of content. The respective domain associated with each portion of content may be determined based upon the domain associated with the user contributing the content (e.g., stored as part of user data 116) in one embodiment. In this manner, access to a portion of content may be provided to members of a business which are associated with (e.g., members of) the domain associated with the portion of content (e.g., provided sharing rules 118 allow sharing of content between users of different domains).

As another example, content data 114 may be used to track at least one group associated with each portion of content. The respective group or groups associated with each portion of content may be determined based upon the group or groups associated with the user contributing the content (e.g., stored as part of user data 116) in one embodiment. In this manner, access to a portion of content may be provided to members of a business which are associated with (e.g., members of) the group or groups corresponding to the portion of content.

Figure 27:
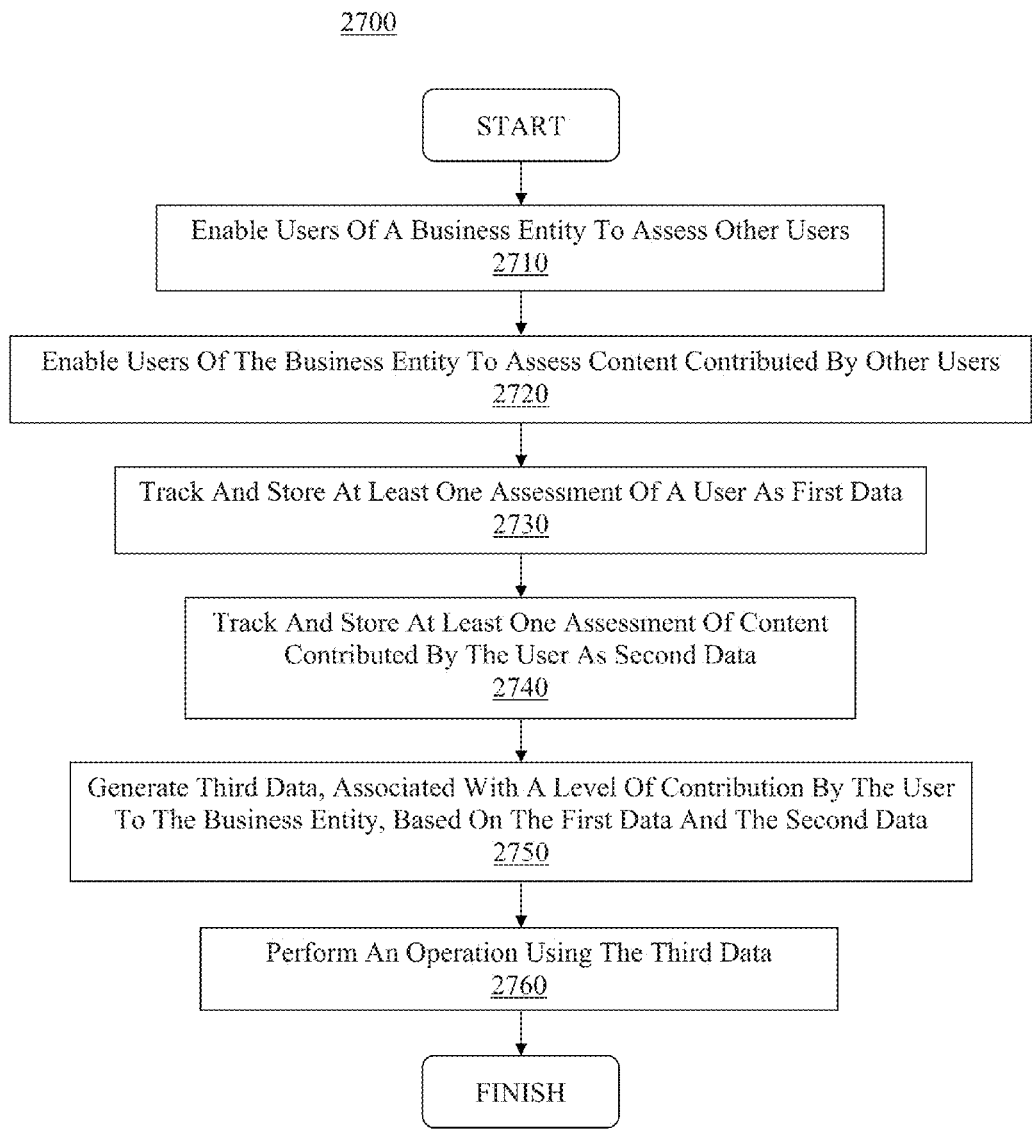
FIG. 27 shows a flowchart of an exemplary computer-implemented process for analyzing and/or reporting contribution to a business entity in accordance with one embodiment of the present invention.

As shown in FIG. 1, one or more of the computer systems of a first domain (e.g., computer system 120, computer system 130, computer system 140, some combination thereof, etc.) may be implemented in accordance with computer system 2700 of FIG. 27 in one embodiment. One or more of the computer systems of a second domain (e.g., computer system 150, computer system 160, computer system 170, some combination thereof, etc.) may be implemented in accordance with computer system 2700 of FIG. 27 in one embodiment. And in one embodiment, content server 110 may be implemented in accordance with computer system 2700 of FIG. 27.

Figure 2:
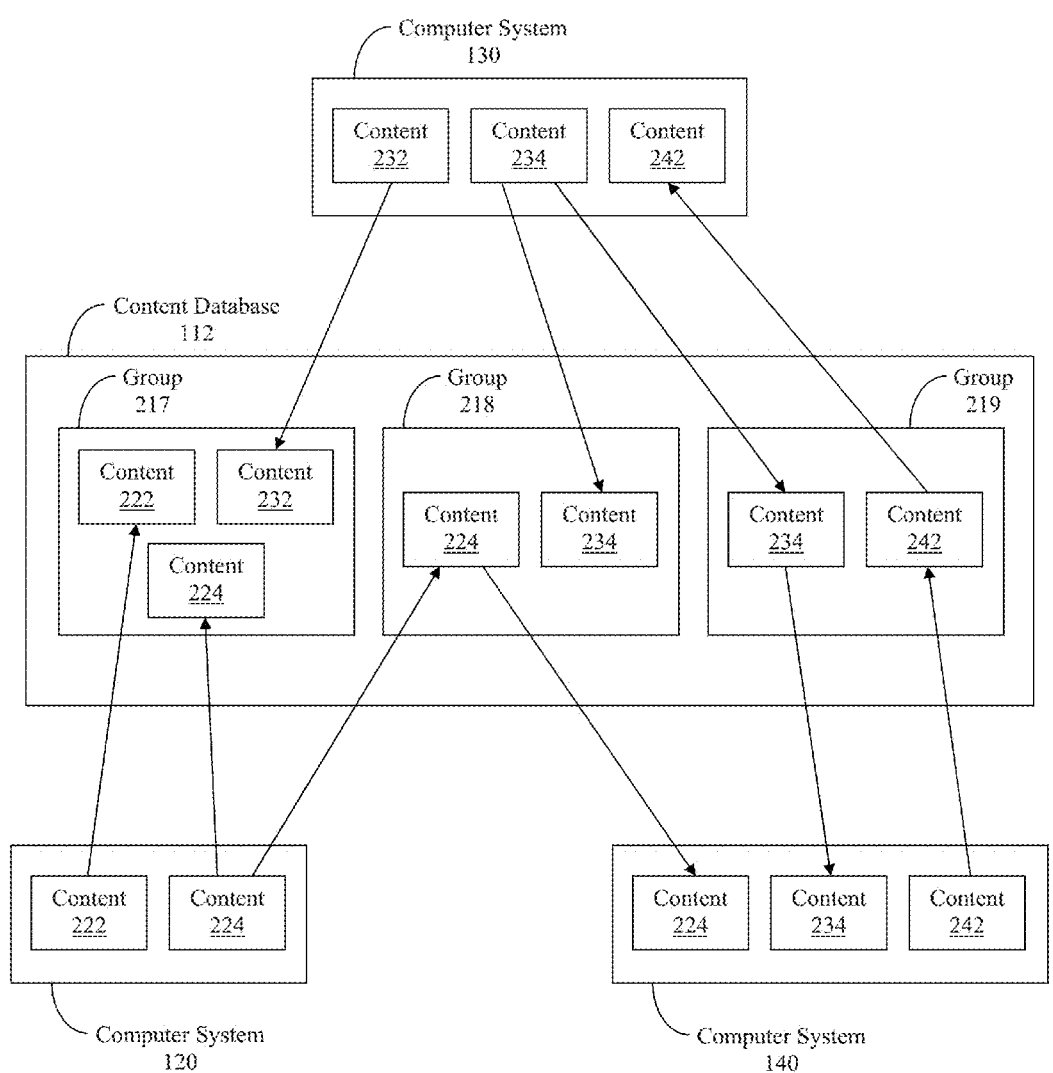
FIG. 2 shows a diagram illustrating an exemplary grouping of content in accordance with one embodiment of the present invention.

FIG. 2 shows diagram 200 illustrating an exemplary architecture for grouping content in accordance with one embodiment of the present invention. As shown in FIG. 2, each portion of content stored within content database may be associated with one or more groups (e.g., 217, 218, 219, etc.). For example, content 222, content 232 and content 224 may be associated with group 217. As another example, content 224 and content 234 may be associated with group 218. And as yet another example, content 234 and 242 may be associated with group 217. In one embodiment, the association between a particular portion of content and at least one group may be tracked or stored by content server 110 as content data 114. Additionally, it should be appreciated that multiple instances of same content (e.g., 224) may reside in content database 112, or alternatively, fewer instances of the content may reside in content database 112 which are associated with the multiple groups (e.g., one instance of content 224 may reside in content database 112 which is associated with groups 217 and 218 via content data 114).

In one embodiment, a user contributing content may associate content with one or more groups which are also associated with the user contributing the content (e.g., as stored or tracked using user data 116). For example, a user of computer system 120 may be associated with at least one group (e.g., 217 and 218), and therefore, the user of computer system 120 may associate content (e.g., 222 and 224) with the at least one group (e.g., 217 and/or 218) which is also associated with the user of computer system 120. As another example, a user of computer system 130 may be associated with at least one group (e.g., 217, 218 and 219), and therefore, the user of computer system 120 may associate content (e.g., 232 and 234) with the at least one group (e.g., 217, 218, 219, or some combination thereof) which is also associated with the user of computer system 130. As yet another example, a user of computer system 140 may be associated with at least one group (e.g., 218 and 219), and therefore, the user of computer system 140 may associate content (e.g., 242) with the at least one group (e.g., 218 and/or 219) which is also associated with the user of computer system 140.

A user may access content which is associated with one or more groups which are also associated with the user accessing the content (e.g., as stored or tracked using user data 116) in one embodiment. For example, a user of computer system 120 may be associated with at least one group (e.g., 217 and 218), and therefore, the user of computer system 120 may access content which is associated with the at least one group (e.g., 217 and/or 218) which is also associated with the user of computer system 120. As another example, a user of computer system 130 may be associated with at least one group (e.g., 217, 218 and 219), and therefore, the user of computer system 120 may access content (e.g., 242) which is associated with the at least one group (e.g., 217, 218, 219, or some combination thereof) which is also associated with the user of computer system 130. As yet another example, a user of computer system 140 may be associated with at least one group (e.g., 218 and 219), and therefore, the user of computer system 140 may access content (e.g., 224 and 234) which is associated with the at least one group (e.g., 218 and/or 219) which is also associated with the user of computer system 140.

Accordingly, access to content may be controlled by configuring the association between content (e.g., stored within content database 112) and at least one group (e.g., defined by content data 114) and/or by configuring the association between users and at least one group (e.g., defined by user data 116). For example, the association between a portion of content and at least one group (e.g., defined by content data 114) may be changed to control which user or users can access the portion of content. As another example, the association between a user and at least one group (e.g., defined by user data 116) may be changed to control which content the user can access.

The use of groups may also enable users to access more relevant content. For example, where each of the groups depicted in FIG. 2 is associated with a different department within a company, a user from the engineering department may determine that group 219 is unlikely to contain relevant content since it is associated with the human resources department. As such, a search for content may be performed which excludes group 219 (e.g., and is limited to groups 218 and 218), thereby reducing the number of irrelevant results and/or increasing the number of potentially relevant results.

In one embodiment, a user may flag content stored in content database 112. For example, once a search has been performed and results are displayed (e.g., using GUI 1000A of FIG. 10A), a user may flag one or more of the results (e.g., by interacting with region 1020 of FIG. 10A). Content may be flagged as being outdated, inappropriate, irrelevant to a particular group (e.g., a user contributing the content made the content accessible to a group which is not relevant to the content), etc. Once the content is flagged, it may be taken out of circulation such that it is excluded from the search results of subsequent searches (e.g., pending review by an administrative user who can delete the content, unflag or remove the flag associated with the content, certify the content, etc.). In this manner, the relevance of the search results may be increased by enabling users to distinguish unflagged content from flagged content.

A user may certify content stored in content database 112 in one embodiment. For example, once a search has been performed and results are displayed (e.g., using GUI 1000A of FIG. 10A), a user may certify one or more of the results (e.g., by interacting with region 1030 of FIG. 10A). Certification may represent an approval, level of quality or respect for, trustworthiness of, etc. a particular portion of content. In one embodiment, the ability to certify content may be limited to a particular class or classes of users (e.g., more senior employees with more experience, experts in a field, etc.). A user may be unable to flag certified content in one embodiment. Additionally, in one embodiment, searches for content (e.g., performed using GUI 900 of FIG. 9) may be limited to certified content (e.g., by selecting or interacting with region 940 of FIG. 9). In this manner, the relevance of the search results may be increased by enabling users to distinguish certified content from uncertified content.

As shown in FIG. 1, the state (e.g., flagged, unflagged, certified, uncertified, etc.) of content stored in content database 112 may be tracked using content data 114. Accordingly, responsive to a change in state of the content (e.g., from unflagged to flagged, from flagged to unflagged, from uncertified to certified, from certified to uncertified, etc.), the state of the content may be updated accordingly in content data 114.

User data 116 may be used to track privileges of one or more users. For example, user data 116 may indicate whether or not a user is able to flag content (e.g., as configured by an administrative user using GUI 400 of FIG. 4). As another example, user data 116 may indicate whether or not a user is able to certify content (e.g., as configured by an administrative user using GUI 400 of FIG. 4).

In one embodiment, users of one domain (e.g., including computer systems 120, 130 and 140 of FIG. 1) may be unable to access or have limited access to content associated with another domain (e.g., including computer systems 150, 160 and 170 of FIG. 1) as defined by sharing rules 118. A respective domain associated with each portion of content stored in content database 112 may be stored in or tracked using content data 114. As such, where each domain is associated with a different business entity (e.g., a company, a customer of the company, a partner of the company, etc.), confidential content may be shared within a domain while restricting access to the confidential content by users of other domains.

Administrative users (e.g., users with more privileges than a normal user) may manage content stored in content database 112. For example, an administrative user may modify content data 114 to change a state (e.g., flagged, unflagged, certified, uncertified, etc.) of a portion of content (e.g., using GUI 1200 of FIG. 12), at least one domain associated with a portion of content (e.g., using GUI 1200 of FIG. 12), at least one group associated with a portion of content (e.g., using GUI 1300 of FIG. 13), etc.

Administrative users may also manage users in one embodiment. For example, an administrative user may create a user (e.g., using GUI 200 of FIG. 2) and/or delete a user. As another example, an administrative user may modify the privileges of a user (e.g., using GUI 300 of FIG. 3).

Although FIG. 1 shows a specific number and arrangement of components, it should be appreciated that system 100 may have a different number and/or arrangement of computer systems, servers, domains, some combination thereof, etc. in other embodiments. Additionally, although FIG. 1 shows content server 110 with specific components (e.g., content database 112, content data 114, user data 116, sharing rules 118, etc.), it should be appreciated that content server 110 may have a different number of components in other embodiments. For example, content database 112 may be located externally to content server 110 in one embodiment.

Although FIG. 2 shows only three groups, it should be appreciated that any number of groups may be used in other embodiments. Although FIG. 2 shows a specific number of portions of content associated with each group, it should be appreciated that any number of portions of content may be associated with each group in other embodiments. Additionally, although FIG. 2 shows a specific number of computer systems, it should be appreciated that any number of computer systems may be used in other embodiments. Although FIG. 2 shows a specific number of portions of content associated with each computer system, it should be appreciated that any number of portions of content may be associated with each computer system in other embodiments. Further, although FIG. 2 has been described with respect to a specific association between groups and users, it should be appreciated that any association between groups and users may be used in other embodiments. Although FIG. 2 has been described with respect to a specific association between groups and content, it should be appreciated that any association between groups and content may be used in other embodiments.

FIGS. 3 through 13 show exemplary on-screen graphical user interfaces (GUIs) for sharing or contributing content, accessing shared content, managing shared content, etc. The GUIs depicted in FIGS. 3 through 13 may be displayed on a display device of a computer system (e.g., 120, 130, 140, 150, 160, 170, etc.) responsive to the execution of software by the computer system. In one embodiment, multiple instances of the software may be executed contemporaneously by multiple computer systems. And in one embodiment, certain GUIs may be used by administrative users (e.g., GUI 300, GUI 400, GUI 1100, GUI 1200, GUI 1300, etc.), while other GUIs may be used by normal users or users with fewer privileges (e.g., GUI 500, GUI 600, GUI 700, GUI 800, GUI 900, GUI 1000A, etc.).

Figure 3:
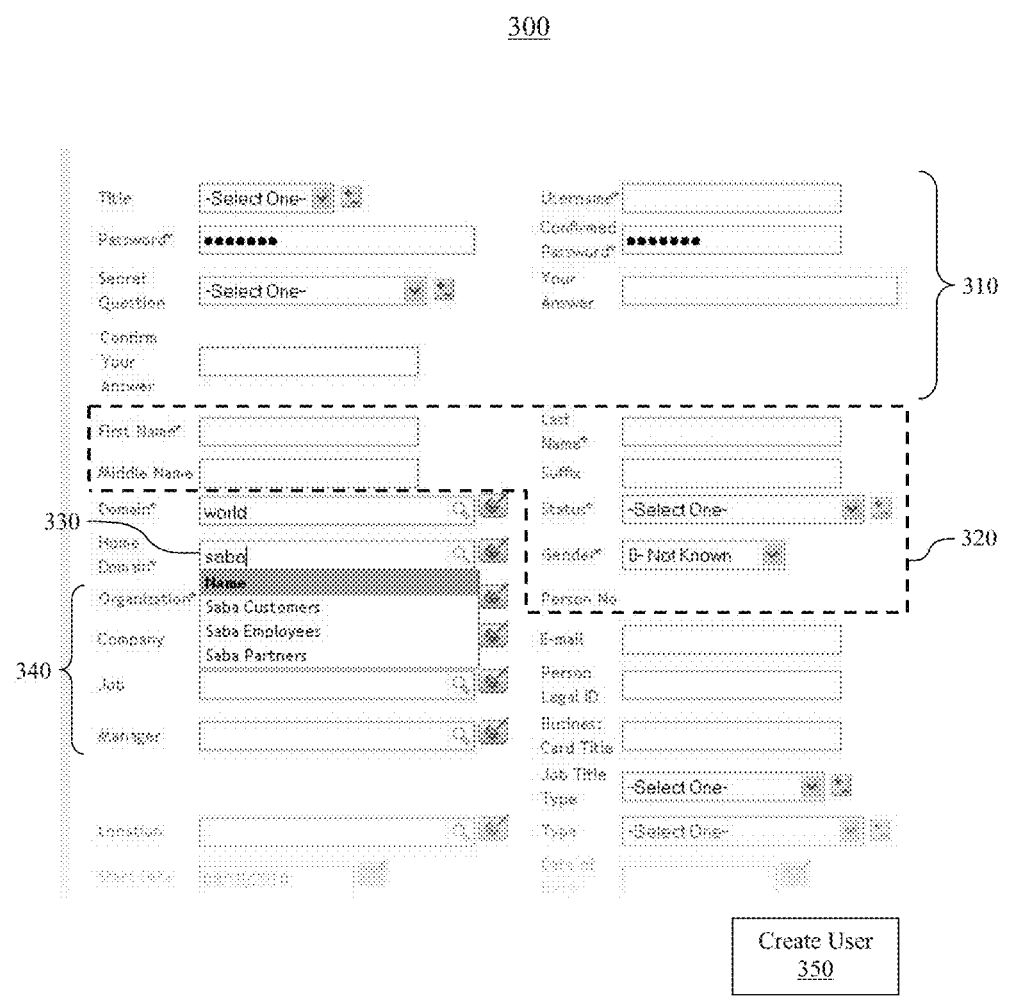

FIG. 3 shows exemplary GUI 300 for creating a user in accordance with one embodiment of the present invention. As shown in FIG. 3, region 310 may include one or more fields enabling entry of authentication information (e.g., username, password, etc.) for a user. The authentication information entered into region 310 may enable a user to login to share or contribute content, access content, etc. Region 320 may include one or more fields enabling entry of personal information (e.g., name, address, gender, etc.) about the user.

As shown in FIG. 3, region 330 may include a field for enabling a domain to be associated with a user. For example, a user may be assigned to a first domain associated with employees of an organization, a second domain associated with customers of an organization, or a third domain associated with partners of an organization. It should be appreciated that other domains may be associated with a user in other embodiments.

Region 340 may include one or more fields enabling entry of professional information (e.g., an organization, job held by the user for the organization, manager of the user, etc.) and/or contact information (e.g., email address, etc.) for a user. Additionally, GUI 300 may include region 350, where an interaction with region 350 (e.g., moving a cursor over region 350 and clicking a mouse button, touching a region of a touch screen corresponding to region 350, etc.) may initiate creation of an account for the user. In one embodiment, information about the user account and/or information entered using GUI 300 may be stored as part of user data 116.

FIG. 4 shows exemplary GUI 400 for configuring privileges of a user in accordance with one embodiment of the present invention. As shown in FIG. 4, region 410 may be used to configure whether or not a user may flag items (e.g., displayed using GUI 1000A of FIG. 10A). Region 420 may be used to configure whether or not a user may certify items (e.g., displayed using GUI 1000A of FIG. 10A). And in other embodiments, GUI 400 may be used to configure other privileges for a user.

Figure 5:
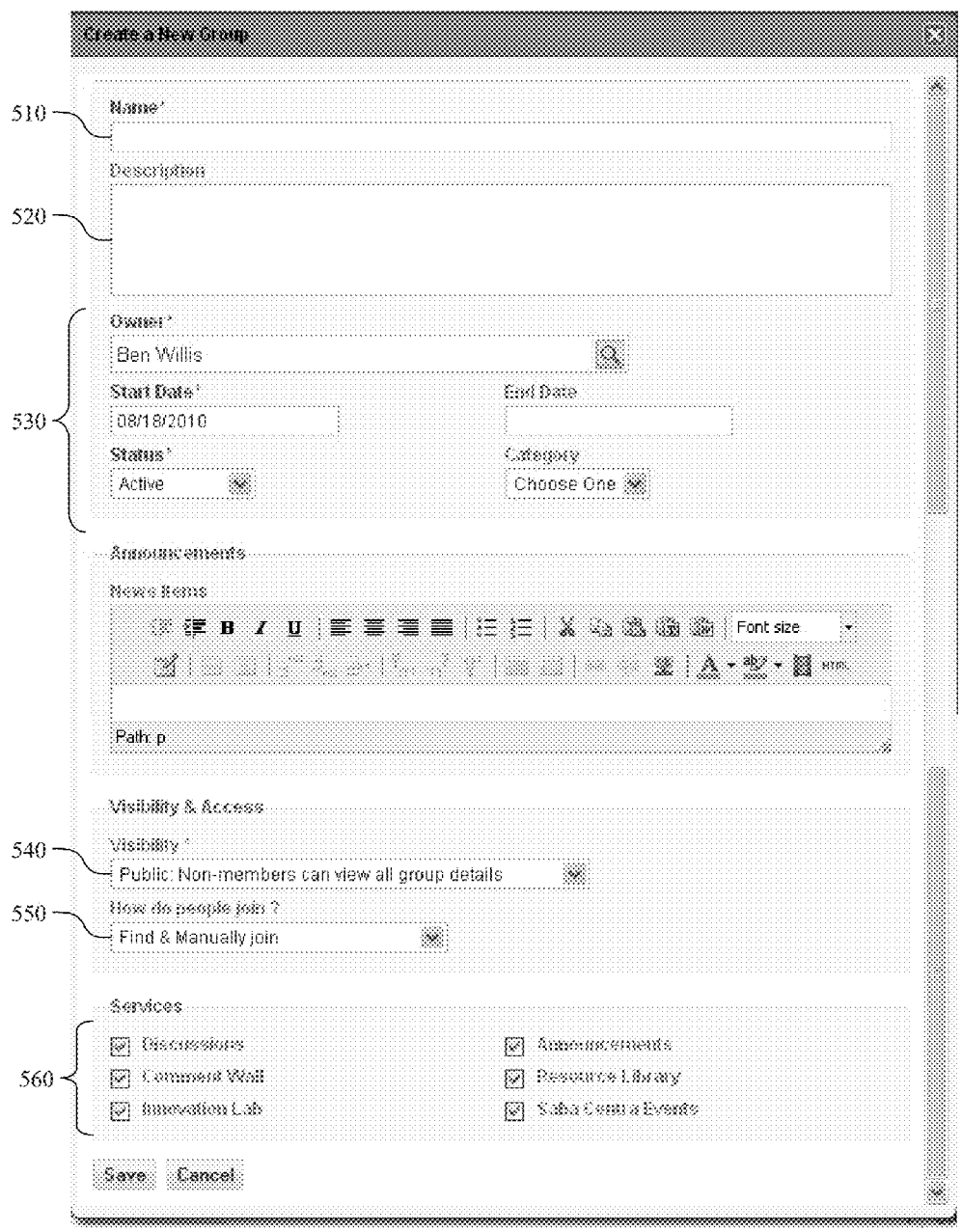
FIG. 5 shows an exemplary on-screen graphical user interface for creating a group in accordance with one embodiment of the present invention.

FIG. 5 shows exemplary GUI 500 for creating a group (e.g., 217, 218, 219, etc.) in accordance with one embodiment of the present invention. As shown in FIG. 5, region 510 may include at least one field enabling entry of a name for a group. Region 520 may include at least one field enabling entry of a description for the group. Region 530 may include at least one field enabling entry other information (e.g., an owner, start date, end date, status, category, etc.) for the group.

Region 540 may be used to control visibility of the group. In one embodiment, region 540 may be used to implement a configuration where non-members of the group can view all or some details about the group. Region 540 may be used to implement a configuration where non-members of the group can view fewer details about the group (e.g., only the name and description of the group) in one embodiment. And in one embodiment, region 540 may be used to implement a configuration where visibility of the group is further restricted (e.g., non-members may be unable to see even the name and/or description of the group).

As shown in FIG. 5, region 550 may be used to control access to the group. In one embodiment, region 550 may be used to implement a configuration where users are able to search for and manually join the group. Region 550 may be used to implement a configuration where users can request to join the group (e.g., by sending a communication or email to the owner of the group) in one embodiment. And in one embodiment, region 550 may be used to implement a configuration where the owner of the group must manually add users to the group.

Region 560 may be used to configure services associated with the group. For example, region 560 may be used to implement configurations where members of the group can access discussions about the group, a comment wall associated with the group, an innovation lab associated with the group, some combination thereof, etc. As another example, region 560 may be used to implement configurations where members of the group can access announcements associated with the group, a resource library associated with the group, a virtual meeting associated with the group, some combination thereof, etc.

Figure 6:
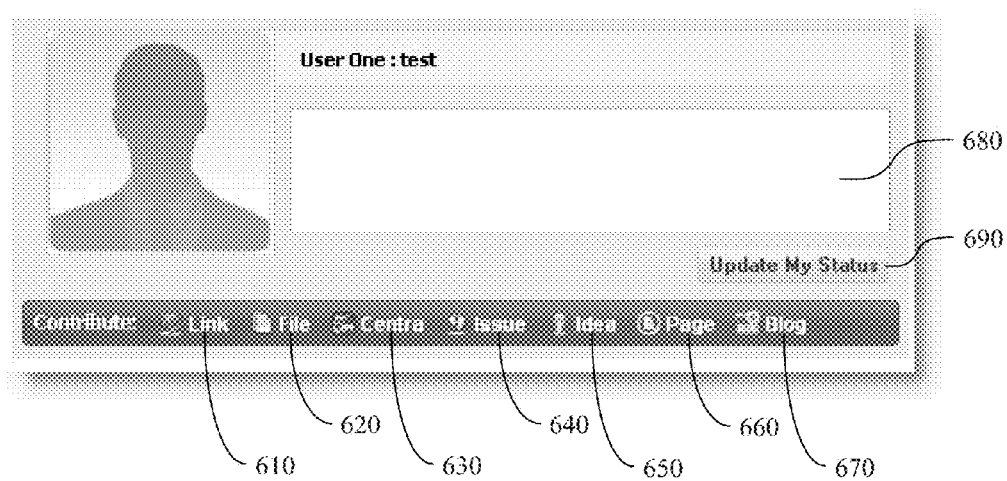
FIG. 6 shows an exemplary on-screen graphical user interface for sharing or contributing content in accordance with one embodiment of the present invention.

FIG. 6 shows exemplary GUI 600 for sharing or contributing content in accordance with one embodiment of the present invention. As shown in FIG. 6, region 610 may enable sharing of a link (e.g., a URL or the like). Region 620 may enable sharing of a file (e.g., a document including text, a PDF, an image, a video, an audio file, etc.). Region 630 may enable a user to access a recorded virtual meeting and/or share content via a virtual meeting. Region 640 may enable reporting of an issue. Region 650 may enable sharing of an idea. Region 660 may enable sharing of a webpage. Region 670 may enable sharing of a blog.

Region 680 may enable a user to enter a status. For example, a user may enter a thought, a feeling, an opinion, or other information that the user wishes to share with another user. Interaction with region 690 may initiate a posting or sharing of the information entered in region 680.

Figure 7:
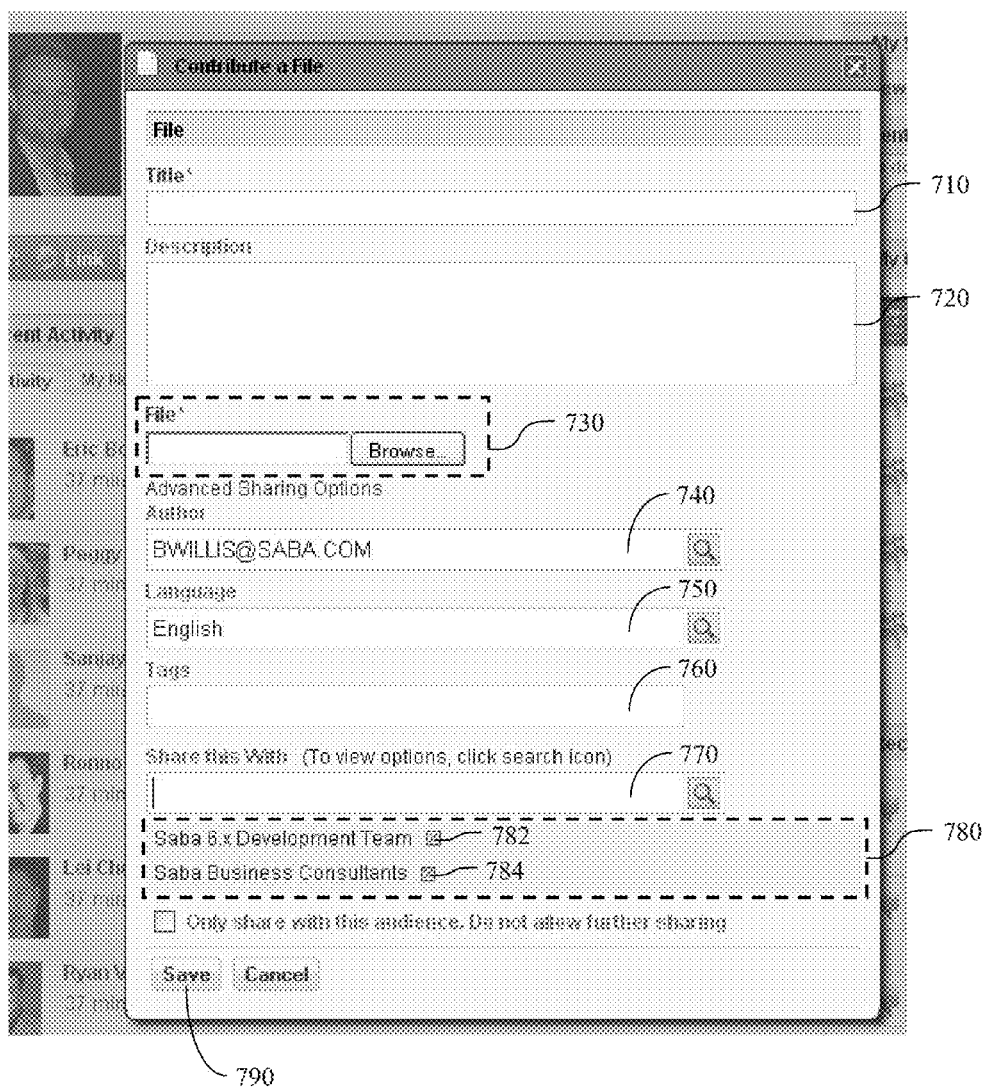
FIG. 7 shows an exemplary on-screen graphical user interface for enabling a user to contribute content and/or configure at least one attribute of the content in accordance with one embodiment of the present invention.
Figure 8:
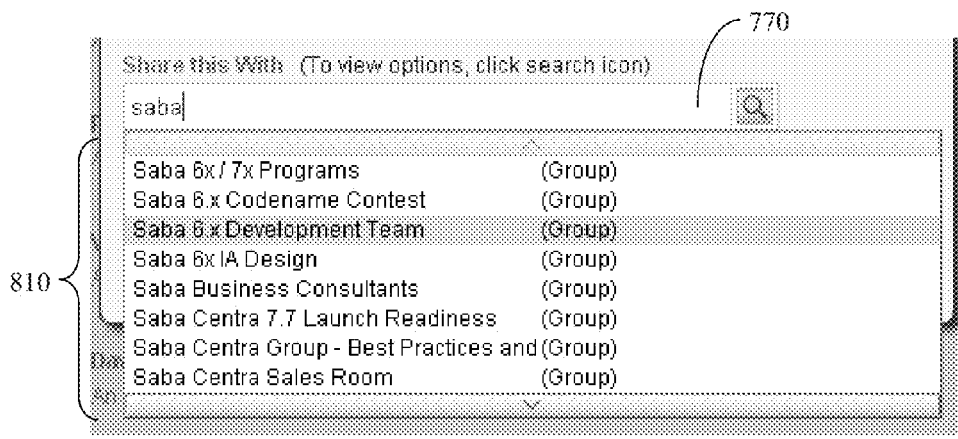
FIG. 8 shows a region of an exemplary on-screen graphical user interface for configuring attributes of content in accordance with one embodiment of the present invention.

FIG. 7 shows exemplary GUI 700 for enabling a user to contribute content and/or configure at least one attribute of the content in accordance with one embodiment of the present invention. In one embodiment, GUI 700 may be displayed responsive to an interaction with GUI 600 of FIG. 6.

As shown in FIG. 7, region 710 may include at least one field enabling entry of a title or name of the content to be shared. Region 720 may include at least one field enabling entry of a description of the content to be shared. Region 730 may include at least one field enabling entry of a location of the content to be shared. Region 740 may include at least one field enabling entry of an author or contributor of the content to be shared. Region 750 may include at least one field enabling entry of a language of the content to be shared. Region 760 may include at least one field enabling entry of a tag associated with the content to be shared.

Region 770 may include at least one field enabling the selection of at least one group (e.g., 217, 218, 219, etc.) and/or at least one user to be associated with the content. For example, a particular group and/or a particular user may be identified by name, title, etc. using region 770. In this manner, embodiments of the present invention may enable the contribution or sharing of content with one or more users associated with a group, with one or more specific users, etc.

In one embodiment, a list of groups and/or users may be automatically displayed in a region (e.g., 810 of FIG. 8) below region 770 responsive to an entry of text in region 770. In one embodiment, the list displayed in the region (e.g., 810) may be determined by performing a search of groups and/or users using the information entered in region 770 as the search query. And in one embodiment, a new search may be performed each time a new character is entered in region 770 (e.g., based upon the information entered in region 770 after the new character is entered), and thus, the list displayed in the region (e.g., 810) may be updated each time a new character is entered in region 770. In this manner, embodiments of the present invention can increase the efficiency, ease, etc. of contributing or sharing content with one or more users associated with a group, with one or more specific users, etc.

As shown in FIG. 7, region 780 may include at least one group and/or at least one user selected using region 770. Region 782 may enable a first group and/or a first user to be removed from the list displayed in region 780. Region 784 may enable another group and/or another user to be removed from the list displayed in region 780.

The content may be contributed or shared responsive to an interaction with region 790 (e.g., moving a cursor over region 790 and clicking a mouse button, touching a region of a touch screen corresponding to region 790, etc.). In one embodiment, an interaction with region 790 may initiate the upload of the content from a computer system of the user (e.g., computer system 120, computer system 130, computer system 140, computer system 150, computer system 160, computer system 170, etc.) to content database 112. In one embodiment, the content may be contributed or shared (e.g., responsive to an interaction with region 790) by modifying content data 114 to associate the content with the at least one group (e.g., selected using region 770, displayed in region 780, etc.) and/or the at least one specific user (e.g., selected using region 770, displayed in region 780, etc.).

Figure 9:
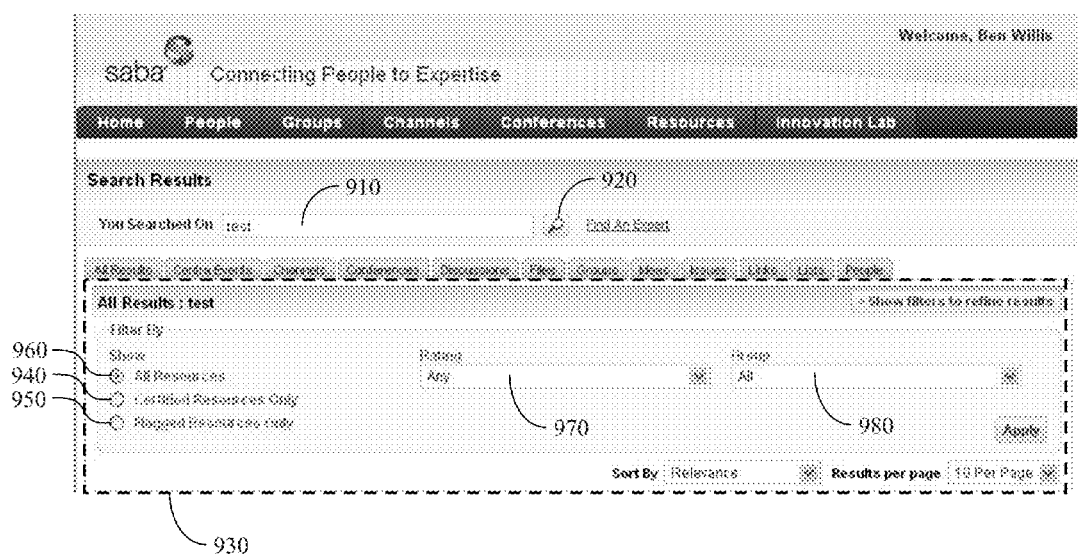
FIG. 9 shows an exemplary on-screen graphical user interface for executing a search for content in accordance with one embodiment of the present invention.

FIG. 9 shows exemplary GUI 900 for executing a search for content in accordance with one embodiment of the present invention. As shown in FIG. 9, region 910 may include at least one field enabling the entry of a search query. An interaction with region 920 may initiate a search for content based upon the search query entered into region 910.

Region 930 may enable a user to control the filtering of search results returned from a search performed using regions 910 and 920. For example, a user (e.g., with sufficient privileges as determined by user data 116) may interact with region 940 to filter the search results to remove content which is not certified (e.g., leaving only results which are certified). As another example, a user (e.g., with sufficient privileges as determined by user data 116) may interact with region 950 to filter the search results to remove content which is not flagged (e.g., leaving only results which are flagged). And as another example, a user may interact with region 960 to deactivate the filtering of search results based upon state (e.g., flagged, unflagged, certified, uncertified, etc.).

Region 970 may enable a user to filter the search results based upon rating (e.g., as determined by users for each portion of content stored in content database 112). Region 980 may enable a user to filter the search results by one or more groups, thereby returning only results which are associated with the one or more groups selected using region 980.

Accordingly, embodiments of the present invention enable filtering of search results based upon various parameters (e.g., state of the content, rating of the content, group or groups the content is associated with, etc.). Filtering of the search results may enable users to access more relevant content, and therefore, embodiments of the present invention may increase the relevance of the results returned to a user (e.g., displayed using GUI 1000A of FIG. 10A).

Figure 10A:
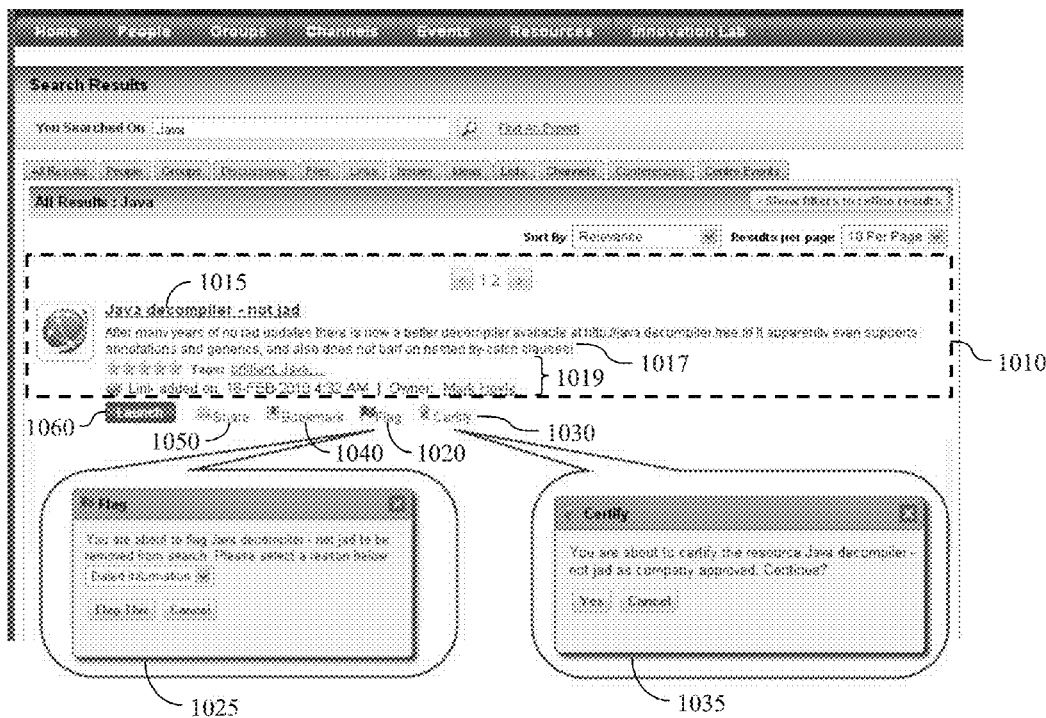
FIG. 10A shows an exemplary on-screen graphical user interface for accessing content and/or changing a state of content in accordance with one embodiment of the present invention.

FIG. 10A shows exemplary GUI 1000A for accessing content and/or changing a state of content in accordance with one embodiment of the present invention. In one embodiment, GUI 1000A may be displayed responsive to an interaction with region 920 of GUI 900.

As shown in FIG. 10A, search results (e.g., from a search performed using GUI 900) may be listed in region 1010. For example, region 1015 may include an identifier or name (e.g., entered using region 710 of GUI 700) associated with a portion of content (e.g., stored in content database 112). Region 1017 may include a description (e.g., entered using region 720 of GUI 700) of the portion of content. Region 1019 may include other information (e.g., a rating associated with the portion of content, at least one tag associated with the portion of content, a link associated with the portion of content, a date and/or time at which the link was added, an owner or contributor of the portion of content, etc.) about the portion of content. In one embodiment, region 1019 may include one or more fields enabling a user to rate a portion of content, tag a portion of content, perform another action with respect to a portion of content, some combination thereof, etc. Although FIG. 10A depicts only one result in region 1010, it should be appreciated that more than one result may be displayed in region 1010 in other embodiments.

Region 1020 may enable a user to flag a portion of content displayed in region 1010. Responsive to an interaction with region 1020, region 1025 may be displayed (e.g., as a pop-up window overlaying a region of GUI 1000A, as a separate GUI in a separate window, etc.) to enable a user to select a reason for flagging the portion of content. For example, a user may use region 1025 to indicate that the portion of content is outdated, inappropriate, irrelevant to a particular group (e.g., a user contributing the content made the content accessible to a group which is not relevant to the content), etc. In one embodiment, the ability to flag content may be limited to a certain users or a certain class of users (e.g., as indicated by user data 116). And in one embodiment, a user may be unable to flag content which has been previously certified.

As shown in FIG. 10A, region 1030 may enable a user to certify a portion of content displayed in region 1010. Responsive to an interaction with region 1030, region 1035 may be displayed (e.g., as a pop-up window overlaying a region of GUI 1000A, as a separate GUI in a separate window, etc.) to enable a user to confirm the decision to certify the portion of content. In one embodiment, the ability to certify content may be limited to a certain users or a certain class of users (e.g., as indicated by user data 116).

Region 1040 may enable a user to bookmark a portion of content displayed in region 1010. In one embodiment, an interaction with region 1040 may cause content identified or displayed in region 1010 to be displayed in GUI 1000B of FIG. 10B (e.g., responsive to a user initiation or display of GUI 1000B of FIG. 10B).

Figure 10B:
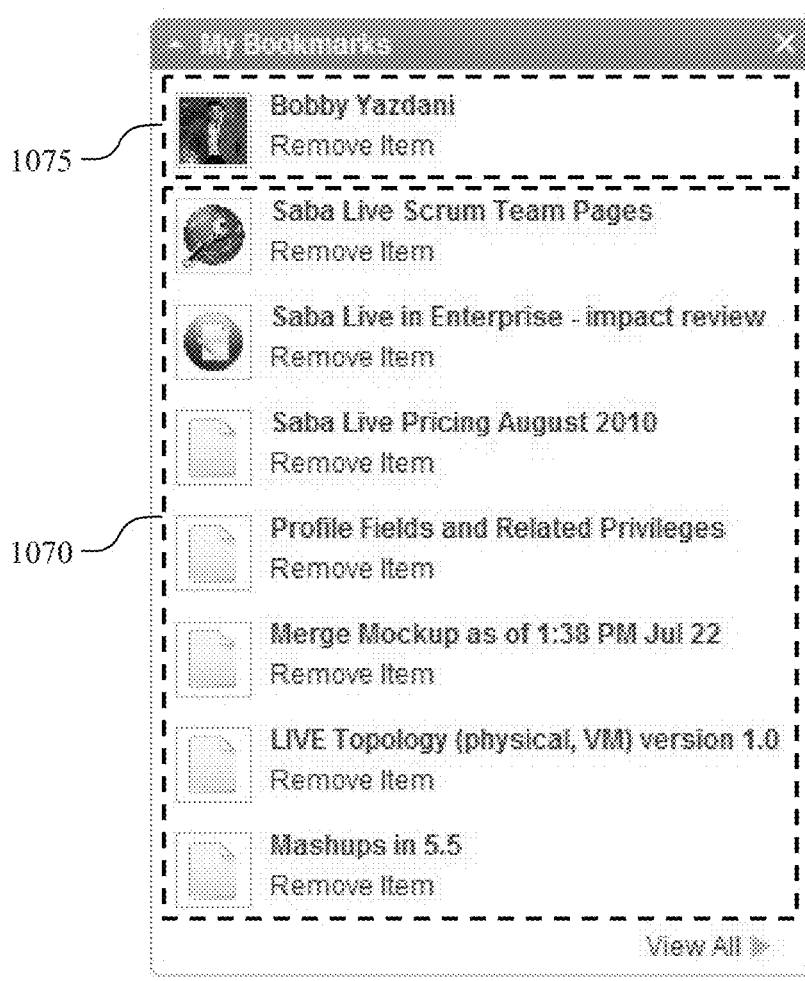
FIG. 10B shows an exemplary on-screen graphical user interface for displaying bookmarked content and/or bookmarked users in accordance with one embodiment of the present invention.

FIG. 10B shows exemplary GUI 1000B for displaying bookmarked content and/or bookmarked users in accordance with one embodiment of the present invention. As shown in FIG. 10B, region 1070 may include one or more portions of content which have been bookmarked by a user (e.g., by interacting with 1040 of GUI 1000A). In one embodiment, interaction with a particular portion of region 1070 may initiate a display or access of content corresponding to the particular portion of region 1070. Region 1075 may include one or more users which have been bookmarked by a user (e.g., using region 2840 of FIG. 28). In one embodiment, interaction with a particular portion of region 1075 may initiate a display or access of information about a user (e.g., a public profile for the user, GUI 2800 of FIG. 28, GUI 3100 of FIG. 31, GUI 3200 of FIG. 32, GUI 3300 of FIG. 33, etc.) which corresponds to the particular portion of region 1075. In this manner, GUI 1000B may enable a user to quickly view and/or access information about at least one bookmarked content and/or at least one bookmarked user.

In one embodiment, at least one portion of bookmarked content (e.g., bookmarked using GUI 1000) and/or at least one bookmarked user (e.g., bookmarked using GUI 2800) can be added to a list. A list may be used to organize bookmarked content and/or bookmarked users (e.g., similar to a folder or other manners of organizing items). A list of bookmarked content and/or a list of bookmarked users may be a portion of content itself which can then be shared with other users, used to determine popular or valuable content and/or users, or otherwise used similar to other types of content (e.g., text, at least one link, at least one blog entry, at least one image, at least one video, audio data, etc.).

Turning back to FIG. 10A, region 1050 may enable a user to share content (e.g., displayed in region 1010) with another user. In one embodiment, content contributed by a first user (e.g., using GUI 600, GUI 700, etc.) may be shared by a second user (e.g., using GUI 1000C of FIG. 10C) with a third user (e.g., identified using region 1085 of GUI 1000C, part of a group identified using region 1085 of GUI 1000C, etc.).

Figure 10C:
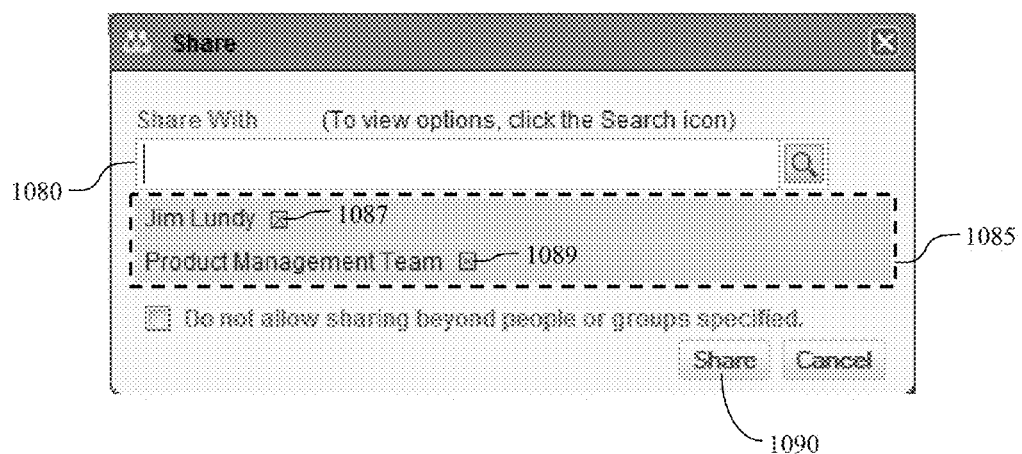
FIG. 10C shows an exemplary on-screen graphical user interface for sharing content and/or at least one user in accordance with one embodiment of the present invention.

FIG. 10C shows exemplary GUI 1000C for sharing content and/or at least one user in accordance with one embodiment of the present invention. FIG. 10C may be displayed responsive to an interaction with region 1050 of GUI 1000A (e.g., enabling the sharing of content displayed in region 1010) and/or responsive to an interaction with region 2830 of GUI 2800 (e.g., enabling the sharing of a user identified in region 2810 of GUI 2800).

As shown in FIG. 10C, content and/or at least one user may be shared with at least one other user selected using region 1080, where region 1080 may enable selection of the at least one other user by selecting at least one group (e.g., 217, 218, 219, etc.) and/or at least one specific user. For example, a particular group and/or a particular user may be identified by name, title, etc. using region 1080. In this manner, embodiments of the present invention may enable the sharing of content and/or at least one user with one or more users associated with a group, with one or more specific users, etc.

In one embodiment, a list of groups and/or users may be automatically displayed in a region (e.g., similar to region 810 of FIG. 8) below region 1080 responsive to an entry of text in region 1080. In one embodiment, the list displayed in the region (e.g., 810) may be determined by performing a search of groups and/or users using the information entered in region 1080 as the search query. And in one embodiment, a new search may be performed each time a new character is entered in region 1080 (e.g., based upon the information entered in region 1080 after the new character is entered), and thus, the list displayed in the region (e.g., 810) may be updated each time a new character is entered in region 1080. In this manner, embodiments of the present invention can increase the efficiency, ease, etc. of sharing content and/or at least one user with one or more users associated with a group, with one or more specific users, etc.

As shown in FIG. 10C, region 1085 may include at least one group and/or at least one user selected using region 1080. Region 1087 may enable a first group and/or a first user to be removed from the list displayed in region 1085. Region 1089 may enable another group and/or another user to be removed from the list displayed in region 1085.

Content (e.g., displayed in region 1010 of GUI 1000A) and/or at least one user (e.g., identified in region 2810 of GUI 2800) may be shared with at least one group (e.g., selected using region 1080, displayed in region 1085, etc.) and/or at least one specific user (e.g., selected using region 1080, displayed in region 1085, etc.) responsive to an interaction with region 1090 (e.g., moving a cursor over region 790 and clicking a mouse button, touching a region of a touch screen corresponding to region 1090, etc.). In one embodiment, content (e.g., displayed in region 1010 of GUI 1000A) may be shared (e.g., responsive to an interaction with region 1090) by modifying content data 114 to associate the content with the at least one group (e.g., selected using region 1080, displayed in region 1085, etc.) and/or the at least one specific user (e.g., selected using region 1080, displayed in region 1085, etc.). In one embodiment, at least one user (e.g., identified in region 2810 of GUI 2800) may be shared (e.g., responsive to an interaction with region 1090) by modifying user data 116 to associate the at least one user with the at least one group (e.g., selected using region 1080, displayed in region 1085, etc.) and/or the at least one specific user (e.g., selected using region 1080, displayed in region 1085, etc.). In one embodiment, content (e.g., displayed in region 1010 of GUI 1000A) to be shared with at least one group (e.g., selected using region 1080, displayed in region 1085, etc.) and/or at least one specific user (e.g., selected using region 1080, displayed in region 1085, etc.) may be stored in content database 112.

Turning back to FIG. 10A, region 1060 may enable a user to access (e.g., download from content database 112) the portion of content. In one embodiment, the portion of content may be launched and/or displayed (e.g., in a separate window, using a separate program for displaying a particular type of content, etc.) responsive to an interaction with region 1060.

In one embodiment, content may be associated with one or more channels. A channel may be used to group content and/or present content to one or more users subscribed or otherwise associated with the channel. In one embodiment, portions of content which are related to one another may be automatically grouped and associated with a channel. In this manner, users subscribed to or associated with the channel may be automatically be notified (e.g., via an email being automatically sent to the users, via a notification displayed in a GUI, etc.) of content which is added to the channel.

In one embodiment, where a user is currently receiving information from or viewing a particular channel, content associated with a channel may be automatically displayed or presented to the user who is subscribed to or otherwise associated with the particular channel. And in one embodiment, the automatic display or presentation of content associated with a channel may be performed using a GUI (e.g., using GUI 1000A, using another GUI, etc.).

FIG. 11 shows exemplary GUI 1100 depicting an email to an administrative user about a change in state of content in accordance with one embodiment of the present invention. In one embodiment, the email depicted in FIG. 11 may be automatically sent (e.g., by content server 110 or some other system) responsive to a user interaction with region 1020 and/or region 1025 of GUI 1000A (e.g., flagging a portion of content). In one embodiment, the email depicted in FIG. 11 may be automatically sent responsive to a user interaction with region 1030 and/or region 1035 of GUI 1000A (e.g., certifying a portion of content).

As shown in FIG. 11, region 1110 may include information about the change in state of one or more portions of content. For example, region 1110 may identify the portion or portions of content associated with a change in state. As another example, region 1110 may identify the type of state change (e.g., flagged, unflagged, certified, uncertified, etc.). And as yet another example, region 1110 may identify the user or users who requested the change in state.

Region 1120 may include a link for automatically displaying a GUI (e.g., GUI 1200 of FIG. 12) or otherwise directing the administrative user to information used to review and/or validate a change in state to a portion of content. For example, responsive to user interaction with region 1120, GUI 1200 of FIG. 12 may be automatically displayed enabling the administrative user to review the change in state, validate the change in state, or perform some other administrative action (e.g., related to managing content stored in content database 112, related to managing users, etc.).

Figure 12:
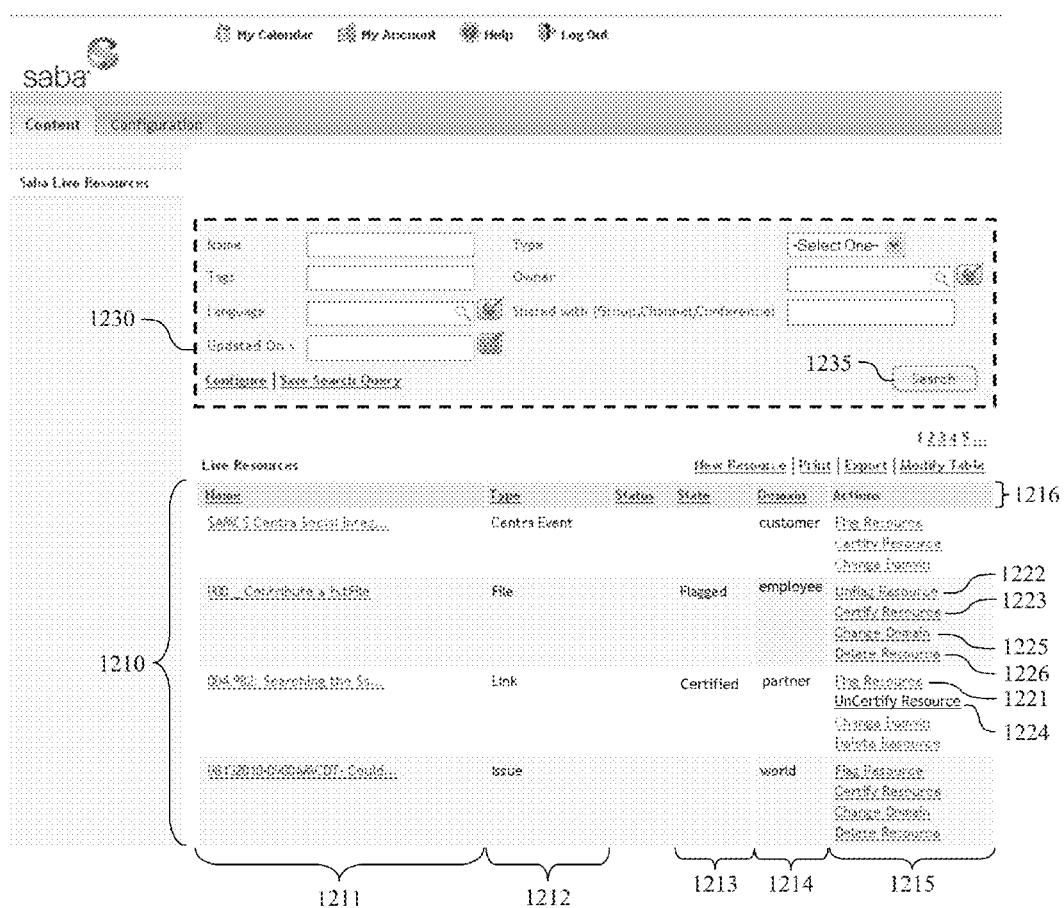
FIG. 12 shows an exemplary on-screen graphical user interface for managing content in accordance with one embodiment of the present invention.

FIG. 12 shows exemplary GUI 1200 for managing content in accordance with one embodiment of the present invention. As shown in FIG. 12, region 1210 may include information about portions of content stored in content database 112, where each row of region 1210 may correspond to a respective portion of content. Column 1211 may include a respective identifier or name corresponding to each of the portions of content, column 1212 may include a respective content type corresponding to each of the portions of content, column 1213 may include a respective state corresponding to each of the portions of content, column 1214 may include a respective domain corresponding to each of the portions of content, and column 1215 may include at least one respective administrative action corresponding to each of the portions of content. In one embodiment, row 1216 may include a plurality of column identifiers, where an interaction with a particular column identifier in row 1216 may sort the information displayed in region 1210 based upon information in the column corresponding to the particular column identifier. In one embodiment, information displayed in region 1210 may be accessed from content data 114.

Content displayed in region 1210 may be reviewed by a user by interacting with a name or identifier corresponding to the content. For example, a user may interact with region 1217 to access (e.g., download from content database 112) and/or display a portion of content (e.g., in a separate window, using a separate program for displaying a particular type of content, etc.) corresponding to region 1217.

A user may manage content displayed in region 1210 by performing one or more administrative actions listed in column 1215. For example, a user may flag a portion of content by interacting with region 1221. Region 1222 may enable a user to unflag a portion of content. A user may certify a portion of content by interacting with region 1223. Region 1224 may enable a user to uncertify a portion of content. A user may change the domain associated with a particular portion of content by interacting with region 1225. Region 1226 may be used to delete a portion of content (e.g., remove the portion of content from content database 112).

Region 1230 may include at least one field for searching for content displayed in region 1210. For example, an administrative user may search for content by name, tag, content type, owner or contributor, a language of the content, at least one group associated with the content, a date associated with an update to the content, or some other parameter. Region 1235 may be used to execute a search based upon one or more parameters (e.g., forming the search query) entered into at least one field included within region 1230. In one embodiment, responsive to an execution of a search (e.g., initiated using region 1235), results of the search may be displayed in region 1210.

Figure 13:
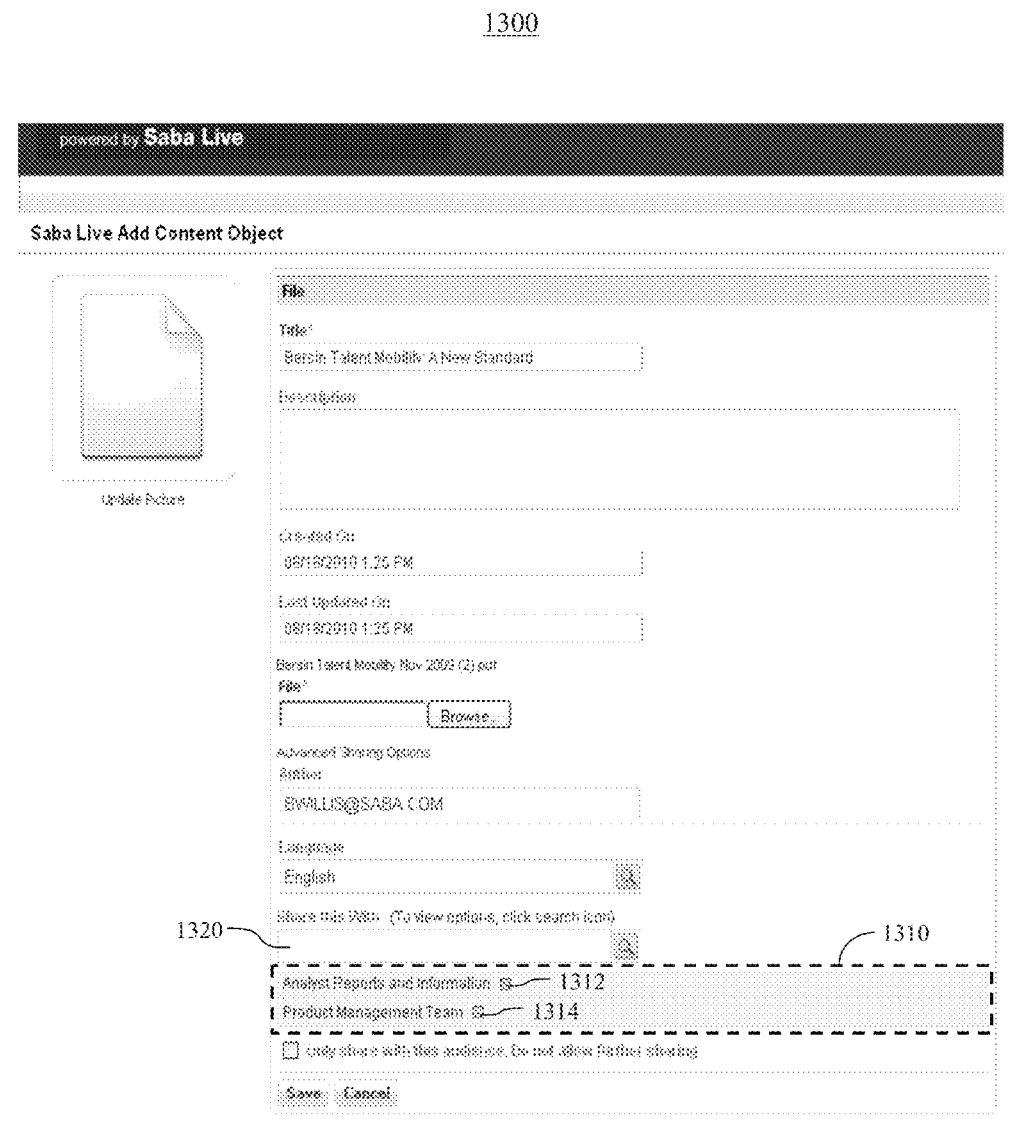

FIG. 13 shows exemplary GUI 1300 for configuring one or more groups associated with content in accordance with one embodiment of the present invention. As shown in FIG. 13, at least one group associated with a particular portion of content may be displayed in region 1310. The portion of content may be associated with another group using region 1320, where region 1320 may include at least one field enabling a user to search for and select at least one group to be associated with the portion of content. Region 1312 may be used to disassociate the portion of content with a first group, while region 1314 may be used to disassociate the portion of content with another group.

Although FIGS. 3 through 13 show GUIs (e.g., GUI 300, GUI 400, GUI 500, GUI 600, GUI 700, GUI 800, GUI 900, GUI 1000A, GUI 1000B, GUI 1000C, GUI 1100, GUI 1200 and GUI 1300) with a specific number, arrangement, appearance and size of regions, it should be appreciated that one or more of the GUIs may include a different number, arrangement, appearance and/or size of regions in other embodiments. Additionally, although the GUIs (e.g., GUI 300, GUI 400, GUI 500, GUI 600, GUI 700, GUI 800, GUI 900, GUI 1000A, GUI 1000B, GUI 1000C, GUI 1100, GUI 1200 and GUI 1300) depicted in FIGS. 3 through 13 have been described with certain functionalities, it should be appreciated that one or more of the GUIs depicted in FIGS. 3 through 13 may function differently in other embodiments.

Figure 14A:
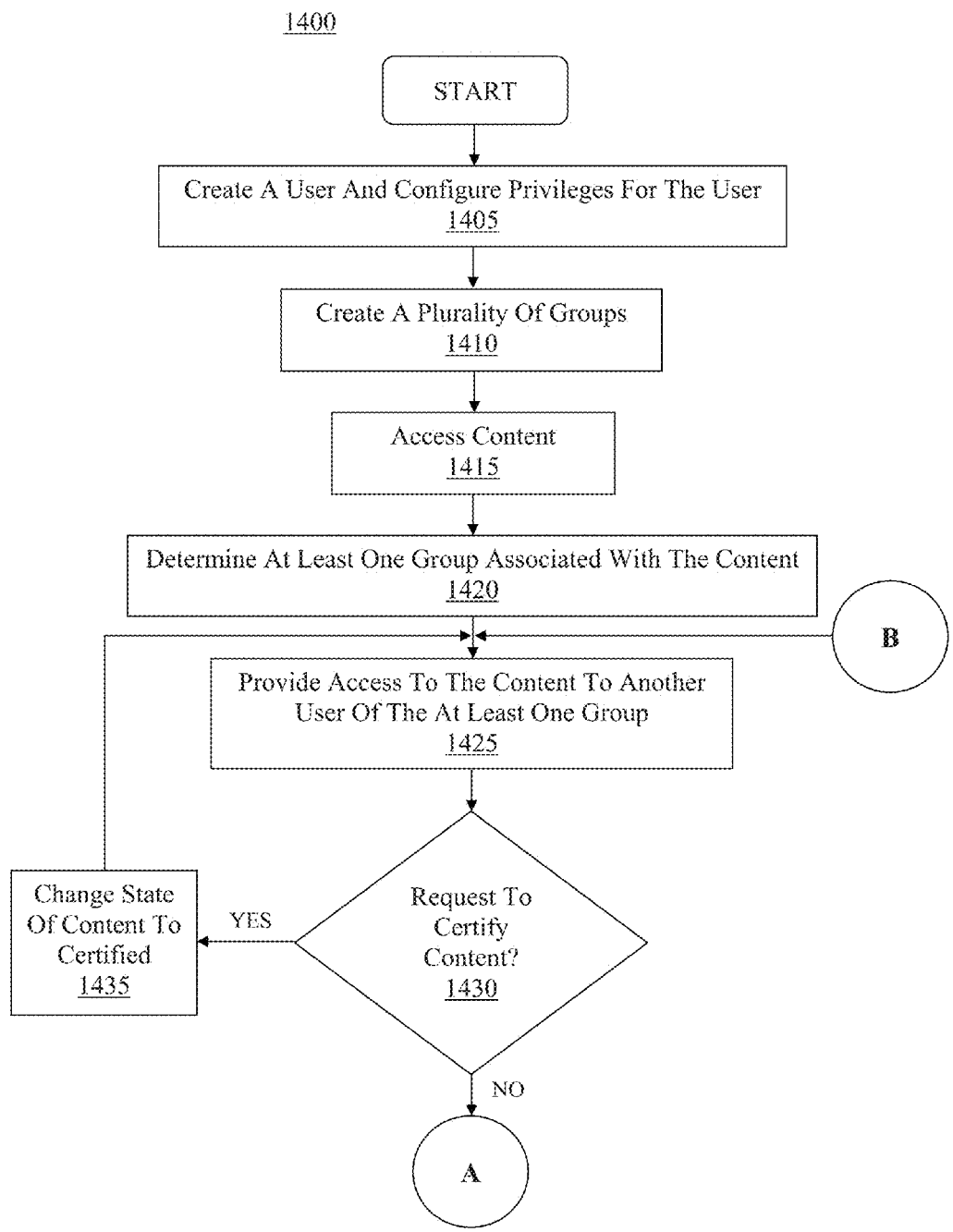
FIG. 14A shows a first portion of a flowchart of an exemplary computer-implemented process for sharing information in accordance with one embodiment of the present invention.
Figure 14B:
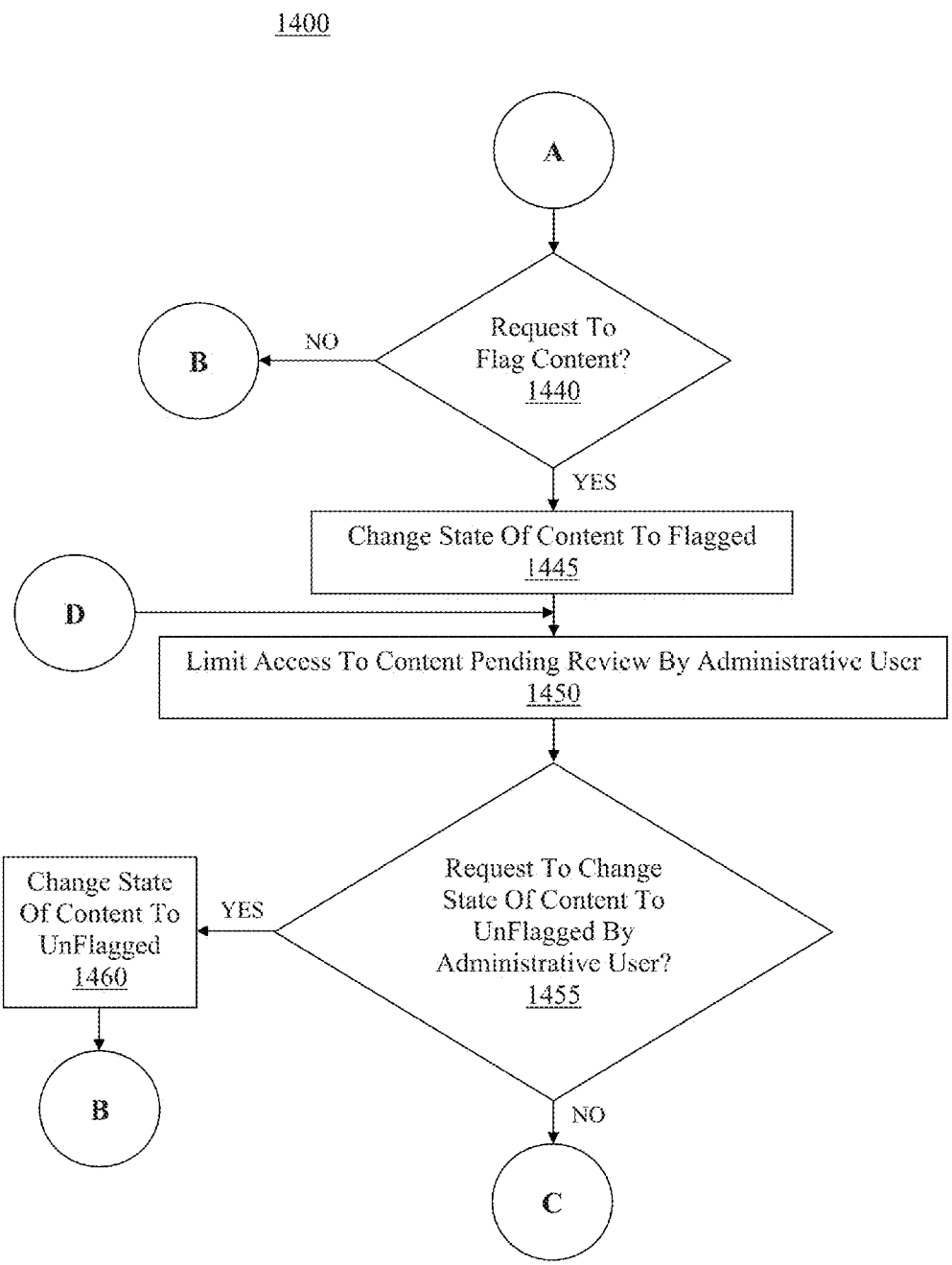
FIG. 14B shows a second portion of a flowchart of an exemplary computer-implemented process for sharing information in accordance with one embodiment of the present invention.
Figure 14C:
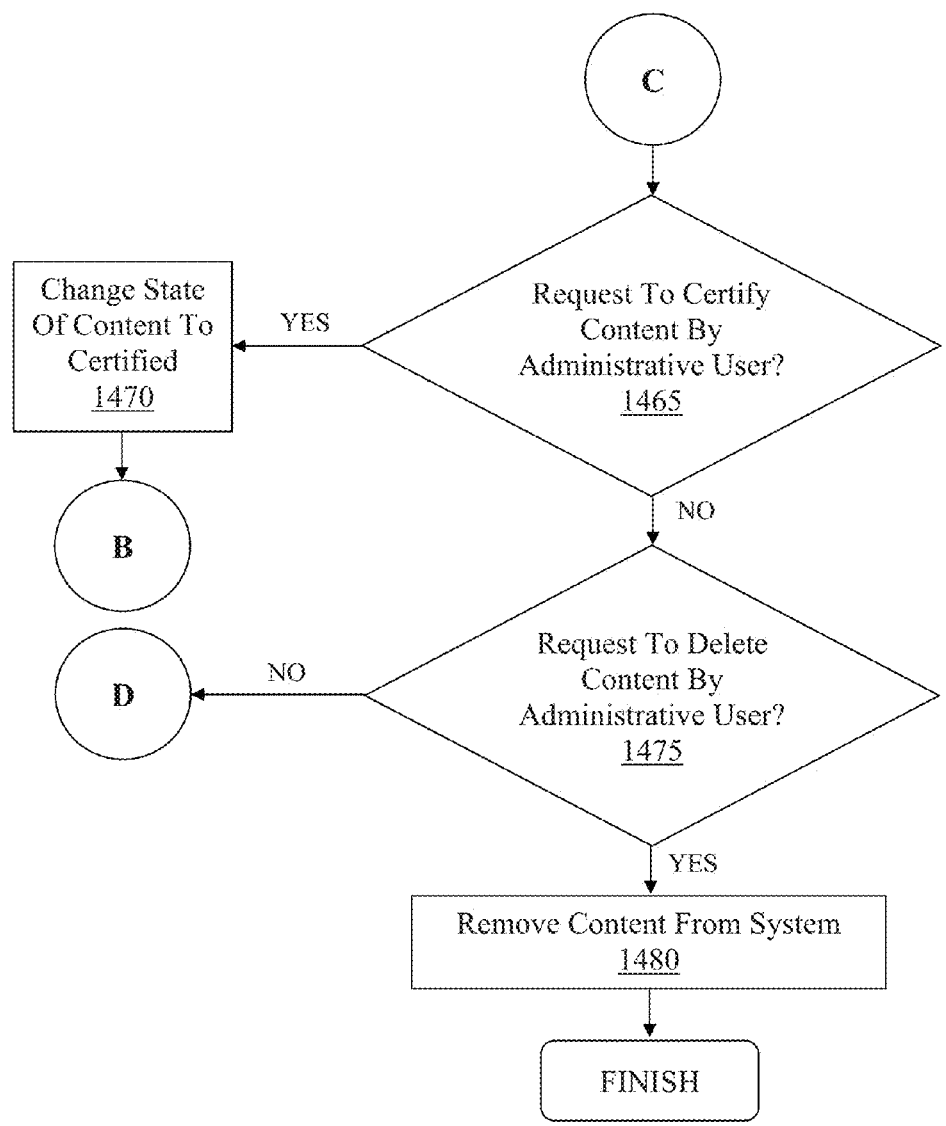
FIG. 14C shows a third portion of a flowchart of an exemplary computer-implemented process for sharing information in accordance with one embodiment of the present invention.

FIGS. 14A, 14B and 14C show a flowchart of exemplary computer-implemented process 1400 for sharing information in accordance with one embodiment of the present invention. As shown in FIG. 14A, step 1405 involves creating a user and configuring privileges for the user. In one embodiment, the user may be created by an administrative user using a GUI (e.g., 300), where the GUI enables entry of one or more types of information about the user (e.g., authentication information, personal information, professional information, etc.) and/or enables at least one domain to be associated with to the user. A GUI (e.g., 400) may be used by the administrative user to configure privileges for the user, where the privileges may include an ability to flag content, unflag content, certify content, uncertify content, etc.

Step 1410 involves creating a plurality of groups (e.g., 217, 218, 219, etc.). The groups may be created by a user (e.g., the user created in step 1405 or any other user) using a GUI (e.g., 500). One or more users may be associated with or join at least one of the groups. Additionally, content (e.g., including text, at least one link, at least one blog entry, at least one image, at least one video, audio data, at least one list of bookmarked content, a list of bookmarked users, some combination thereof, etc.) uploaded by users (e.g., to content database 112) may be associated with at least one of the groups. The plurality of groups may be associated with one or more business entities in one embodiment.

As shown in FIG. 14A, step 1415 involves accessing content. The content may include at least one electronic document including text, at least one link, at least one blog entry, at least one image, at least one video, audio data, at least one list of bookmarked content, at least one list of bookmarked users, some combination thereof, etc. The content may be uploaded to and accessed from a content database (e.g., 112) in one embodiment. The content may be created and/or uploaded by a user (e.g., created in step 1405) using a GUI (e.g., 600, 700, 800, etc.). In one embodiment, the content (e.g., a recording of a virtual meeting, another type of content, etc.) may be created and/or uploaded automatically (e.g., by a computer system or server facilitating the virtual meeting, another system, etc.).

Step 1420 involves determining at least one group associated with the content (e.g., accessed in step 1415). The at least one group associated with the content may be determined from content data 114 in one embodiment. The at least one group may be selected using a GUI (e.g., 700) which enables the user to upload content (e.g., to content database 112) in one embodiment. Additionally, the user may be a member of the at least one group determined in step 1420. In one embodiment, the at least one group determined in step 1420 may be associated with a common business entity.

As shown in FIG. 14A, step 1425 may involve providing access to the content (e.g., accessed in step 1415) to another user of the at least one group. Access may be provided using a GUI (e.g., 1000A) which enables the download of content (e.g., from content database 112) and/or displays search results of a search performed using another GUI (e.g., 900). The other user provided access to the content in step 1425 may also be a member of the at least one group. In one embodiment, the content may be confidential and only accessible to users associated with a common business entity. In one embodiment, the GUI (e.g., 1000A) used to provide access to the content in step 1425 may also enable certification of the content and/or enable flagging of the content. And in one embodiment, step 1425 may be performed using one or more steps of process 1500 of FIGS. 15A and/or 15B.

Step 1430 involves determining whether a request to certify content has been made. If a request to certify content has been made (e.g., by a user interacting with region 1030 and/or region 1035 of GUI 1000A), the state of the content may be changed to certified (e.g., by modifying content data 114) in step 1435. Alternatively, if a request to certify content has not been made, then step 1440 of FIG. 14B may be performed.

As shown in FIG. 14B, step 1440 involves determining whether a request to flag content has been made. If a request to flag content has not been made, then step 1425 of FIG. 14A may be performed. Alternatively, if a request to flag content has been made (e.g., by a user interacting with region 1020 and/or region 1025 of GUI 1000A), the state of the content may be changed to flagged (e.g., by modifying content data 114) in step 1445.

Step 1450 involves limiting access to the content pending review by an administrative user. Access to the content may be limited by making it unsearchable (e.g., the content may not be displayed in GUI 1000A as the result of a search) in one embodiment. An administrative user may review the content using a GUI (e.g., 1200, 1300, etc.), where the GUI may enable the administrative user to change the state of the content (e.g., to unflag, certify, etc.), delete the content, or otherwise manage the content. In one embodiment, an administrative user may be automatically notified of the change in status of the content via email (e.g., as shown in FIG. 11) and/or by some other form of communication.

As shown in FIG. 14B, step 1455 involves determining whether a request to change the state of the content to unflagged has been made by the administrative user. If a request to change the state of the content to unflagged has been made by the administrative user (e.g., by the administrative user interacting with a region such as region 1222 of GUI 1200), then the state of the content may be changed to unflagged (e.g., by modifying content data 114) in step 1460 then step 1425 of FIG. 14A may be performed. Alternatively, if a request to change the state of the content to unflagged has not been made by the administrative user, then step 1465 of FIG. 14C may be performed.

As shown in FIG. 14C, step 1465 involves determining whether a request to change the state of the content to certified has been made by the administrative user. If a request to change the state of the content to certified has been made by the administrative user (e.g., by the administrative user interacting with a region such as region 1223 of GUI 1200), then the state of the content may be changed to certified (e.g., by modifying content data 114) in step 1470 and then step 1425 of FIG. 14A may be performed. Alternatively, if a request to change the state of the content to certified has not been made by the administrative user, then step 1475 may be performed.

Step 1475 involves determining whether a request to delete the content has been made by the administrative user. If a request to delete the content has not been made by the administrative user, then step 1450 of FIG. 14B may be performed. Alternatively, if a request to delete the content has been made by the administrative user, then the content may be removed from the system (e.g., from content database 112) in step 1480. Additionally, in one embodiment, content data 114 may be updated to reflect the deletion of the content.

Figure 15A:
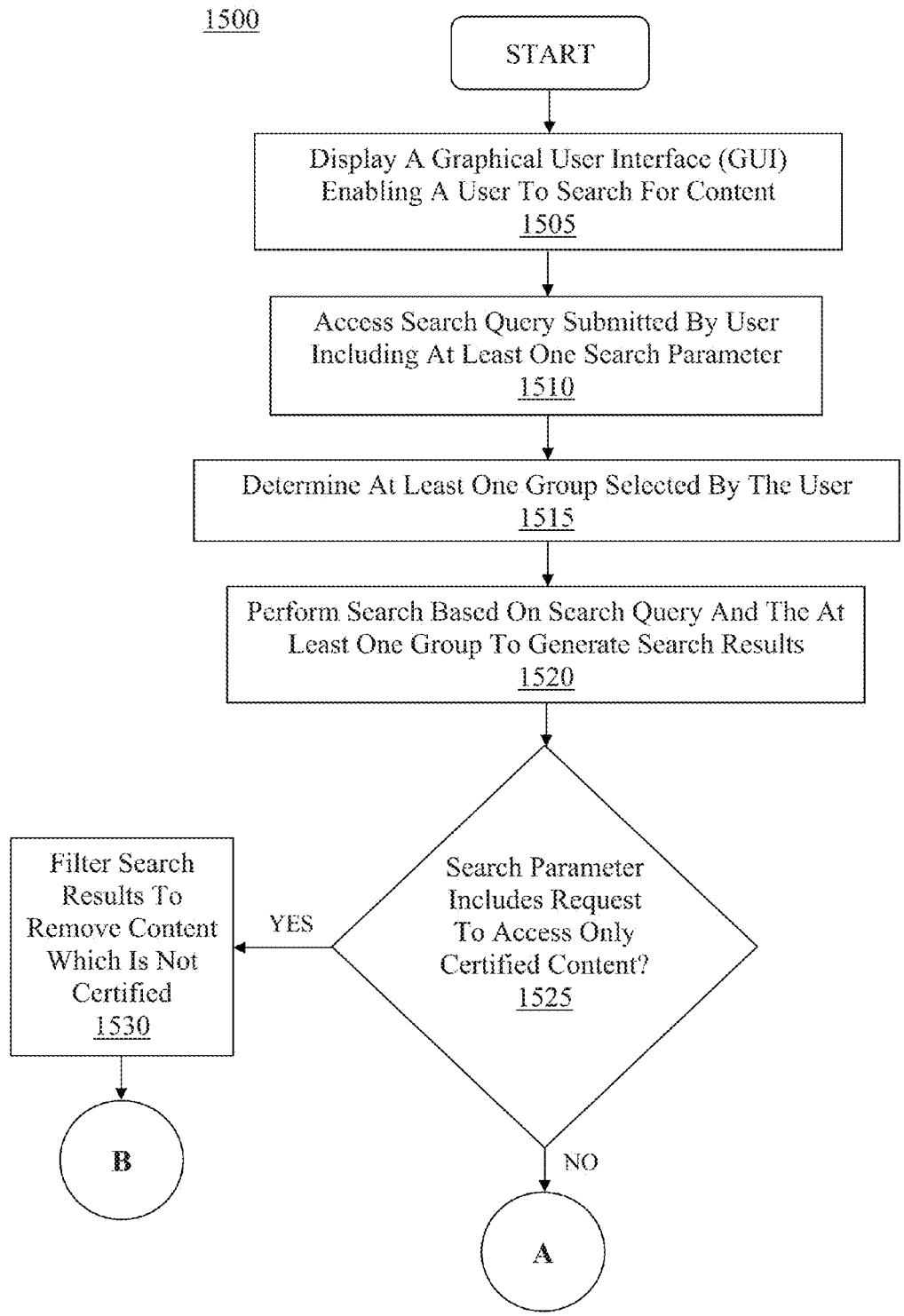
FIG. 15A shows a first portion of a flowchart of an exemplary computer-implemented process for providing access to content in accordance with one embodiment of the present invention.
Figure 15B:
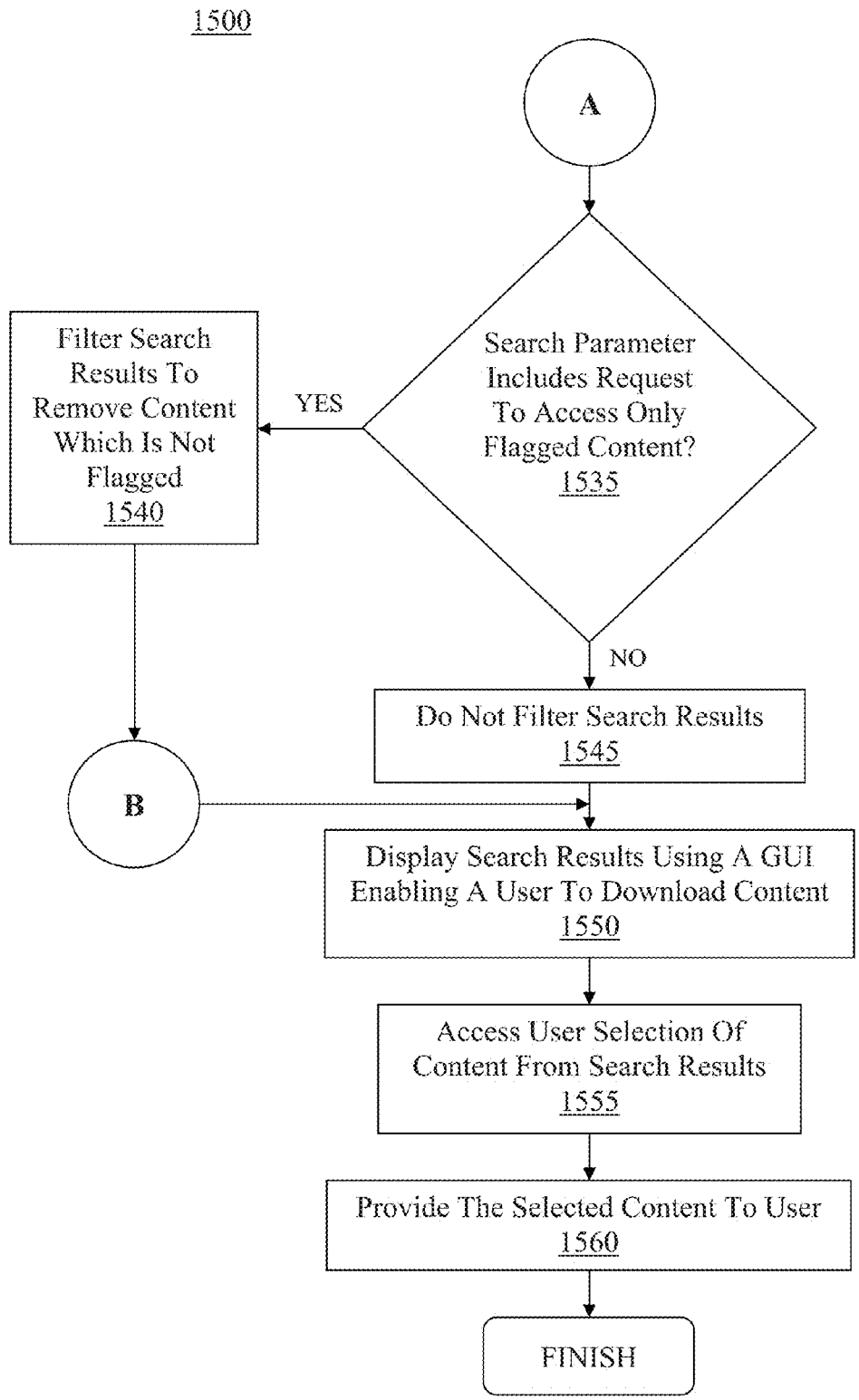
FIG. 15B shows a second portion of a flowchart of an exemplary computer-implemented process for providing access to content in accordance with one embodiment of the present invention.

FIGS. 15A and 15B show a flowchart of exemplary computer-implemented process 1500 for providing access to content in accordance with one embodiment of the present invention. As shown in FIG. 15A, step 1505 involves displaying a GUI (e.g., 900) enabling a user to search for content. The content may be a document including text, a link, a blog entry, an image, a video, audio data, a list of bookmarked content, a list of bookmarked users, some combination thereof, etc. In one embodiment, the content may be confidential and only accessible to users associated with a common business entity.

Step 1510 involves accessing a search query submitted by a user including at least one search parameter. A search parameter may include a request to access content of one or more particular states (e.g., flagged, unflagged, certified, uncertified, etc.), of one or more particular ratings (e.g., above 3 stars, having 4 stars, having 5 stars, etc.), etc. The search query may be input by the user using the GUI (e.g., 900), where the search query may be generated or determined based upon at least one user input using one or more fields of the GUI (e.g., 900) in one embodiment.

As shown in FIG. 15A, step 1515 involves determining at least one group selected by a user. In one embodiment, the at least one group selected by a user may be determined based upon a user interaction with region 980 of GUI 900.

Step 1520 involves performing a search based on the search query (e.g., accessed in step 1510) and the at least one group (e.g., determined in step 1515) to generate search results. In one embodiment, the search results generated in step 1520 may include any content (e.g., stored in content database 112) which is associated with the at least one group (e.g., as determined by content data 114) and also meets the requirements specified in the search query (e.g., includes one or more keywords of the search query, etc.).

As shown in FIG. 15A, step 1525 involves determining whether the search parameter (e.g., accessed as part of the search query in step 1510) includes a request to access only certified content. If it is determined that the search parameter includes a request to access only certified content, then the search results (e.g., generated in step 1520) may be filtered in step 1530 to remove content which is not certified and then step 1550 of FIG. 15B may be performed. Alternatively, if it is determined that the search parameter does not include a request to access only certified content, then step 1535 of FIG. 15B may be performed.

As shown in FIG. 15B, step 1535 involves determining whether the search parameter (e.g., accessed as part of the search query in step 1510) includes a request to access only flagged content. If it is determined that the search parameter includes a request to access only flagged content, then the search results (e.g., generated in step 1520) may be filtered in step 1540 to remove content which is not flagged and then step 1550 may be performed. Alternatively, if it is determined that the search parameter does not include a request to access only flagged content, then the search results may not be filtered in step 1545.

Step 1550 involves displaying the search results (e.g., without filtering, with filtering performed in step 1530 and/or step 1540, etc.) using a GUI (e.g., 1000A) enabling a user to download content. The search results may include at least one identifier (e.g., displayed in region 1015) corresponding to content stored in content database 112.

As shown in FIG. 15B, step 1555 involves accessing a user selection of content from the search results. The user selection may include an interaction with a region (e.g., 1060) of the GUI associated with a particular portion of content.

Step 1560 involves providing the selected content to the user (e.g., responsive to the user selection accessed in step 1555). Step 1560 may involve enabling the user to manually download the content (e.g., from content database 112). Step 1560 may involve automatically downloading the content (e.g., from content database 112). And in one embodiment, step 1560 may involve launching and/or displaying (e.g., in a separate window, using a separate program for displaying a particular type of content, etc.).

Method and System for Managing a Virtual Meeting

Figure 26A:
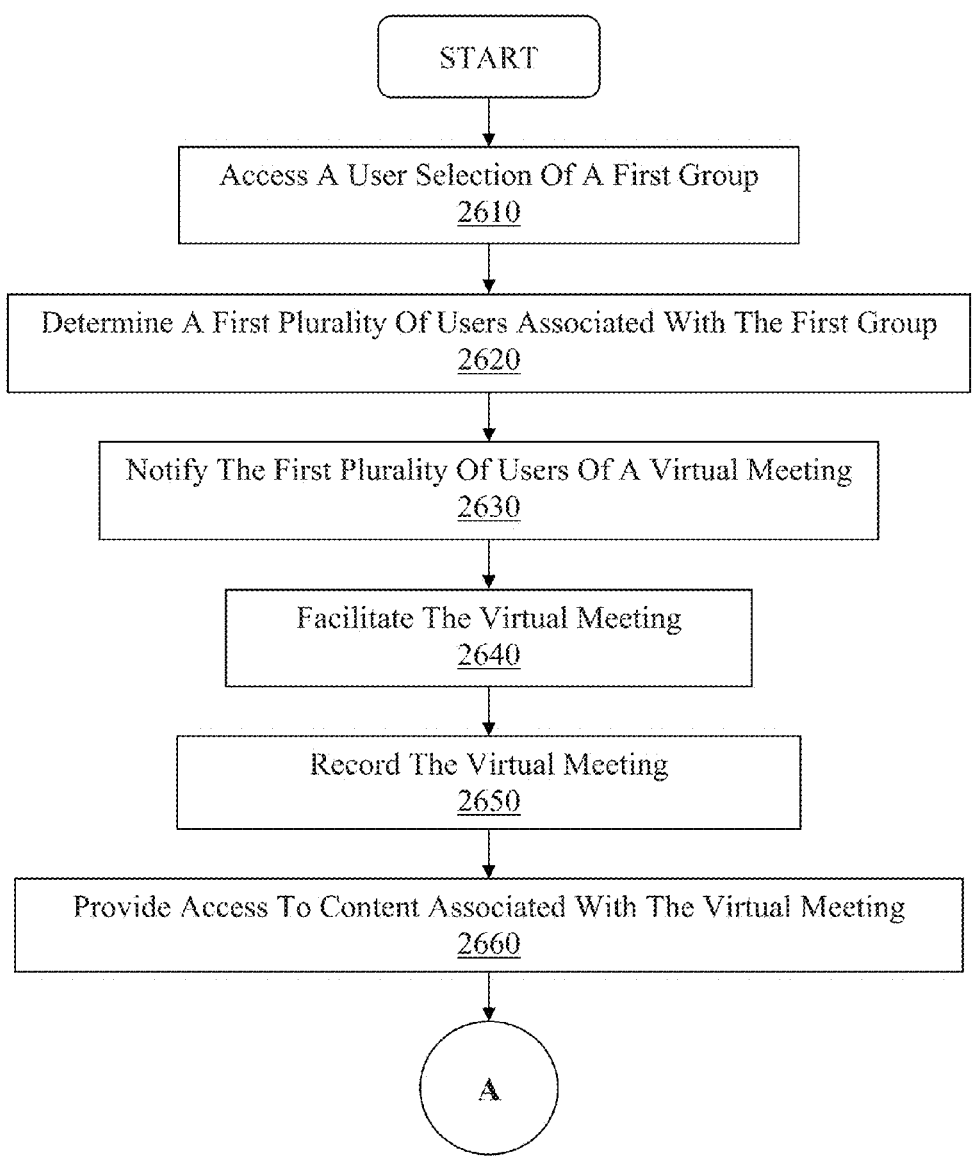
FIG. 26A shows a first portion of a flowchart of an exemplary computer-implemented process for managing a virtual meeting in accordance with one embodiment of the present invention.
Figure 26B:
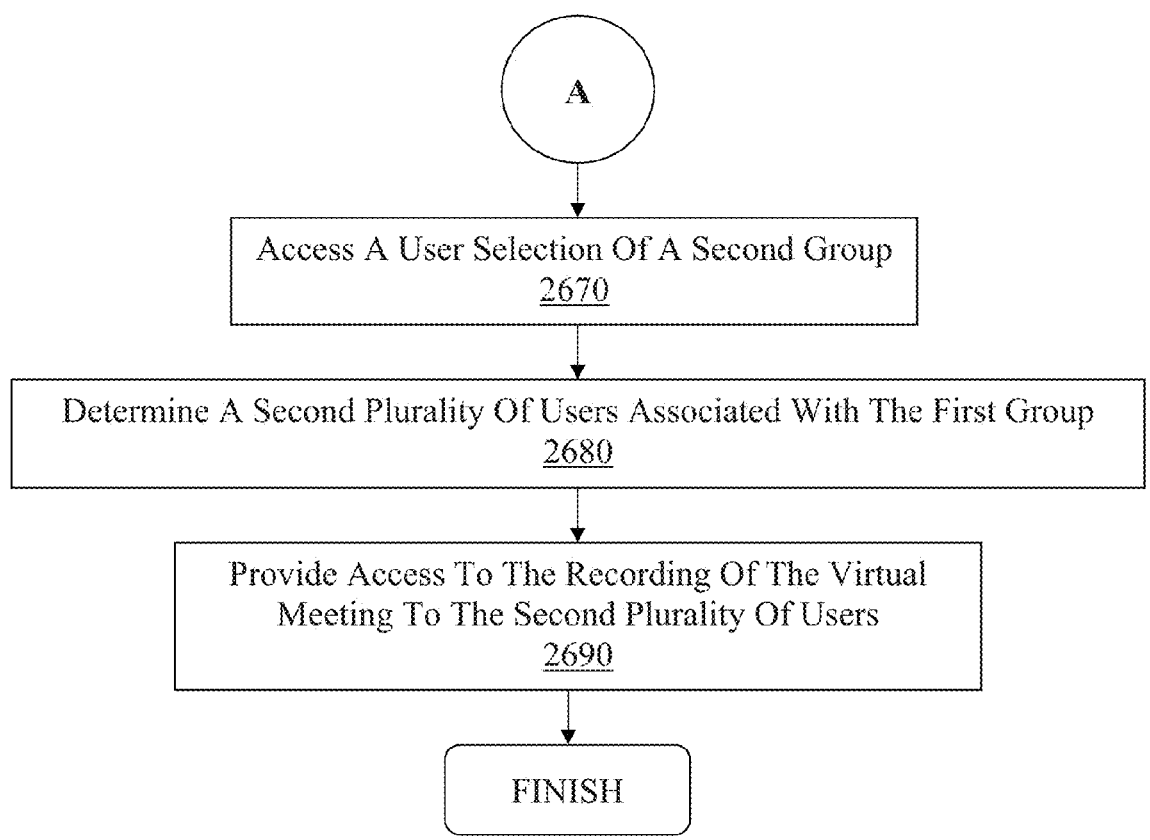
FIG. 26B shows a second portion of a flowchart of an exemplary computer-implemented process for managing a virtual meeting in accordance with one embodiment of the present invention.

Embodiments of the present invention are directed to a computer-implemented method, computer-readable medium and system for managing a virtual meeting (e.g., in accordance with process 2600 of FIGS. 26A and 26B). For example, a first graphical user interface (e.g., GUI 1600 of FIG. 16) may be used to select invitees for a virtual meeting (e.g., by selecting one or more groups which include at least one respective member of a business entity, by individually selecting invitees, etc.). The GUI (e.g., 1600) may also be used to enter information about the virtual meeting (e.g., a title, date, start time, end time, etc.), configure options for the virtual meeting (e.g., using GUI 1700 of FIG. 17), configure parameters (e.g., audio parameters, video parameters, etc.) for recording the virtual meeting (e.g., using GUI 1600 of FIG. 16, using GUI 1800 of FIG. 18, etc.), some combination thereof, etc. Additionally, a user may select one or more groups (e.g., using GUI 1900 of FIG. 19), where a recording of the virtual meeting may be made accessible to members of the one or more groups.

Invitees may be notified of the virtual meeting by displaying a notification in a GUI (e.g., GUI 2000 of FIG. 20, GUI 2100 of FIG. 21, etc.), sending an email (e.g., electronic mail message) to one or more of the invitees, etc. Invitees may attend the meeting using a GUI (e.g., 2300 of FIG. 23), where the GUI may include a region (e.g., GUI 2400 of FIG. 24) enabling at least one user to access information (e.g., a file, document, worksheet, slide, image, etc.) associated with the virtual meeting. Accordingly, embodiments of the present invention can improve setup of a virtual meeting and/or distribution of a recording of a virtual meeting, thereby enabling virtual meetings to be more conveniently and/or efficiently managed.

Figure 16:
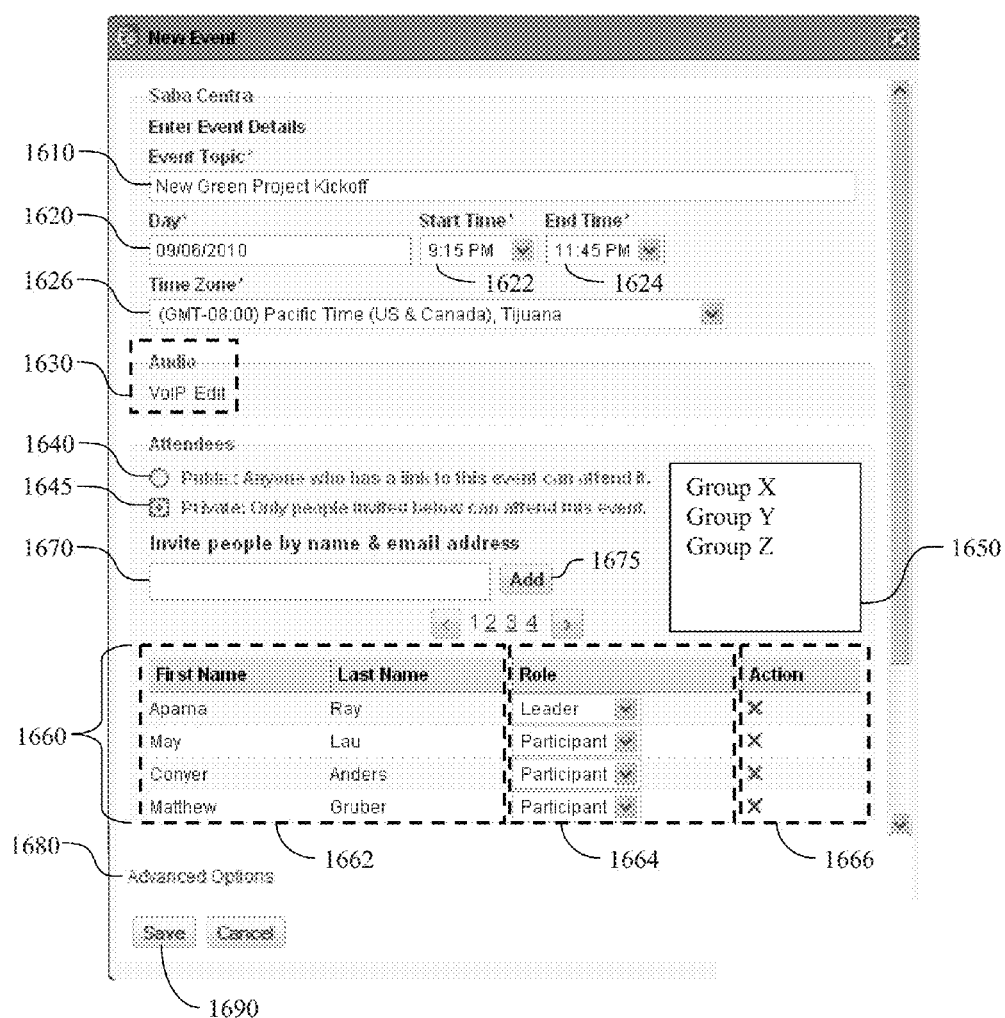
FIG. 16 shows an exemplary on-screen graphical user interface for managing a virtual meeting in accordance with one embodiment of the present invention.

FIG. 16 shows exemplary on-screen graphical user interface 1600 for managing a virtual meeting in accordance with one embodiment of the present invention. As shown in FIG. 16, GUI 1600 may enable a user to enter information about a virtual meeting. For example, region 1610 may include one or more fields enabling the entry of a title or other information describing a virtual meeting. Region 1620 may include one or more fields enabling the entry of a day on which the virtual meeting is to be held, while region 1622 may include one or more fields enabling the entry of a start time for the virtual meeting and region 1624 may include one or more fields enabling the entry of an end time for the virtual meeting. Region 1626 may include one or more fields enabling the entry of a time zone associated with the times entered using regions 1622 and 1624.

Region 1630 may include one or more fields enabling the type of audio to be selected for the virtual meeting. For example, region 1630 may be used to select voice over internet protocol (VoIP) as the audio configuration for the virtual meeting. As another example, region 1630 may be used to select a telephone service (e.g., landline telephone, mobile phone, a communication technology which is not Internet-based, etc.) as the audio configuration for the virtual meeting.

As shown in FIG. 16, region 1640 may include one or more fields enabling a user to make the virtual meeting accessible to all members of a business entity. In this manner, any user associated with the business entity may search for (e.g., using GUI 1000A of FIG. 10A) and/or attend the virtual meeting (e.g., using GUI 2300 of FIG. 23).

Region 1645 may include one or more fields enabling a user to specify the invitees for the virtual meeting. In one embodiment, an interaction with region 1645 may activate or otherwise enable a user to specify invitees for the virtual meeting using region 1650 and/or region 1660.

As shown in FIG. 16, region 1650 may include one or more fields enabling a user to select at least one group (e.g., 217, 218, 219, etc.) associated with the business entity, where at least one member of the at least one group (e.g., selected using region 1650) may be displayed in region 1660. Region 1662 of region 1660 may include a listing of members of the at least one group (e.g., selected using region 1650).

Region 1664 of region 1660 may include one or more fields enabling a respective role to be assigned to each invitee. For example, an invitee may be assigned a role of "leader" to indicate that the invitee is going to be leading, directing, etc. the virtual meeting. As another example, an invitee may be assigned a role of "participant" to indicate that the invitee is going to be attending (e.g., not leading) the virtual meeting.

In one embodiment, each role may be associated with or assigned a different set of permissions. For example, a leader may be able to delete an event whereas a participant may not be able to delete an event.

As shown in FIG. 16, region 1666 may include one or more fields enabling a respective action to be performed for each invitee. For example, region 1666 may be used to remove an invitee from the list displayed in region 1660. As another example, region 1666 may be used to perform some other action with respect to an invitee.

Region 1670 may include one or more fields enabling at least one invitee to be added to the list displayed in region 1660. For example, a user's name, email address, or the like may be entered into region 1670. A user may then interact with region 1675 to add the user to the list displayed in region 1660. In one embodiment, a user which is not a member of a group selected using region 1650 may be added using region 1670 and/or region 1675.

As shown in FIG. 16, region 1680 may be used to configure other options for the virtual meeting. In one embodiment, another GUI (e.g., GUI 1700 of FIG. 17, GUI 1800 of FIG. 18, GUI 1900 of FIG. 19, etc.) may be displayed responsive to an interaction with region 1680 to enable the virtual meeting to be configured.

Region 1690 may be used to initiate the setup of a virtual meeting. In one embodiment, an interaction with region 1690 may initiate the setup of a virtual meeting in accordance with information and/or attributes entered using GUI 1600. And in one embodiment, an interaction with region 1690 may initiate the setup of a virtual meeting in accordance with information and/or attributes entered using another GUI (e.g., GUI 1700 of FIG. 17, GUI 1800 of FIG. 18, GUI 1900 of FIG. 19, etc.).

Figure 17:
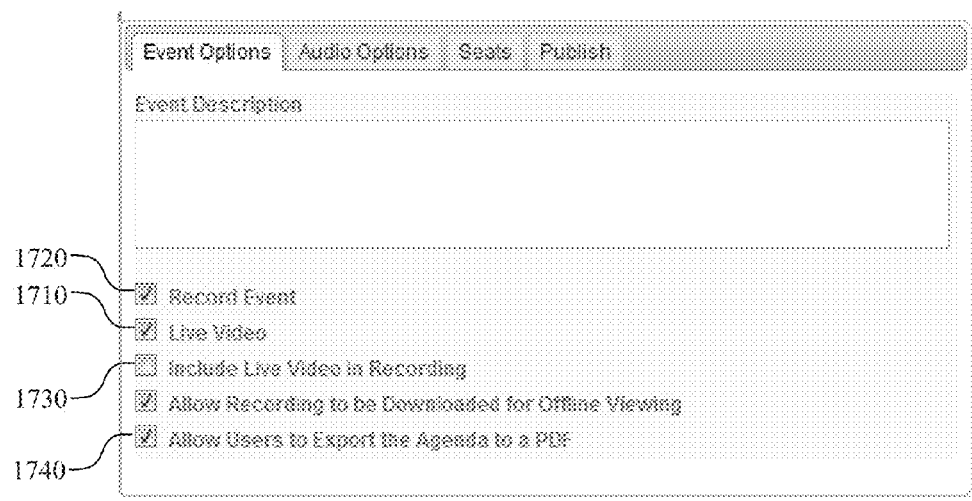
FIG. 17 shows an exemplary on-screen graphical user interface for configuring options for a virtual meeting in accordance with one embodiment of the present invention.

FIG. 17 shows exemplary on-screen graphical user interface 1700 for configuring options for a virtual meeting in accordance with one embodiment of the present invention. As shown in FIG. 17, region 1710 may include one or more fields enabling video to be included as part of a virtual meeting. In one embodiment, if video is selected to be included as part of the virtual meeting (e.g., responsive to an interaction with region 1710), video may be recorded (e.g., using a camera) and/or displayed in region (e.g., 2310) of a GUI (e.g., 2300 of FIG. 23). For example, video captured by a first camera at a first location may be displayed using a GUI displayed at a second location, whereas video captured by a second camera at the second location may be displayed using a GUI displayed at the first location. In this manner, users located in two or more remote locations may conduct a virtual meeting where video data associated with the virtual meeting may be communicated over the Internet.

Region 1720 may include one or more fields enabling the recording of a virtual meeting. The recording may include audio data and/or video data from the virtual meeting.

As shown in FIG. 17, region 1730 may include one or more fields enabling video data (e.g., captured using one or more cameras disposed at one or more locations) from the virtual meeting to be included in the recording of the virtual meeting (e.g., selected using region 1720). If video data from the virtual meeting is not to be included in the recording (e.g., based on a user selection made using region 1730), the recording may include only audio data in one embodiment. In one embodiment, region 1730 may be deactivated (e.g., grayed out or otherwise rendered unusable) if the virtual meeting is not going to be recorded (e.g., based on a selection made using region 1720).

Region 1740 may include one or more fields enabling users to share information associated with the virtual meeting. For example, if a selection is made (e.g., using region 1740) to enable users to share information associated with the virtual meeting, a GUI (e.g., 2300 of FIG. 23) used to attend or conduct the virtual meeting may include a region (e.g., GUI 2400 of FIG. 24) enabling at least one user to access a file, document, worksheet, slide, image or other information associated with the virtual meeting.

Figure 18:
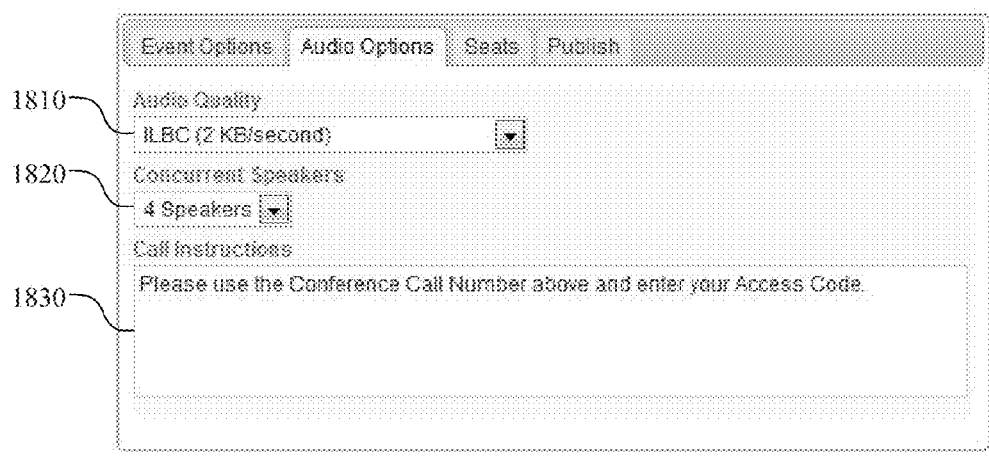
FIG. 18 shows an exemplary on-screen graphical user interface for configuring audio parameters for a virtual meeting in accordance with one embodiment of the present invention.

FIG. 18 shows exemplary on-screen graphical user interface 1800 for configuring audio parameters for a virtual meeting in accordance with one embodiment of the present invention. As shown in FIG. 18, region 1810 includes one or more fields enabling the selection or configuration of qualitative parameters of the audio data for the virtual meeting. For example, region 1810 may be used to select a codec (e.g., Internet Low Bitrate Codec (ILBC), another codec, etc.) for encoding audio data for the virtual meeting. As another example, region 1810 may be used to select an audio quality expressed in terms of quality (e.g., low quality, high quality, etc.), bit rate (e.g., 2 KB/second), etc.

Region 1820 may include one or more fields enabling a limitation to be placed on the number of users that can speak contemporaneously during the virtual meeting. For example, if region 1820 is used to select a limit of two users, then a user may be muted or otherwise not allowed to speak while two other users are speaking. In one embodiment, where each computer system used to participate in the virtual meeting is a separate source of audio data, region 1820 may be used to set a limit on the number of audio data sources for the recording at any given time.

As shown in FIG. 18, region 1830 may include one or more fields enabling the entry of instructions for calling into the virtual meeting. For example, where audio for the virtual meeting is conducted using a telephone service (e.g., landline telephone, mobile phone, a communication technology which is not Internet-based, etc.), region 1830 may provide information about steps users should take to enable audio for the meeting (e.g., call a particular phone number, enter a particular access code, etc.).

Figure 19:
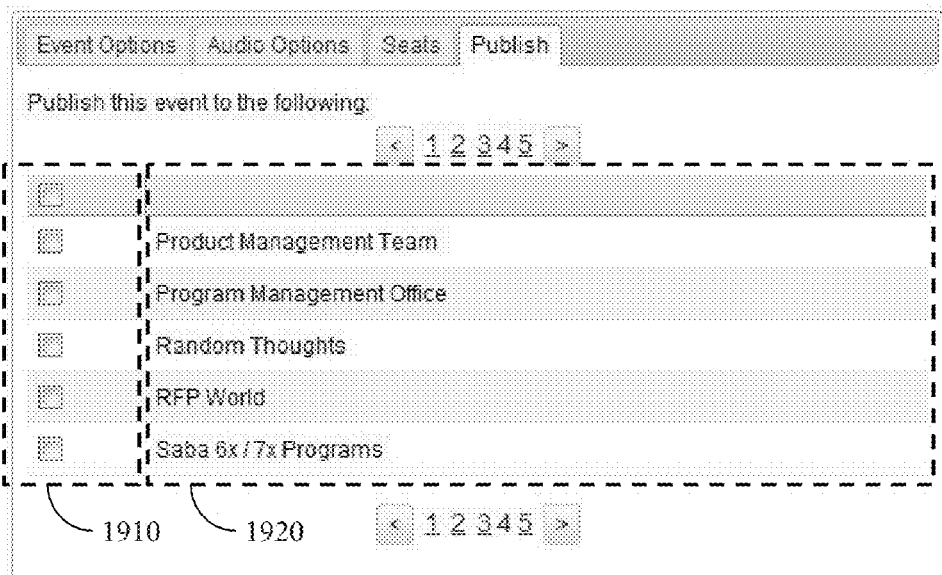
FIG. 19 shows an exemplary on-screen graphical user interface for controlling accessibility of a recording of a virtual meeting in accordance with one embodiment of the present invention.

FIG. 19 shows exemplary on-screen graphical user interface 1900 for controlling accessibility of a recording of a virtual meeting in accordance with one embodiment of the present invention. As shown in FIG. 19, region 1910 includes a plurality of regions, where each region of region 1910 may correspond to a respective group or channel listed in region 1920. A user can select one or more groups and/or one or more channels by interacting with one or more regions of region 1910. In one embodiment, a recording of the virtual meeting may be made accessible to each group selected using region 1910. In one embodiment, a recording of the virtual meeting may be automatically published or otherwise made accessible to at least one user subscribed to or otherwise associated with a channel selected using region 1910. Accordingly, embodiments of the present invention can improve the distribution of a recording of a virtual meeting by enabling a user to more conveniently and/or efficiently select recipients of the recording, control access to the recording, etc.

In one embodiment, a recording of a virtual meeting may become content accessible to at least one user of a business entity. For example, a recording of a virtual meeting may be searchable (e.g., using GUI 1000A of FIG. 10A) by users of one or more groups (e.g., selected using region 1910 of GUI 1900), where results of a search (e.g., displayed in region 1010 of GUI 1000A) may include the recording of the virtual meeting. As another example, the recording of the virtual meeting may be flagged (e.g., using region 1020 of GUI 1000A to remove the recording from circulation such that it is excluded from the search results of subsequent searches). And as yet another example, the recording of the virtual meeting may be certified (e.g., using region 1030 of GUI 1000A to indicate an approval or level of respect for the recording, to reduce the ability to flag the recording, to prevent other users from flagging the recording, etc.). And as a further example, the recording of a virtual meeting may be associated with at least one channel, thereby enabling users who are subscribed to or otherwise associated with the at least one channel to be notified of and/or access the recoding the virtual meeting.

Figure 20:
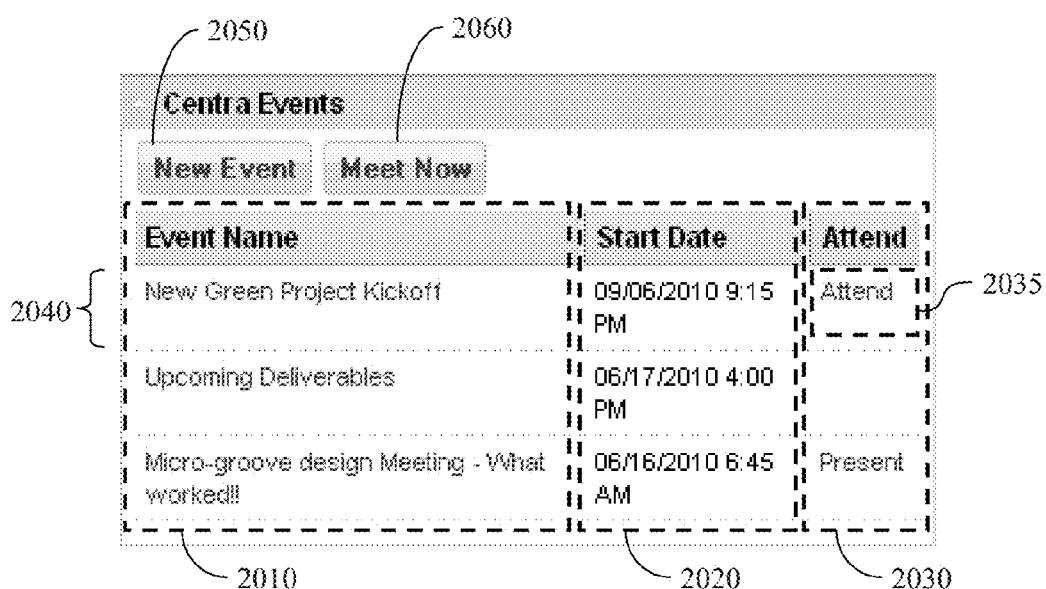
FIG. 20 shows an exemplary on-screen graphical user interface for displaying information about one or more virtual meetings in accordance with one embodiment of the present invention.

FIG. 20 shows exemplary on-screen graphical user interface 2000 for displaying information about one or more virtual meetings in accordance with one embodiment of the present invention. As shown in FIG. 20, region 2010 may include a list of virtual meetings scheduled for a user. Region 2020 may include a list of start dates and/or start times for virtual meetings, where each start date and/or start time may correspond to a respective virtual meeting listed in region 2010. Region 2030 may include a list of roles (e.g., participant, leader, etc.) of the user in the virtual meetings, where each role (e.g., determined based on information entered using region 1664 of GUI 1600) may correspond to a respective virtual meeting listed in region 2010. In this manner, GUI 2000 may include at least one notification for at least one virtual meeting.

In one embodiment, a role indicated in region 2030 may vary from user to user. For example, region 2035 may indicate that a first user is to attend a virtual meeting (e.g., associated with region 2040) as a participant, whereas region 2115 of GUI 2100 of FIG. 20 may indicate that a second user (e.g., associated with GUI 2100) may attend the same virtual meeting (e.g., also associated with region 2110 of GUI 2100) as a leader.

Turning back to FIG. 20, GUI 2000 may be used to join a virtual meeting. For example, an interaction with region 2040 corresponding to a particular virtual meeting may enable a user to join the particular meeting. In one embodiment, responsive to a user interaction with a region (e.g., 2040) corresponding to a particular virtual meeting, a GUI (e.g., 2300 of FIG. 23) may be displayed enabling the user to participate in and/or lead the virtual meeting.

Region 2050 may include one or more fields enabling a user to create or manage a virtual meeting to be scheduled at some time in the future. In one embodiment, a GUI (e.g., 1600 of FIG. 16) may be displayed responsive to a user interaction with region 2050 to enable a user to enter information about the new virtual meeting (e.g., title, start time, end time, etc.), configure options for the new virtual meeting, select invites for the virtual meeting, select one or more groups of users able to access a recording of the new virtual meeting, etc.

As shown in FIG. 20, region 2060 may include one or more fields enabling an expedited creation of a new virtual meeting (e.g., without specifying a start time, one or more invitees, other options, etc.). For example, responsive to a user interaction with region 2060, a new virtual meeting may be initiated without requiring a user to specify a start time, one or more invitees, other options, etc. As another example, responsive to a user interaction with region 2060, GUI 2200 of FIG. 22 may be displayed to enable the virtual meeting to be configured and/or initiated.

Figure 22:
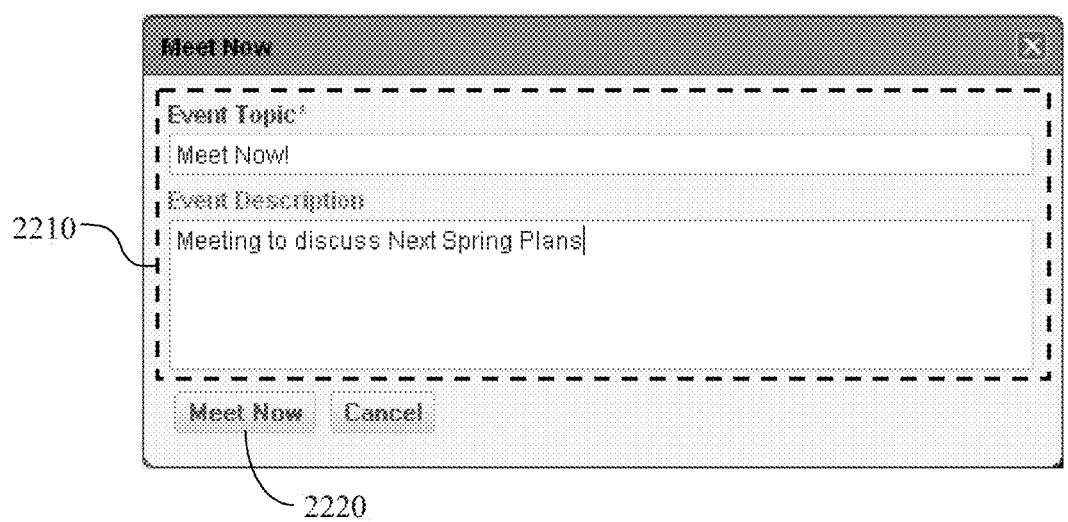
FIG. 22 shows an exemplary on-screen graphical user interface for configuring and/or initiating a virtual meeting in accordance with one embodiment of the present invention.

FIG. 22 shows exemplary on-screen graphical user interface 2200 for configuring and/or initiating a virtual meeting in accordance with one embodiment of the present invention. As shown in FIG. 22, region 2210 may include one or more fields enabling a user to enter information about the new virtual meeting (e.g., a title, description, etc.). Region 2220 may include one or more fields enabling the virtual meeting to be initiated. In one embodiment, responsive to a user interaction with region 2220, a new virtual meeting may be advantageously initiated without requiring a user to specify a start time, one or more invitees, other options, etc. In this manner, embodiments of the present invention enable users to more easily and/or more conveniently setup virtual meetings which are to begin immediately and/or in the near future.

Figure 23:
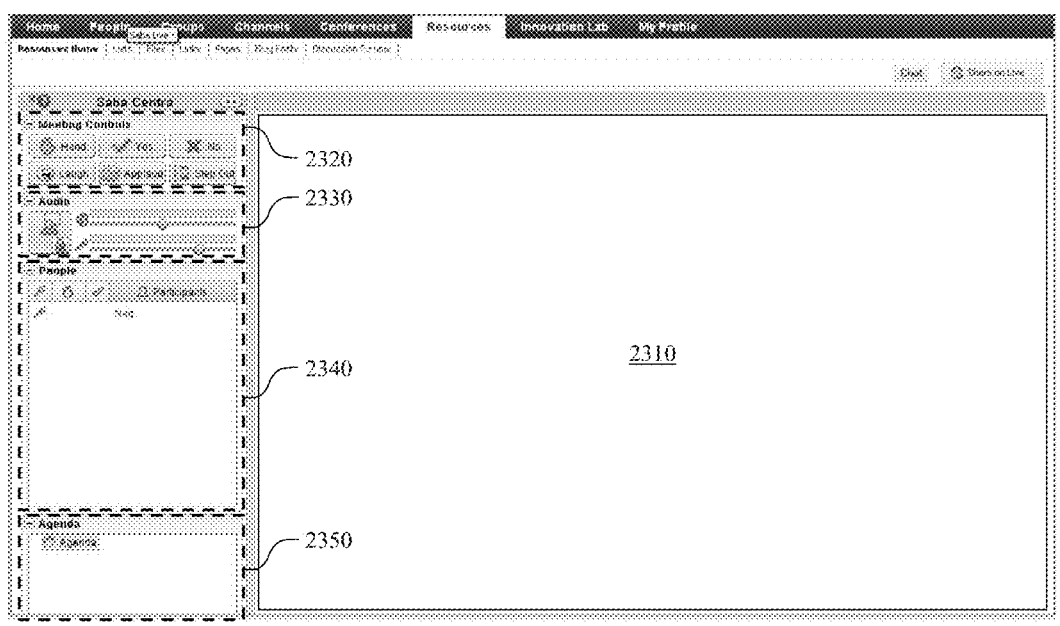
FIG. 23 shows an exemplary on-screen graphical user interface for enabling a user to attend a virtual meeting in accordance with one embodiment of the present invention.

FIG. 23 shows exemplary on-screen graphical user interface 2300 for enabling a user to attend a virtual meeting in accordance with one embodiment of the present invention. In one embodiment, GUI 2300 may be displayed by a web browser and/or a web-browser plug-in, thereby enabling a user to attend a virtual meeting without installing another application (e.g., utilizing a web browser which was already installed on the computer system). And in one embodiment, GUI 2300 may be displayed by an application separate from a web browser.

As shown in FIG. 23, region 2310 may be used to present and/or interact with content associated with a virtual meeting. For example, at least one file, at least one document, at least one worksheet, at least one slide, at least one image or other content may be displayed in region 2310 during the virtual meeting. As another example, video or images may be displayed in region 2310 to enable an attendee at one location to view an attendee at another location. As yet another example, at least a portion of an image (e.g., including a desktop of an operating system, at least one window displayed responsive to an execution of an application, etc.) displayed on a display screen of one computer system (e.g., used by one or more users to attend the virtual meeting) may be displayed in region 2310 on a display screen of another computer system (e.g., used by one or more other users to attend the virtual meeting). In this manner, a user of one computer system may be able to remotely observe actions performed by another user on another computer system during the virtual meeting.

Region 2320 may enable a user to perform one or more actions during the virtual meeting. For example, an interaction with region 2320 may cause an image (e.g., an icon, animation, video, etc.) and/or a sound (e.g., applauding, laughter, etc.) to be rendered by a computer system (e.g., located remotely from the computer system used to display GUI 2300) used by another attendee of the virtual meeting. In one embodiment, the image (e.g., an icon, animation, video, etc.) may be displayed in a region of GUI 2300 (e.g., in region 2340 next to the user's name who interacted with region 2320 to cause the image to be rendered). As another example, an interaction with region 2320 may be used to indicate that a user agrees or disagrees with an action, proposal, etc. during the virtual meeting. And as yet another example, an interaction with region 2320 may be used to change a status (e.g., engaged in the virtual meeting, temporarily stepping out from the virtual meeting, no longer attending the virtual meeting, etc.) of an attendee of the virtual meeting. And as a further example, an interaction with region 2320 may cause audio associated with the user of GUI 2300 (e.g., captured using a microphone coupled to the computer system used to display GUI 2300) to be muted (e.g., if the user wishes to leave or step away from the virtual meeting).

As shown in FIG. 23, region 2330 may be used to control audio associated with GUI 2300 (e.g., rendered using a speaker coupled to the computer system used to display GUI 2300, captured using a microphone coupled to the computer system used to display GUI 2300, etc.). For example, region 2330 may be used to increase the volume, decrease the volume, or otherwise control the volume of rendered audio associated with the virtual meeting. As another example, region 2330 may be used to increase the volume, decrease the volume, or otherwise control the volume of captured audio associated with the virtual meeting.

Region 2340 may be used to display information about attendees of the virtual meeting. For example, region 2340 may display a list of users attending the virtual meeting. As another example, region 2340 may display respective information about whether or not audio is enabled for one or more of the attendees. And as yet another example, region 2340 may display a respective status (e.g., engaged in the virtual meeting, temporarily stepping out from the virtual meeting, no longer attending the virtual meeting, etc.) of one or more of the attendees.

As shown in FIG. 23, region 2350 may be used to share information associated with the virtual meeting. For example, region 2350 may display a list of content (e.g., at least one file, at least one document, at least one worksheet, at least one slide, at least one image, some combination thereof, etc.), where a user interaction with a portion of content may enable the user to download the content to or present the content on the computer system displaying GUI 2300, another system or device, etc.

In one embodiment, a plurality of virtual meetings may be used to implement a virtual conference. For example, each session of a conference may be conducted using a separate virtual meeting that may be attended by one or more users (e.g., using GUI 2300). The virtual meetings associated with the virtual conference may be recorded and become content accessible to one or more users. A user may be advantageously notified of one or more specific sessions and/or virtual meetings associated with the virtual conference, all virtual meetings associated with a specific category of the virtual conference, all virtual meetings of the virtual conference, etc. In this manner, a user may access content associated with a plurality of sessions of the virtual conference (e.g., even though the user does not physically attend the sessions and/or access the virtual meetings of the sessions in real time) by viewing recordings of the virtual meetings and/or accessing content associated with each of the sessions.

In one embodiment, a user may be made aware of and/or be able to interact with other users (e.g., using GUI 2300) who attend or are otherwise associated with at least one session of the virtual conference. In this manner, embodiments of the present invention can enhance a user's experience at a virtual conference by enabling the user to access more information associated with a virtual conference, to interact with more users attending the virtual conference, etc.

Figure 24:
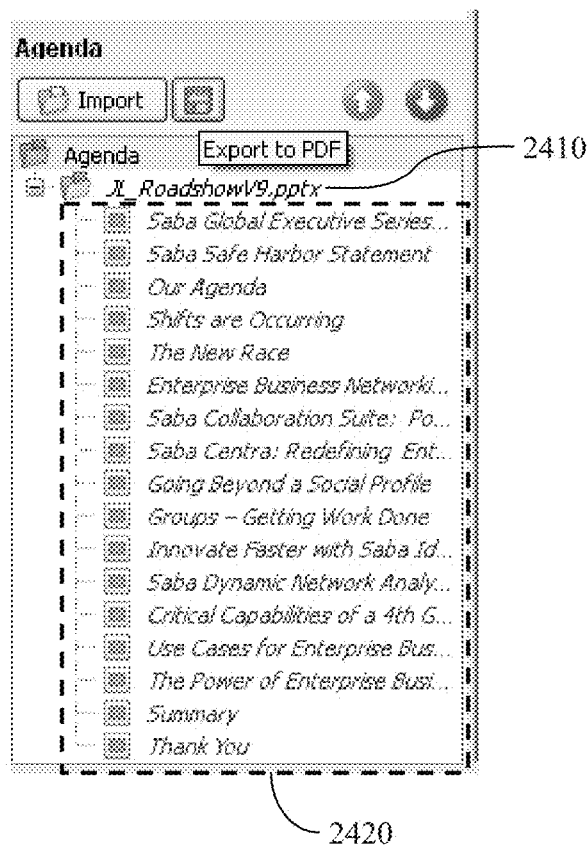
FIG. 24 shows an exemplary on-screen graphical user interface for sharing content during a virtual meeting in accordance with one embodiment of the present invention.

FIG. 24 shows exemplary on-screen graphical user interface 2400 for sharing content during a virtual meeting in accordance with one embodiment of the present invention. In one embodiment, GUI 2400 may be displayed in region 2350 of GUI 2300 of FIG. 23.

As shown in FIG. 24, region 2410 includes an identifier of content (e.g., a slideshow), where the identifier of the content may be part of a listing of content displayed in GUI 2400 and/or region 2350 of GUI 2300. In one embodiment, a user interaction with region 2410 may cause a listing of slides of the slideshow to be displayed in region 2420. In one embodiment, a user interaction with region 2410 may cause the entire slideshow to be downloaded and/or displayed (e.g., in region 2310, in a window used to display GUI 2300, in a window separate from the window used to display GUI 2300, etc.). And in one embodiment, a user interaction with region 2420 may cause one or more particular slides to be downloaded and/or displayed (e.g., in region 2310, in a window used to display GUI 2300, in a window separate from the window used to display GUI 2300, etc.).

Turning back to FIG. 23, one or more attendees of the virtual meeting may add content and/or share content with other attendees using region 2350. Additionally, in one embodiment, information shared using region 2350 may be included along with a recording of the virtual meeting as content which is searchable (e.g., using GUI 1000A of FIG. 10A) by users of one or more groups (e.g., selected using region 1910 of GUI 1900), may be flagged (e.g., using region 1020 of GUI 1000A to remove the recording from circulation such that it is excluded from the search results of subsequent searches), may be certified (e.g., using region 1030 of GUI 1000A to indicate an approval or level of respect for the recording, to reduce the ability to flag the recording, to prevent other users from flagging the recording, etc.), some combination thereof, etc.

Figure 25:
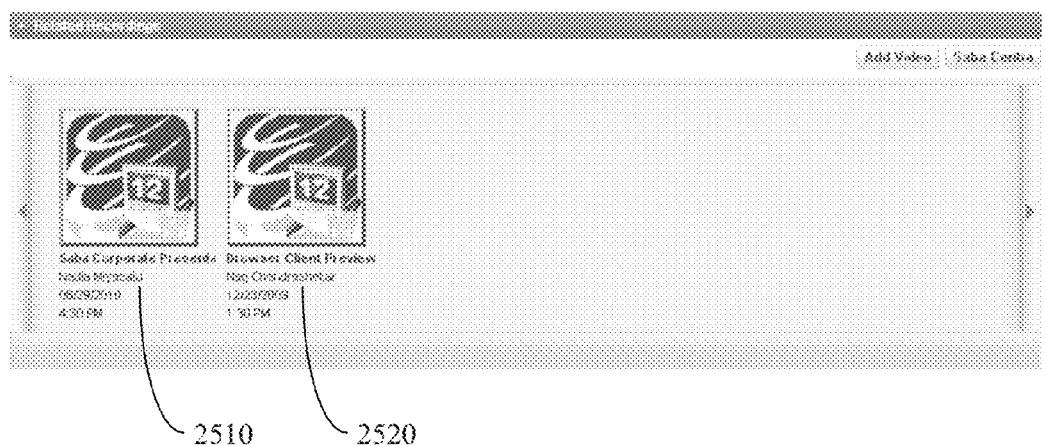
FIG. 25 shows an exemplary on-screen graphical user interface for displaying content associated with a recording of a virtual meeting in accordance with one embodiment of the present invention.

FIG. 25 shows exemplary on-screen graphical user interface 2500 for displaying content associated with a recording of a virtual meeting in accordance with one embodiment of the present invention. In one embodiment, GUI 2500 may be displayed (e.g., as part of GUI 1000A of FIG. 10A, concurrently with GUI 1000A in a separate window from a window used to display GUI 1000A, etc.) responsive to a search for content which includes at least one recording of a virtual meeting. In one embodiment, GUI 2500 may be displayed concurrently with or as part of GUI 2300 of FIG. 23.

As shown in FIG. 25, content 2510 and content 2520 may each be associated with a recording of a virtual meeting. In one embodiment, content 2510 and/or content 2520 may be recordings of other virtual meetings. In one embodiment, content 2510 and/or content 2520 may be another type of content (e.g., a file, a document, a worksheet, a slide, an image, etc.).

Although FIGS. 16 through 25 show GUIs (e.g., GUI 1600, GUI 1700, GUI 1800, GUI 1900, GUI 2000, GUI 2100, GUI 2200, GUI 2300, GUI 2400 and GUI 2500) with a specific number, arrangement, appearance and size of regions, it should be appreciated that one or more of the GUIs may include a different number, arrangement, appearance and/or size of regions in other embodiments. Additionally, although the GUIs (e.g., GUI 1600, GUI 1700, GUI 1800, GUI 1900, GUI 2000, GUI 2100, GUI 2200, GUI 2300, GUI 2400 and GUI 2500) depicted in FIGS. 16 through 25 have been described with certain functionalities, it should be appreciated that one or more of the GUIs depicted in FIGS. 16 through 25 may function differently in other embodiments.

In one embodiment, one or more of the GUIs discussed herein (e.g., GUI 1600, GUI 1700, GUI 1800, GUI 1900, GUI 2000, GUI 2100, GUI 2200, GUI 2300, GUI 2400, GUI 2500, etc.) may be displayed using a web browser executed by a computer system. The GUIs may be advantageously displayed using code downloaded and executed by the computer system (e.g., similar to a web browser plug-in) with reduced user interaction and/or user awareness. Alternatively, one or more of the GUIs discussed herein (e.g., GUI 1600, GUI 1700, GUI 1800, GUI 1900, GUI 2000, GUI 2100, GUI 2200, GUI 2300, GUI 2400, GUI 2500, etc.) may be displayed using an application executed by the computer system which is separate from a web browser.

FIGS. 26A and 26B show a flowchart of exemplary computer-implemented process 2600 for managing a virtual meeting in accordance with one embodiment of the present invention. In one embodiment, one or more steps of process 2600 may be performed by a web browser plug-in. And in one embodiment, one or more steps of process 2600 may be performed by an application separate from a web browser.

As shown in FIG. 26A, step 2610 involves accessing a user selection of a first group. In one embodiment, the first group (e.g., listed in region 1662) may be selected using region 1660 of GUI 1600. The first group may be associated with at least one business entity. The first group may be created by a user (e.g., the user created in step 1405 of process 1400 or any other user) using a GUI (e.g., GUI 500 of FIG. 5). Additionally, content (e.g., including text, a link, a blog entry, an image, a video, audio data, a list of bookmarked content, a list of bookmarked users, some combination thereof, etc.) uploaded by users (e.g., to content database 112) may be associated with the first group.

Step 2620 involves determining a first plurality of users associated with the first group (e.g., associated with the user selection accessed in step 2610). In one embodiment, the first plurality of users associated with the first group may be determined in step 2620 by indexing user data 116.

As shown in FIG. 26A, step 2630 involves notifying the first plurality of users of a virtual meeting. In one embodiment, step 2630 may involve notifying the first plurality of users of the virtual meeting by displaying at least one notification in at least one GUI (e.g., GUI 2000 of FIG. 20, GUI 2100 of FIG. 21, etc.), where the at least one GUI may enable one or more users to join or attend the virtual meeting (e.g., by causing GUI 2300 to be displayed). In one embodiment, step 2630 may involve notifying the first plurality of users of the virtual meeting by sending an email (e.g., electronic mail message) to one or more of the first plurality of users, where each email may include a link enabling a respective user to join or attend the virtual meeting (e.g., by causing GUI 2300 to be displayed).

Step 2640 involves facilitating the virtual meeting. The virtual meeting may be conducted in step 2640 by displaying a respective instance of a GUI (e.g., 2300 of FIG. 23) on each of a plurality of computer systems (e.g., 2700, 120, 130, 140, 150, 160, 170, etc.), where the plurality of computer systems may be located remotely from one another. In one embodiment, the plurality of computer systems may be coupled via the Internet, and therefore, the virtual meeting may be conducted over the Internet. In one embodiment, the GUI (e.g., 2300) used to attend the virtual meeting may be displayed by a web browser and/or a web-browser plug-in, thereby enabling a user to attend the virtual meeting without installing another application (e.g., utilizing a web browser which was already installed on the computer system). And in one embodiment, the GUI (e.g., 2300) used to attend the virtual meeting may be displayed by an application separate from a web browser.

As shown in FIG. 26A, step 2650 involves recording the virtual meeting. A recording may be generated which includes video data, where the video data may include at least one image displayed on one or more of the GUIs (e.g., one or more instances of GUI 2300) used to attend the virtual meeting. In one embodiment, the recording may include audio data from the virtual meeting (e.g., captured by a microphone coupled to a computer system used to display an instance of GUI 2300), where the audio may be sent over the Internet (using a protocol such as VoIP or the like) or over a telephone service (e.g., landline telephone, mobile phone, a communication technology which is not Internet-based, etc.).

Step 2660 involves providing access to content associated with the virtual meeting. The content may be made accessible via a region (e.g., 2350) of the GUI (e.g., 2300) used to attend the virtual meeting. In one embodiment, an identifier of the content (e.g., in region 2410 of GUI 2400) may be listed with other content associated with the virtual meeting (e.g., as shown in FIG. 24), where a user interaction with the identifier of the content may cause the content to be downloaded and/or displayed (e.g., in region 2310, in a window used to display GUI 2300, in a window separate from the window used to display GUI 2300, etc.). In one embodiment, step 2660 may be performed simultaneously or contemporaneously with step 2650.

As shown in FIG. 26B, step 2670 involves accessing a user selection of a second group. In one embodiment, the second group (e.g., listed in region 1920) may be selected using region 1910 of GUI 1900. The second group may be associated with at least one business entity. The second group may be created by a user (e.g., the user created in step 1405 of process 1400 or any other user) using a GUI (e.g., GUI 500 of FIG. 5). Additionally, content (e.g., including text, a link, a blog entry, an image, a video, audio data, a list of bookmarked content, a list of bookmarked users, some combination thereof, etc.) uploaded by users (e.g., to content database 112) may be associated with the second group.

Step 2680 involves determining a second plurality of users associated with the second group (e.g., associated with the user selection accessed in step 2670). In one embodiment, the second plurality of users associated with the second group may be determined in step 2680 by indexing user data 116. In one embodiment, the first plurality of users (e.g., determined in step 2620) may be a subset of the second plurality of users determined in step 2680. And in one embodiment, the first plurality of users (e.g., determined in step 2620) may be different from the second plurality of users determined in step 2680.

As shown in FIG. 26B, step 2690 involves providing access to the recording of the virtual meeting (e.g., generated in step 2650) to the second plurality of users (e.g., determined in step 2680). In one embodiment, step 2690 may involve enabling one or more users (e.g., of the second plurality of users) to search for the recording of the virtual meeting (e.g., using GUI 1000A of FIG. 10A), where results of a search (e.g., displayed in region 1010 of GUI 1000A) may include the recording of the virtual meeting. In one embodiment, step 2690 may involve enabling one or more users (e.g., of the second plurality of users) to flag the recording of the virtual meeting (e.g., using region 1020 of GUI 1000A to remove the recording from circulation such that it is excluded from the search results of subsequent searches). And in one embodiment, step 2690 may involve enabling one or more users (e.g., of the second plurality of users) to certify the recording of the virtual meeting (e.g., using region 1030 of GUI 1000A to indicate an approval or level of respect for the recording, to reduce the ability to flag the recording, to prevent other users from flagging the recording, etc.).

Method and System for Analyzing Contribution to a Business Entity

Embodiments of the present invention are directed to a computer-implemented method, computer-readable medium and system for analyzing contribution to a business entity (e.g., in accordance with process 2700 of FIG. 27). For example, at least one assessment of a user (e.g., at least one rating of the user input using GUI 3000 of FIG. 30, at least one tag associated with the user input using GUI 2800 of FIG. 28, at least one comment about the user input using GUI 3000 of FIG. 30, at least one skill associated with the user input using GUI 3000 of FIG. 30, at least one other user following the user as initiated using GUI 2800 of FIG. 28, at least one bookmark of the user by at least one other user initiated using GUI 2800 of FIG. 28, at least one sharing of the user by at least one other user initiated using GUI 1000C of FIG. 10C, etc.) and at least one assessment of content contributed by the user (e.g., at least one rating of the content input using GUI 1000A of FIG. 10A, at least one tag associated with the content input using GUI 1000A of FIG. 10A, at least one bookmark of the content initiated using GUI 1000A of FIG. 10A, at least one flagging of the content initiated using GUI 1000A of FIG. 10A, at least one certification of the content initiated using GUI 1000A of FIG. 10A, at least one sharing of the content initiated using GUI 1000C of FIG. 10C, etc.) may be tracked and/or stored, where the at least one assessment of a user and/or the at least one assessment of the content may be used to determine a level of contribution to a business entity for the user (e.g., in accordance with step 2750 of process 2700).

The level of contribution may be based on a number of users following the user (e.g., initiated using GUI 2800 of FIG. 28), a number of users who have shared the content (e.g., using GUI 1000C of FIG. 10C), a number of users who have bookmarked the content (e.g., initiated using GUI 1000A of FIG. 10A), feedback to the user from at least one other user (e.g., based on at least one comment input using GUI 3000 of FIG. 30, at least one rating input using GUI 3000 of FIG. 30, as displayed in GUI 3100 of FIG. 31, as displayed in GUI 3200 of FIG. 32, as displayed in GUI 3300 of FIG. 33, etc.), an amount of the content (e.g., a number of portions of content contributed by the user), an average rating of the content (e.g., based on an average of the respective ratings input using GUI 1000A of FIG. 10A of each portion of content), etc. Data associated with the level of contribution may be used as part of a formal review of the user, displayed (e.g., in GUI 3100 of FIG. 31) as part of a profile of the user accessible to at least one other user, or for some other purpose. In this manner, a user's informal contributions to the business entity may be acknowledged, thereby encouraging users to share information or otherwise make informal contributions to the business.

FIG. 27 shows a flowchart of exemplary computer-implemented process 2700 for analyzing and/or reporting contribution to a business entity in accordance with one embodiment of the present invention. In one embodiment, one or more steps of process 2700 may be performed by a web browser plug-in. And in one embodiment, one or more steps of process 2700 may be performed by an application separate from a web browser.

As shown in FIG. 27, step 2710 involves enabling users of a business entity to assess other users. A user may assess another user in step 2710 by rating (e.g., assigning a numerical rating to, a number of stars to, etc.) the other user (e.g., using GUI 3000 of FIG. 30), tagging (e.g., assigning a word to, a phrase to, etc.) the other user (e.g., using GUI 2800 of FIG. 28), commenting on the other user (e.g., using GUI 3000 of FIG. 30), assigning one or more skills (e.g., selected from a group determined by the business entity, created by the user assigning the skill, etc.) to the other user (e.g., using GUI 3000 of FIG. 30), following the other user (e.g., using GUI 2800 of FIG. 28, using GUI 2900 of FIG. 29, etc.), bookmarking the other user (e.g., using GUI 2800 of FIG. 28), sharing the other user (e.g., using GUI 2800 of FIG. 28, using GUI 1000C of FIG. 10C), etc.

Figure 28:
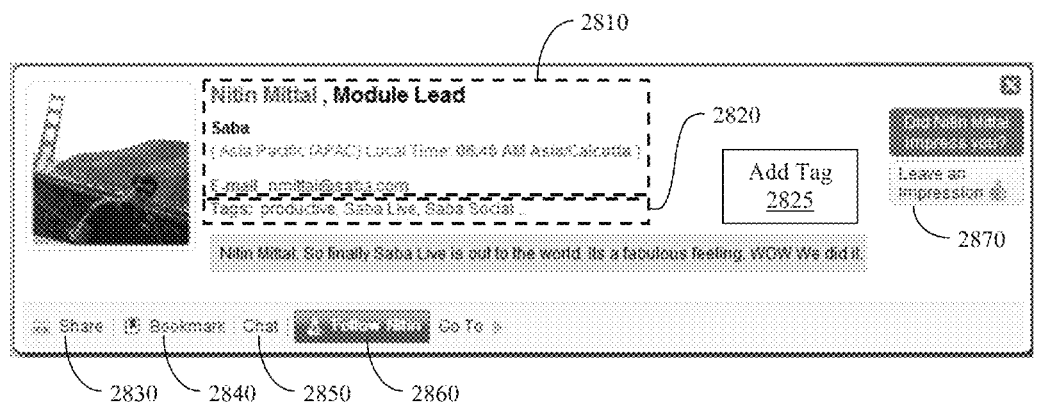
FIG. 28 shows an exemplary on-screen graphical user interface for assessing a user in accordance with one embodiment of the present invention.

FIG. 28 shows exemplary on-screen graphical user interface 2800 for assessing a user in accordance with one embodiment of the present invention. As shown in FIG. 28, region 2810 includes information about the user. For example, region 2810 may include the name of the user, a role or title of the user, a location of the user, an email address of the user, other information about the user, etc.

Region 2820 may include one or more tags associated with the user. A tag may be any word, phrase, etc. associated with the user. For example, a tag may describe how the user performs or functions (e.g., "productive," another adjective, an adverb, etc.). As another example, a tag may be a product, group, business unit, or some other word or phrase associated with the user.

As shown in FIG. 28, region 2825 may include one or more fields used to add a tag to a user. In one embodiment, responsive to a user entering a tag using region 2825, the newly-entered tag may be displayed in region 2820. Adding a tag to a user may be one form of assessing the other user (e.g., identified in region 2810).

Region 2830 may enable the sharing of one user (e.g., identified in region 2810) with another user. In one embodiment, responsive to an interaction with region 2830, GUI 1000C of FIG. 10C may be displayed enabling a first user to share a second user (e.g., identified in region 2810) with a third user (e.g., identified using region 1085 of GUI 1000C, part of a group identified using region 1085 of GUI 1000C, etc.).

As shown in FIG. 28, region 2840 may enable a user to bookmark another user (e.g., identified in region 2810). In one embodiment, an interaction with region 2840 may cause the user identified in region 2810 to be displayed in GUI 1000B of FIG. 10B (e.g., responsive to a user initiation or display of GUI 1000B of FIG. 10B).

Region 2850 may enable a user to chat with another user (e.g., identified in region 2810). In one embodiment, responsive to an interaction with region 2850, another GUI (e.g., including a chat window or the like) may be displayed enabling the users to chat (e.g., send one or more instant messages back and forth to one another).

As shown in FIG. 28, region 2860 may enable a user to follow another user (e.g., identified in region 2810). In one embodiment, responsive to an interaction with region 2860, the user (e.g., of GUI 2800) may be subscribed to receive information (e.g., announcements, actions, other information, etc.) about the other user (e.g., identified in step 2810). Information received about at least one other user may be displayed in a GUI (e.g., GUI 2900 of FIG. 29) in one embodiment.

Figure 29:
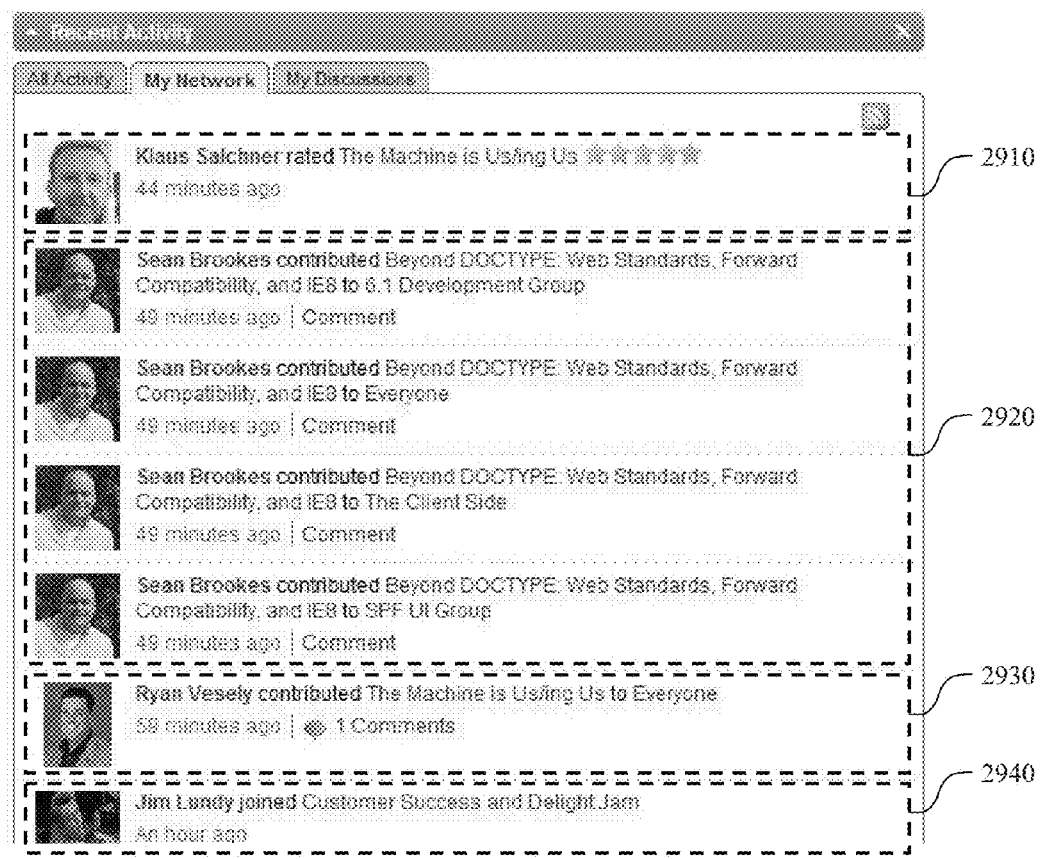
FIG. 29 shows an exemplary on-screen graphical user interface for assessing information about another user in accordance with one embodiment of the present invention.

FIG. 29 shows exemplary on-screen graphical user interface 2900 for assessing information about another user in accordance with one embodiment of the present invention. As shown in FIG. 29, region 2910 may include information about a first user (e.g., that the first user rated content), region 2920 may include information about a second user (e.g., that the second user contributed multiple portions of content), region 2930 may include information about a third user (e.g., that the third user contributed content which was rated by the first user associated with region 2910), and region 2940 may include information about a fourth user (e.g., that the fourth user joined a group). In one embodiment, a user initiating the display of GUI 2900 may be following each user associated with a respective region of GUI 2900 (e.g., regions 2910, 2920, 2930, 2940, etc.). And in one embodiment, the information displayed in GUI 2900 may be displayed as a result of a user "following" the other users (e.g., associated with the information displayed in regions 2910, 2920, 2930 and 2940), where each of the other users may be "followed" by interacting with a region (e.g., similar to region 2860) of a respective GUI (e.g., similar to GUI 2800) associated with each of the other users in one embodiment.

Turning back to FIG. 28, region 2870 may be used to further assess a user (e.g., identified in region 2810). In one embodiment, responsive to an interaction with region 2870, another GUI (e.g., 3000 of FIG. 30) may be displayed to enable the user to further assess the user (e.g., identified in region 2810).

Figure 30:
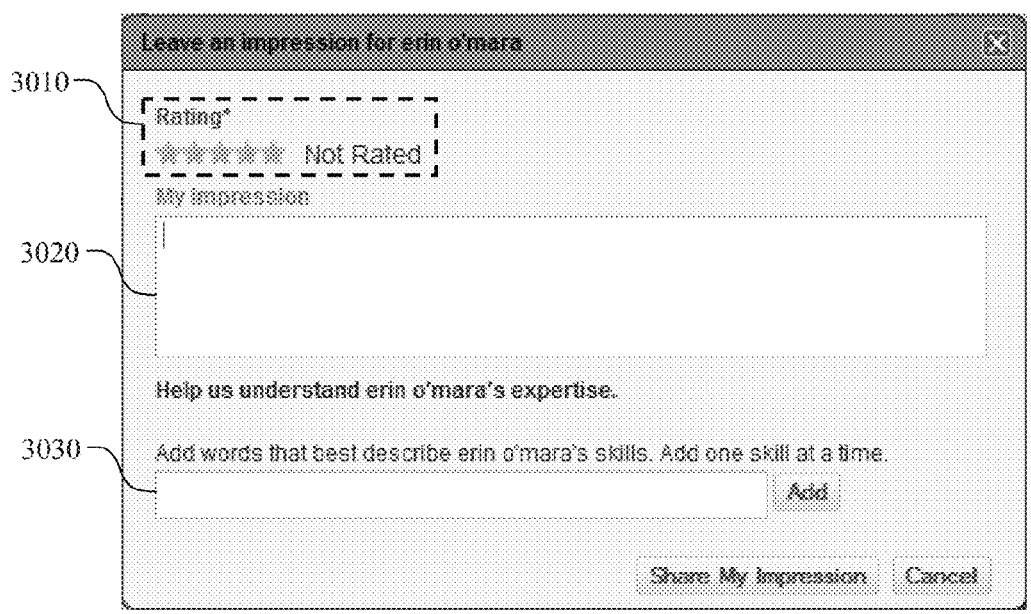
FIG. 30 shows an exemplary on-screen graphical user interface for enabling the further assessment of a user in accordance with one embodiment of the present invention.

FIG. 30 shows exemplary on-screen graphical user interface 3000 for enabling the further assessment of a user in accordance with one embodiment of the present invention. As shown in FIG. 30, region 3010 includes one or more fields enabling a user to rate another user (e.g., identified in region 2810). For example, region 3010 may be used to input a numerical rating for the user, a number of stars for the user, etc.

Region 3020 may include one or more fields enabling a user to comment on another user (e.g., identified in region 2810). For example, a user may enter text describing the user's performance, opinion of the user, or other information about the user. In one embodiment, the comments may explain or otherwise correspond to the rating input using region 3010.

As shown in FIG. 30, region 3030 may include one or more fields enabling a user to enter a skill to be assigned to another user (e.g., identified in region 2810). For example, a user may enter information indicating one or more programs or applications that the other user (e.g., identified in region 2810) has mastered. As another example, a user may select from a set of skills which are predetermined by the business entity.

Turning back to FIG. 27, step 2720 involves enabling users of a business entity to assess content contributed by other users. A user may assess content contributed by another user in step 2720 by rating (e.g., assigning a numerical rating to, a number of stars to, etc.) the content (e.g., using region 1010 of GUI 1000A), tagging (e.g., assigning a word to, a phrase to, etc.) the content (e.g., using region 1019 of GUI 1000A), bookmarking the content (e.g., using region 1040 of GUI 1000A), flagging the content (e.g., using region 1020 of GUI 1000A), certifying the content (e.g., using region 1030 of GUI 1000A), sharing the content (e.g., using region 1050 of GUI 1000C, using GUI 1000C of FIG. 10C, etc.), etc.

Step 2730 involves tracking (e.g., over a period of time) and storing at least one assessment (e.g., made in step 2710) of a user as first data. The first data may be stored as part of user data 116 on content server 110 in one embodiment.

As shown in FIG. 27, Step 2740 involves tracking (e.g., over a period of time) and storing at least one assessment (e.g., made in step 2720) of content contributed by the user (e.g., associated with the at least one assessment of step 2730) as second data. The second data may be stored as part of content data 114 on content server 110 in one embodiment.

Step 2750 involves generating third data, associated with a level of contribution by the user to the business entity, based on the first data (e.g., stored in step 2730) and the second data (e.g., stored in step 2740). For example, the third data generated in step 2750 may include a number of users following the user (e.g., associated with the at least one assessment of step 2730), a number of users who have shared content (e.g., associated with the at least one assessment of step 2740) contributed by the user (e.g., associated with the at least one assessment of step 2730), a number of users who have bookmarked content (e.g., associated with the at least one assessment of step 2740) contributed by the user (e.g., associated with the at least one assessment of step 2730), feedback to the user (e.g., associated with the at least one assessment of step 2730) from at least one other user (e.g., based on at least one comment input using GUI 3000 of FIG. 30, at least one rating input using GUI 3000 of FIG. 30, as displayed in GUI 3100 of FIG. 31, as displayed in GUI 3200 of FIG. 32, as displayed in GUI 3300 of FIG. 33, etc.), an amount of content (e.g., associated with the at least one assessment of step 2740) contributed by the user (e.g., associated with the at least one assessment of step 2730), and an average rating of content (e.g., associated with the at least one assessment of step 2740) contributed by the user (e.g., associated with the at least one assessment of step 2730), etc. As such, in one embodiment, the third data may represent a quantity and/or quality of informal contributions by the user to the business entity (e.g., as a whole, to other members of the business entity individually, etc.).

As shown in FIG. 27, step 2760 involves performing an operation using the third data. For example, the third data may be used in step 2760 to advantageously supplement formal contributions made by a user (e.g., the completion of one or more job objectives set by a manager which may be considered mandatory to performing the job) as part of a formal review process of the business entity. In one embodiment, the third data may be displayed and/or formatted in accordance with GUI 3100 of FIG. 31, GUI 3200 of FIG. 32, GUI 3300 of FIG. 33, in some other arrangement, etc. In this manner, the user's informal contributions to the business entity (e.g., which may have otherwise gone unnoticed or have been incorrectly attributed to another user) may be acknowledged (e.g., alone or in combination with formal contributions).

As another example, the third data may be displayed in step 2760 as part of a profile of the user, where the user's profile may be accessible to at least one other user. In one embodiment, the third data may be displayed and/or formatted in accordance with GUI 3100 of FIG. 31, GUI 3200 of FIG. 32, GUI 3300 of FIG. 33, in some other arrangement, etc. In this manner, the user's informal contributions to the business entity (e.g., which may have otherwise gone unnoticed) may be acknowledged (e.g., by other members of the business entity).

Figure 31:
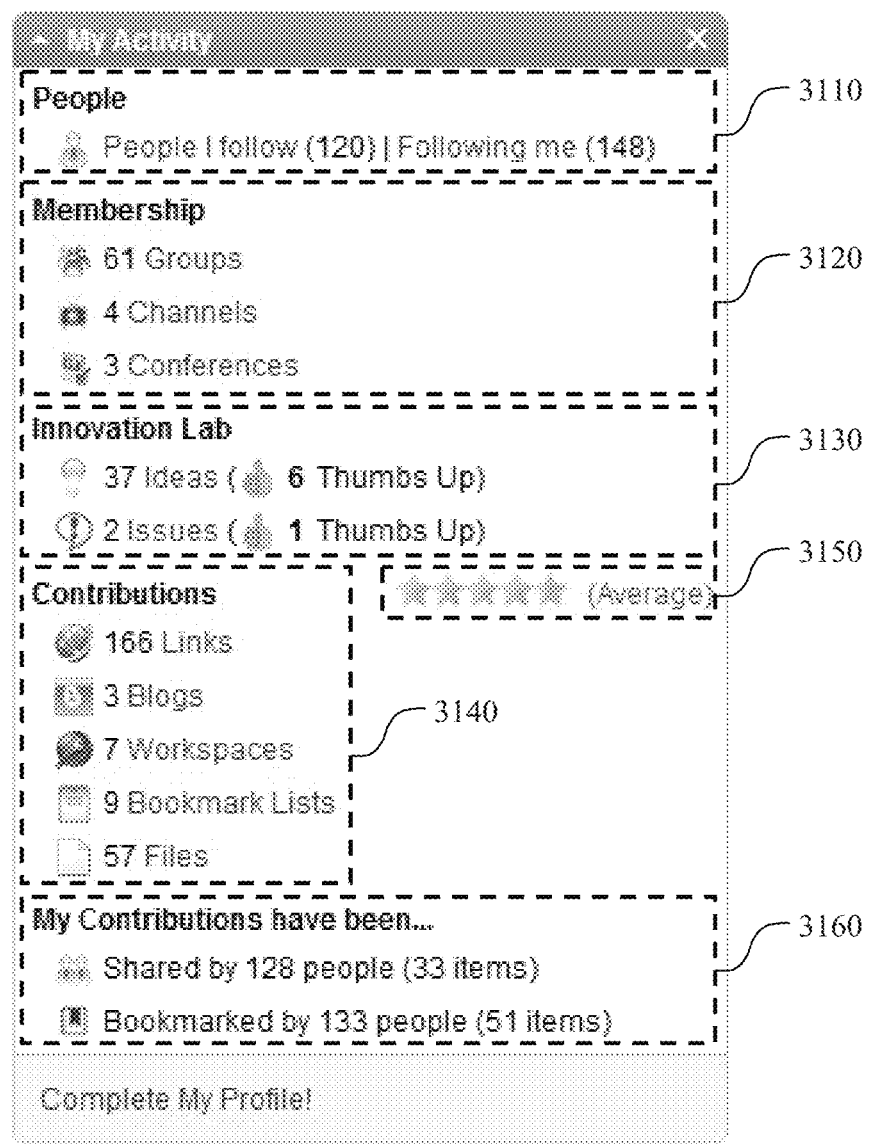
FIG. 31 shows an exemplary on-screen graphical user interface for displaying information about a user in accordance with one embodiment of the present invention.

FIG. 31 shows exemplary on-screen graphical user interface 3100 for displaying information about a user in accordance with one embodiment of the present invention. The information displayed in GUI 3100 may be based on the first data (e.g., stored in step 2730 of process 2700), second data (e.g., stored in step 2740 of process 2700), third data (e.g., generated in step 2750 of process 2700), some combination thereof, etc. In one embodiment, information in GUI 3100 may be accessible to at least one other of the business entity. And in one embodiment, GUI 3100 may be part of a GUI used to conduct a formal review of a user and/or include information used as part of a formal review of a user.

As shown in FIG. 31, region 3110 may include a number of users followed by the user, a number of users currently following the user, etc. Region 3120 may include membership information associated with the user (e.g., a number of groups the user is a member of, a number of channels the user is associated with, a number of conferences the user is associated with, etc.). Region 3130 may include a number of ideas contributed by the user (e.g., using region 650 of GUI 600) and/or a number of issues contributed by the user (e.g., using region 640 of GUI 600). Region 3130 may also include information about how at least one other user felt about the ideas and/or issues contributed by the user (e.g., indicated by a number of "thumbs up" and/or a number of "thumbs down").

Region 3140 may include information about contributions made by the user. For example, region 3140 may include a number of links contributed by the user (e.g., using region 610 of GUI 600), a number of blogs contributed by the user (e.g., using region 670 of GUI 600), a number of workspaces associated with the user, a number of bookmark lists associated with the user, a number of files contributed by the user (e.g., using region 620 of GUI 600, using GUI 700, using GUI 800, etc.), other information, etc.

As shown in FIG. 31, region 3150 may include an average rating of content contributed by a user (e.g., as shown in region 3130, region 3140, etc.). For example, the average rating displayed in region 3150 may be determined by averaging the respective ratings (e.g., input using GUI 1000A of FIG. 10A) of each portion of content.

Region 3160 may include information about content contributed by the user. For example, region 3160 may include a number of other users who have shared content contributed by the user. In one embodiment, region 3160 may also include the number of portions of content which have been shared by at least one other user. As another example, region 3160 may include a number of other users who have bookmarked content contributed by the user. In one embodiment, region 3160 may also include the number of portions of content which have been bookmarked by at least one other user.

Figure 32:
FIG. 32 shows an exemplary on-screen graphical user interface for displaying information associated with at least one assessment of a user in accordance with one embodiment of the present invention.

FIG. 32 shows exemplary on-screen graphical user interface 3200 for displaying information associated with at least one assessment of a user in accordance with one embodiment of the present invention. The information displayed in GUI 3200 may be based on the first data (e.g., stored in step 2730 of process 2700), second data (e.g., stored in step 2740 of process 2700), third data (e.g., generated in step 2750 of process 2700), some combination thereof, etc. In one embodiment, information in GUI 3200 may be accessible to at least one other of the business entity. And in one embodiment, GUI 3200 may be part of a GUI used to conduct a formal review of a user and/or include information used as part of a formal review of a user.

As shown in FIG. 32, region 3210 may include at least one comment about the user made by at least one other user (e.g., using region 3020 of GUI 3000). Region 3210 may include at least one rating of the user made by at least one other user (e.g., using region 3010 of GUI 3000). In one embodiment, region 3210 may also display information (e.g., a name, title, picture, etc.) about the at least one other user who commented about and/or rated the user.

Region 3220 may include an average rating of the user. For example, the average rating displayed in region 3220 may be determined by averaging the respective ratings (e.g., displayed in region 3210) made by each user. In one embodiment, region 3220 may also include the number of ratings which were used to determine the average rating.

Turning back to FIG. 27, the third data may be used in step 2760 to perform analysis associated with the user (e.g., associated with the at least one assessment of step 2730) with respect to at least one other user based on a respective contribution level of each user and/or identify at least one leading contributor of the business entity. For example, the users may be ranked based upon a number of users following each of the users, a number of users who have shared content contributed by each of the users, or any other parameter (e.g., displayed in a region of GUI 3200 of FIG. 32) associated with a level of contribution of each user. In one embodiment, one or more of the leading contributors (e.g., as determined based on the third data) may be used as resources (e.g., for directing other members in need of information that the top contributor is likely to have or know about, to interface with representatives from other business entities, to interface with members of the public as a representative of the business entity, etc.) of the business entity.

Figure 33:
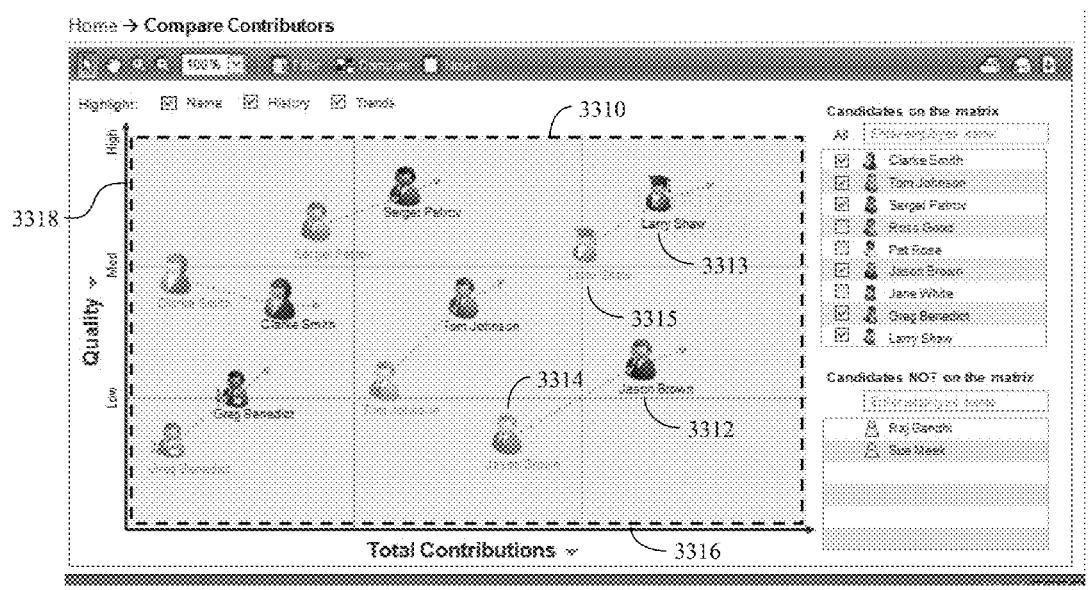
FIG. 33 shows an exemplary on-screen graphical user interface for performing analysis associated with a user in accordance with one embodiment of the present invention.

FIG. 33 shows exemplary on-screen graphical user interface 3300 for performing analysis associated with a user in accordance with one embodiment of the present invention. The information displayed in GUI 3300 may be based on the first data (e.g., stored in step 2730 of process 2700), second data (e.g., stored in step 2740 of process 2700), third data (e.g., generated in step 2750 of process 2700), some combination thereof, etc. In one embodiment, information in GUI 3300 may be accessible to at least one other of the business entity. And in one embodiment, GUI 3300 may be part of a GUI used to conduct a formal review of a user and/or include information used as part of a formal review of a user.

As shown in FIG. 33, region 3310 may include information about one or more users. For example, element 3312 may be associated with a first user, element 3313 may be associated with a second user, etc. The location of each element (e.g., 3312, 3313, etc.) in region 3310 may indicate a number of portions of content contributed by a user (e.g., as indicated by x-axis 3316) and a quality level of the portions of content contributed by a user (e.g., as indicated by y-axis 3318). In one embodiment, the quality of the portions of content contributed by the user may be determined based an average rating of the content (e.g., as indicated in region 3150, another assessment of the content, etc.), based upon the second data (e.g., stored in step 2740 of process 2700), based upon the third data (e.g., generated in step 2750 of process 2700), some combination thereof, etc.

In one embodiment, additional information about a user may be determined using GUI 3330. For example, if a user has a low number of high quality contributions (e.g., corresponding to an element displayed towards the upper-left of region 3310), then it may be determined that the user has potential to grow and contribute to the business entity and/or other users of the business entity. As another example, if a user has a relatively large number of high quality contributions, then the user may be determined to be an expert, an asset to the business entity, etc.

In one embodiment, region 3310 may be used to show trends or otherwise track data associated with contributions of users over time. For example, element 3314 may provide information (e.g., a number of contributions of portions of content, a quality level of the portions of content, etc.) about the first user (e.g., associated with element 3313) for a different period of time (e.g., the previous year, another time period, etc.). As another example, element 3315 may provide information (e.g., a number of contributions of portions of content, a quality level of the portions of content, etc.) about the second user (e.g., associated with element 3313) for a different period of time (e.g., the previous year, another time period, etc.). In this manner, additional information (e.g., a change in contribution level from one time period to another for a user, a change in quality level of contributions from one time period to another for a user, etc.) may be determined using GUI 3300.

Turning back to FIG. 27, the third data may be used in step 2760 to identify the user as an expert. For example, a user who contributes significantly to a business entity (e.g., as determined based on the third data) may be determined to be an expert in a given field.

Accordingly, information about contribution levels of users of a business entity (e.g., the third data generated in step 2750) may be advantageously used for one or more operations to provide various benefits. For example, the third data may be used for the benefit of the contributing user, and thus, embodiments of the present invention can increase or encourage the sharing of information and/or the number of informal contributions made by users of a business entity. As another example, the third data may be used for the benefit of the business entity itself (e.g., improving morale within the business entity by acknowledging informal contributions, identifying top contributors of the business entity, identifying experts in the business entity, etc.).

Moreover, by using information about the users (e.g., tracked and stored in step 2730) and also information about the content contributed by the users (e.g., tracked and stored in step 2740), embodiments of the present invention can provide additional insight into the respective contribution level of each user. Therefore, embodiments of the present invention can further improve operations performed using the information about contribution levels of users of a business entity (e.g., the third data generated in step 2750).

Although FIGS. 28 through 33 show GUIs (e.g., GUI 2800, GUI 2900, GUI 3000, GUI 3100, GUI 3200 and GUI 3300) with a specific number, arrangement, appearance and size of regions, it should be appreciated that one or more of the GUIs may include a different number, arrangement, appearance and/or size of regions in other embodiments. Additionally, although the GUIs (e.g., GUI 2800, GUI 2900, GUI 3000, GUI 3100, GUI 3200 and GUI 3300) depicted in FIGS. 28 through 33 have been described with certain functionalities, it should be appreciated that one or more of the GUIs depicted in FIGS. 28 through 33 may function differently in other embodiments.

In one embodiment, one or more of the GUIs discussed herein (e.g., GUI 2800, GUI 2900, GUI 3000, GUI 3100, GUI 3200, GUI 3300, etc.) may be displayed using a web browser executed by a computer system. The GUIs may be advantageously displayed using code downloaded and executed by the computer system (e.g., similar to a web browser plug-in) with reduced user interaction and/or user awareness. Alternatively, one or more of the GUIs described herein (e.g., GUI 2800, GUI 2900, GUI 3000, GUI 3100, GUI 3200, GUI 3300, etc.) may be displayed using an application executed by the computer system which is separate from a web browser.

Computer System Platform

Figure 34:
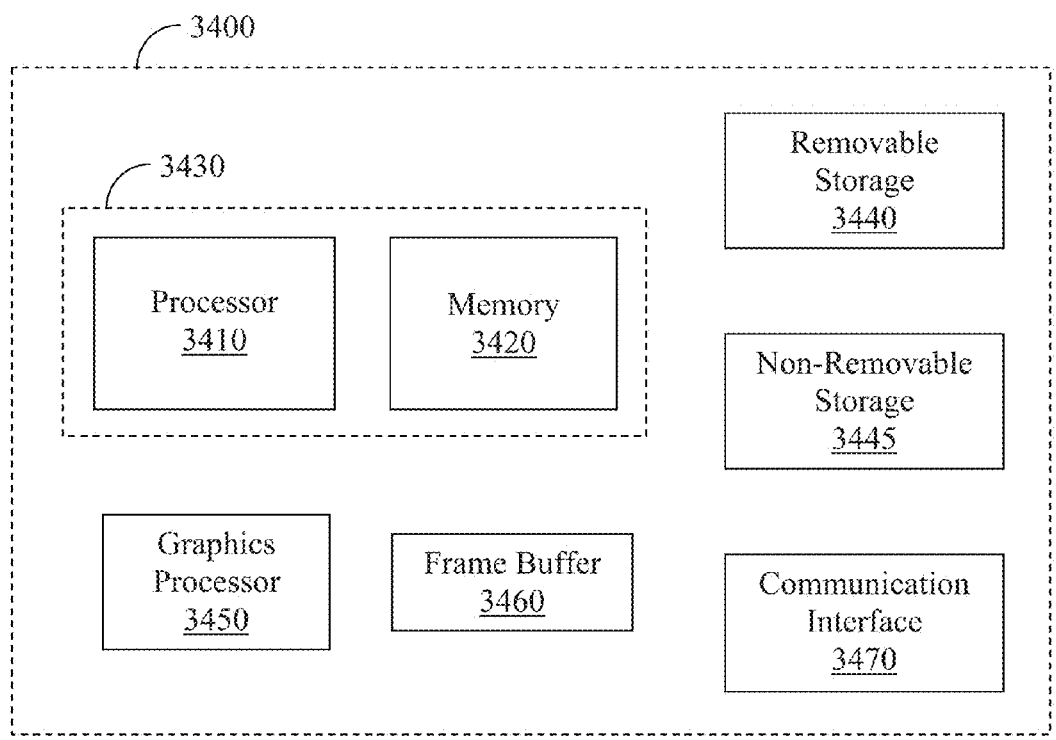
FIG. 34 shows an exemplary computer system platform upon which embodiments of the present invention may be implemented.

FIG. 34 shows exemplary computer system platform 3400 upon which embodiments of the present invention may be implemented. As shown in FIG. 34, portions of the present invention may be implemented by execution of computer-readable instructions or computer-executable instructions that may reside in components of computer system platform 3400 and which may be used as a part of a general purpose computer network. It is appreciated that computer system platform 3400 of FIG. 34 is merely exemplary. As such, the present invention can operate within a number of different systems including, but not limited to, general-purpose computer systems, embedded computer systems, laptop computer systems, hand-held computer systems, portable computer systems, or stand-alone computer systems.

In one embodiment, computer system platform 3400 may be used to implement content server 110, computer system 120, computer system 130, computer system 140, computer system 150, computer system 340, computer system 170, some combination thereof, etc. And in one embodiment, one or more components of computer system platform 3400 may be disposed in and/or coupled with a housing or enclosure.

In one embodiment, depicted by dashed lines 3430, computer system platform 3400 may include at least one processor 3410 and at least one memory 3420. Processor 3410 may include a central processing unit (CPU) or other type of processor. Depending on the configuration and/or type of computer system environment, memory 3420 may include volatile memory (e.g., RAM), non-volatile memory (e.g., ROM, flash memory, etc.), or some combination of the two. Additionally, memory 3420 may be removable, non-removable, etc.

In other embodiments, computer system platform 3400 may include additional storage (e.g., removable storage 3440, non-removable storage 3445, etc.). Removable storage 3440 and/or non-removable storage 3445 may include volatile memory, non-volatile memory, or any combination thereof. Additionally, removable storage 3440 and/or non-removable storage 3445 may include CD-ROM, digital versatile disks (DVD) or other optical storage, magnetic cassettes, magnetic tape, magnetic disk storage or other magnetic storage devices, or any other medium which can be used to store information for access by computer system platform 3400.

As shown in FIG. 34, computer system platform 3400 may communicate with other systems, components, or devices via communication interface 3470. Communication interface 3470 may embody computer-readable instructions, data structures, program modules or other data in a modulated data signal (e.g., a carrier wave) or other transport mechanism. By way of example, and not limitation, communication interface 3470 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 3470 may also couple computer system platform 3400 to one or more input devices (e.g., a keyboard, mouse, pen, voice input device, touch input device, etc.). In one embodiment, communication interface 3470 may couple computer system platform 3400 to one or more output devices (e.g., a display, speaker, printer, etc.).

As shown in FIG. 34, graphics processor 3450 may perform graphics processing operations on graphical data stored in frame buffer 3460 or another memory (e.g., 3420, 3440, 3445, etc.) of computer system platform 3400. Graphical data stored in frame buffer 3460 may be accessed, processed, and/or modified by components (e.g., graphics processor 3450, processor 3410, etc.) of computer system platform 3400 and/or components of other systems/devices. Additionally, the graphical data may be accessed (e.g., by graphics processor 3450) and displayed on an output device coupled to computer system platform 3400. Accordingly, memory 3420, removable storage 3440, non-removable storage 3445, fame buffer 3460, or a combination thereof, may be a computer-readable medium or computer-usable medium and may include instructions that when executed by a processor (e.g., 3410, 3450, etc.) implement a method of sharing information (e.g., in accordance with process 1400 of FIGS. 14A, 14B and 14C), providing access to content (e.g., in accordance with process 1500 of FIGS. 15A and 15B), managing a virtual meeting (e.g., in accordance with process 2600 of FIGS. 26A and 26B), analyzing contribution to a business entity (e.g., in accordance with process 2700 of FIG. 27), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer implemented method of managing a virtual meeting, said method comprising:
   associating shared content with said virtual meeting;
   associating said shared content with a group of users of said virtual meeting;
   assigning respective states to parts of said shared content based on user input, wherein said assigning said respective states comprises:
      receiving a user request from a first user of said group of users for flagging a first part of said shared content; and
      assigning a flagged state to said first part of said shared content;
   receiving a search query with respect to said shared content; and
   automatically performing a search of said shared content based on said search query, wherein said automatically performing said search comprises filtering said shared content based on said respective states; and
   returning a search result.

2. The computer implemented method of claim 1 further comprising authorizing said first user to flag said first part of said shared content based on an instruction provided by a second user.

3. The computer implemented method of claim 1, wherein said filtering comprises excluding flagged parts of said shared content for said search.

4. The computer implemented method of claim 1 further comprising presenting a previous search result to a third user of said group of users, wherein said previous search result comprises a second part of said shared content, and wherein said assigning said respective states comprises:
   receiving a user request from said third user for certifying said second part of said shared content; and
   assigning a certified state to said second part of said shared content.

5. The computer implemented method of claim 4, wherein said filtering further comprises restricting said search to certified parts of said shared content.

6. The computer implemented method of claim 4 further comprising authorizing said third user to certify said shared content.

7. The computer implemented method of claim 1, wherein said shared content comprises audio data and video data generated during said virtual meeting and data uploaded by said group of users.

8. The computer implemented method of claim 1 further comprising:
   tracking selected activities of a fourth user of said group of users during said virtual meeting based on user interactions of said fourth users with a graphical user interface of said virtual meeting;
   associating each of said selected activities with a respective contribution score; and computing an accumulated contribution score for said fourth users based on said selected activities and contribution scores associated therewith.

9. The computer implemented method of claim 8, wherein said accumulated contribution score is indicative of contribution by said fourth user to a business entity associated with said group of users.

10. A system comprising:
   a processor;
   memory coupled to said processor and storing instructions that, when executed by said processor, implement a method of managing a virtual meeting, said method comprising:
      associating shared content with said virtual meeting;
      associating said shared content with a group of users of said virtual meeting, wherein said assigning states comprises:
         receiving a user request from a first user of said group of users for flagging a first part of said shared content; and
         assigning a flagged state to said first part of said shared content;
      assigning respective states to parts of said shared content based on user input;
      receiving a search query with respect to said shared content; and
      automatically performing a search in said shared content based on said search query, wherein said automatically performing said search comprises filtering said shared content based on said respective states; and
      returning a search result.

11. The system of claim 10, wherein said method further comprises authorizing said first user for flagging said first part of said shared content based on an instruction provided from a second user.

12. The system of claim 10, wherein said filtering comprises excluding flagged parts of said shared content for said search.

13. The system of claim 10, wherein said method further comprises presenting a previous search result to a third user of said group of users, wherein said previous search result comprises a second part of said shared content, and wherein said assigning said states comprises:
   receiving a user request from said third user for certifying said second part of said shared content; and
   assigning a certified state to said second part of said shared content.

14. The system of claim 13, wherein said method further comprises authorizing said third user to certify said shared content, wherein said filtering further comprises restricting said search to certified parts of said shared content.

15. The system of claim 10, wherein said shared content comprises content uploaded by said group of users or generated during said virtual meeting.

16. The system of claim 10, wherein said method further comprises:
   tracking selected activities of a fourth user of said group of users in said virtual meeting based on user interactions with a graphical user interface of said virtual meeting;
   associating each of said selected activities with a respective contribution score; and
   computing an accumulated contribution score for said fourth users based on said selected user activities and contribution scores associated therewith, wherein said accumulated contribution score is indicative of contribution by said fourth user to a business entity associated with said group of users.

17. A computer implemented method comprising:
   during a virtual meeting, rendering a graphical user interface (GUI) for display on a plurality of display devices that are respectively associated with a group of users;
   associating shared content with said group of users, wherein said shared content comprises content generated during said virtual meeting;
   authorizing selected users of said group of users for flagging said shared content;
   based on user interactions with said GUI, flagging selected parts of said shared content;
   receiving a search query submitted from said GUI with respect to said shared content;
   automatically performing a search in said shared content based on said search query, wherein said automatically performing said search comprises excluding flagged parts from said search; and
   presenting a search result in said GUI.

18. The computer implemented method of claim 17 further comprising:
   presenting a previous search result with respect to said shared content to a user of said group of users, wherein said previous search result identifies a part of said shared content;
   in response to a user request from an authorized user of said group of users submitted from said GUI, certifying said part of said shared content; and
   restricting said search to certified parts of said shared content.

* * * * *